United States Patent
Bitincka et al.

(10) Patent No.: US 12,003,572 B1
(45) Date of Patent: *Jun. 4, 2024

(54) TWO-WAY REPLICATION OF SEARCH NODE CONFIGURATION FILES USING A MEDIATOR NODE

(71) Applicant: SPLUNK INC., San Francisco, CA (US)

(72) Inventors: Ledion Bitincka, San Francisco, CA (US); Vishal Patel, San Francisco, CA (US); Geoffrey Hendrey, San Francisco, CA (US); Eric Woo, San Francisco, CA (US)

(73) Assignee: Splunk Inc., San Francisco, CA (US)

( * ) Notice: Subject to any disclaimer, the term of this patent is extended or adjusted under 35 U.S.C. 154(b) by 9 days.

This patent is subject to a terminal disclaimer.

(21) Appl. No.: 17/804,260

(22) Filed: May 26, 2022

Related U.S. Application Data

(63) Continuation of application No. 17/010,399, filed on Sep. 2, 2020, now Pat. No. 11,394,767, which is a
(Continued)

(51) Int. Cl.
*H04L 41/0813* (2022.01)
*H04L 41/084* (2022.01)
(Continued)

(52) U.S. Cl.
CPC .......... *H04L 67/06* (2013.01); *H04L 41/0813* (2013.01); *H04L 41/0843* (2013.01);
(Continued)

(58) Field of Classification Search
CPC ....... H04L 67/06; H04L 67/34; H04L 67/329; H04L 41/0818; H04L 41/0842; H04L 41/0856
(Continued)

(56) References Cited

U.S. PATENT DOCUMENTS 8,260,913 B2 * 9/2012 Knapp ................ H04L 67/1008
709/212
8,566,447 B2 10/2013 Cohen et al.
(Continued)

FOREIGN PATENT DOCUMENTS

WO WO-2013103860 A1 * 7/2013 ............. G06F 16/40

*Primary Examiner* — Khanh Q Dinh
(74) *Attorney, Agent, or Firm* — Shook, Hardy & Bacon L.L.P.

(57) ABSTRACT

In a computer-implemented method for configuring a distributed computer system comprising a plurality of nodes of a plurality of node classes, configuration files for a plurality of nodes of each of the plurality of node classes are stored in a central repository. The configuration files include information representing a desired system state of the distributed computer system, and the distributed computer system operates to keep an actual system state of the distributed computer system consistent with the desired system state. The plurality of node classes includes forwarder nodes for receiving data from an input source, indexer nodes for indexing the data, and search head nodes for searching the data. Responsive to receiving changes to the configuration files, the changes are propagated to nodes of the plurality of nodes impacted by the changes based on a node class of the nodes impacted by the changes.

20 Claims, 39 Drawing Sheets

Related U.S. Application Data continuation of application No. 16/202,990, filed on Nov. 28, 2018, now Pat. No. 10,798,148, which is a continuation of application No. 15/143,472, filed on Apr. 29, 2016, now Pat. No. 10,178,152.

(51) Int. Cl.
  *H04L 41/0853* (2022.01)
  *H04L 67/00* (2022.01)
  *H04L 67/06* (2022.01)
  *H04L 69/329* (2022.01)

(52) U.S. Cl.
  CPC .......... *H04L 41/0856* (2013.01); *H04L 67/34* (2013.01); *H04L 69/329* (2013.01)

(58) Field of Classification Search
  USPC .................. 709/206, 220, 224, 226, 228
  See application file for complete search history.

(56) References Cited

U.S. PATENT DOCUMENTS

| | | | |
|---|---|---|---|
| 8,719,223 B2* | 5/2014 | Knapp | G06F 16/1827 707/626 |
| 8,719,501 B2 | 5/2014 | Flynn et al. | |
| 9,081,501 B2 | 7/2015 | Asaad et al. | |
| 9,154,329 B2* | 10/2015 | Rosenberg | H04L 45/123 |
| 9,219,500 B2 | 12/2015 | Schilling et al. | |
| 9,378,262 B2* | 6/2016 | Braddy | G06F 3/0619 |
| 9,626,177 B1* | 4/2017 | Madduri | G06F 8/65 |
| 9,705,817 B2 | 7/2017 | Lui et al. | |
| 9,838,240 B1 | 12/2017 | Cormie et al. | |
| 9,971,713 B2 | 5/2018 | Asaad et al. | |
| 10,237,134 B2 | 3/2019 | Saltsidis | |
| 10,257,030 B2 | 4/2019 | Saltsidis | |
| 10,389,592 B2 | 8/2019 | Lui et al. | |
| 10,530,838 B1 | 1/2020 | Bicka | |
| 10,681,490 B2 | 6/2020 | Kulkarni et al. | |
| 10,715,448 B2 | 7/2020 | Dey et al. | |
| 10,719,332 B1 | 7/2020 | Dwivedi et al. | |
| 10,798,152 B2 | 10/2020 | Estes et al. | |
| 10,880,326 B1* | 12/2020 | Gofman | H04L 51/08 |
| 11,194,564 B1 | 12/2021 | Dwivedi et al. | |
| 11,394,767 B2* | 7/2022 | Bitincka | H04L 41/0843 |
| 2005/0038779 A1* | 2/2005 | Fernandez | G06F 40/12 707/999.102 |
| 2005/0171980 A1* | 8/2005 | Fernandez | G06F 16/258 |
| 2008/0049787 A1 | 2/2008 | McNaughton et al. | |
| 2011/0066808 A1 | 3/2011 | Flynn et al. | |
| 2011/0289417 A1* | 11/2011 | Schaefer | G06F 11/2025 715/735 |
| 2012/0290950 A1 | 11/2012 | Rapaport et al. | |
| 2013/0080641 A1* | 3/2013 | Lui | H04L 41/046 709/226 |
| 2013/0173152 A1 | 7/2013 | Schilling et al. | |
| 2014/0280771 A1 | 9/2014 | Bosworth et al. | |
| 2014/0344713 A1 | 11/2014 | Beglin | |
| 2015/0140756 A1* | 5/2015 | Yu | H01L 21/823431 438/275 |
| 2015/0161225 A1* | 6/2015 | Braddy | G06F 11/2033 713/168 |
| 2015/0249548 A1* | 9/2015 | Rasband | G01S 13/876 370/254 |
| 2016/0112341 A1 | 4/2016 | Lui et al. | |
| 2017/0111219 A1 | 4/2017 | Saltsidis | |
| 2018/0123876 A1* | 5/2018 | Tang | H04L 41/0806 |
| 2019/0363988 A1 | 11/2019 | Dey et al. | |
| 2020/0280577 A1* | 9/2020 | Segal | H04L 63/20 |

* cited by examiner

FIG. 6A

| Data Summary | | | |
|---|---|---|---|
| Hosts (5) | Sources (8) | Sourcetypes (3) | |
| filter | | | |
| Host ⬍ | | Count ⬍ | Last Update ⬍ |
| mailsv | ⬇ | 9,829 | 4/29/14 1:32:47.000 PM |
| vendor_sales | ⬇ | 30,244 | 4/29/14 1:32:46.000 PM |
| www1 | ⬇ | 24,221 | 4/29/14 1:32:44.000 PM |
| www2 | ⬇ | 22,595 | 4/29/14 1:32:47.000 PM |
| www3 | ⬇ | 22,975 | 4/29/14 1:32:45.000 PM |

New Pivot 1,776,004 of 1,776,004 events matched

Save As... ▾ | Clear

Filters: All time

Split Rows: component

Split Columns: group

Column Values: Count of Event O...

| component | NULL | conf | deploy-connections | deploy-server | map | mpool | per_host_thruput | per_index_thruput | per_source_thruput | per_sourcetype_thruput | pipeline | queue | realtime_search_data |
|---|---|---|---|---|---|---|---|---|---|---|---|---|---|
| BucketMover | 4 | 0 | 0 | 0 | 0 | 0 | 0 | 0 | 0 | 0 | 0 | 0 | 0 |
| DatabaseDirectoryManager | 4 | 0 | 0 | 0 | 0 | 0 | 0 | 0 | 0 | 0 | 0 | 0 | 0 |
| DateParserVerbose | 562 | 0 | 0 | 0 | 0 | 0 | 0 | 0 | 0 | 0 | 0 | 0 | 0 |
| DiskMon | 3 | 0 | 0 | 0 | 0 | 0 | 0 | 0 | 0 | 0 | 0 | 0 | 0 |
| IndexConfig | 1 | 0 | 0 | 0 | 0 | 0 | 0 | 0 | 0 | 0 | 0 | 0 | 0 |
| LicenseUsage | 2872 | 0 | 0 | 0 | 0 | 0 | 0 | 0 | 0 | 0 | 0 | 0 | 0 |
| Metrics | 0 | 1 | 972 | 2916 | 972 | 972 | 4621 | 2843 | 9314 | 0 | 9306 | 18797 | 972 |
| OneShotWriter | 12226 | 0 | 0 | 0 | 0 | 0 | 0 | 0 | 0 | 0 | 0 | 12636 | 0 |
| TailingProcessor | 2 | 0 | 0 | 0 | 0 | 0 | 0 | 0 | 0 | 0 | 0 | 0 | 0 |
| WatchedFile | 18 | 0 | 0 | 0 | 0 | 0 | 0 | 0 | 0 | 0 | 0 | 0 | 0 |
| cached | 5 | 0 | 0 | 0 | 0 | 0 | 0 | 0 | 0 | 0 | 0 | 0 | 0 |
| decorators | 2 | 0 | 0 | 0 | 0 | 0 | 0 | 0 | 0 | 0 | 0 | 0 | 0 |
| utils | 1 | 0 | 0 | 0 | 0 | 0 | 0 | 0 | 0 | 0 | 0 | 0 | 0 |
| view | 6 | 0 | 0 | 0 | 0 | 0 | 0 | 0 | 0 | 0 | 0 | 0 | 0 |

20 per page ▾  Format ▾

STORE CONFIGURATION FILES FOR A PLURALITY OF NODES OF EACH OF THE PLURALITY OF NODE CLASSES IN A CENTRAL REPOSITORY.
2410

RESPONSIVE TO RECEIVING CHANGES TO THE CONFIGURATION FILES, PROPAGATING THE CHANGES TO NODES OF THE PLURALITY OF NODES EFFECTED BY THE CHANGES.
2420

RESPONSIVE TO RECEIVING CHANGES IN THE CONFIGURATION FILES AT A SEARCH NODE, PROPAGATE THE CHANGES TO THE CENTRAL REPOSITORY FROM THE SEARCH NODE
2430

```
RECEIVE A FIRST TRANSACTION COMPRISING A FIRST CHANGE TO THE
CONFIGURATION FILES
2705
          │
          ▼
RECEIVE A SECOND TRANSACTION COMPRISING A SECOND CHANGE TO THE
CONFIGURATION FILES, WHEREIN THE SECOND TRANSACTION IS RECEIVED
SUBSEQUENT TO THE FIRST TRANSACTION
2710
          │
          ▼
MERGE THE FIRST CHANGE INTO THE CONFIGURATION FILES
2715
          │
          ▼
DETERMINE WHETHER THE FIRST CHANGE CONFLICTS WITH THE SECOND
CHANGE
2720
          │
          ▼
RESPONSIVE TO THE FIRST CHANGE CONFLICTING WITH THE SECOND
CHANGE, NOT MERGING THE SECOND CHANGE INTO THE CONFIGURATION
FILES, AND PROVIDING A NOTIFICATION THAT THE SECOND CHANGE HAS
NOT BEEN MERGED INTO THE CONFIGURATION FILES
2725
```

| Apps ▼ | | | | Administrator ▼ | ⊡ Messages ▼ | Settings ▼ | Activity ▼ | Help ▼ | Find |

Fowarders / Server Classes / Apps / Deploy        Fowarder Management (Preview)

Deploy Changes
All pending changes to Server Classes, Apps, and Fowarders can be displayed by pressing Deploy Changes button, a detailed list of recently deployed changes is under the Recently Deployed Changes tab.                                              [Display Changes]

Pending Changes \ Recently Displayed Changes

+ Expand All Changes                                           25 per page ▼

6 Changes   Entity Type All ▼   (filter by Entity Name)

| i | Edit Time ◆ | Edit User ◆ | Operation | Entity Type ◆ | Entity Name ◆ |
|---|---|---|---|---|---|
| > | 4/26/2016, 2:42:04 PM | admin | Create | Stanza | monitor:/var/log/secure.log |
| > | 4/26/2016, 2:40:21 PM | admin | Update | Server Class | pogdh_test |
| > | 4/26/2016, 2:35:24 PM | admin | Create | Server Class | pogdh_test |
| > | 4/26/2016, 1:58:40 PM | admin | Uninstall | App | splunk_fi_4_overview |
| > | 4/26/2016, 1:52:4? PM | admin | Install | App | splunk_fi_4_overview |
| > | 4/27/2016, 4:42:43 PM | admin | Update | Stanza | andy_test |

2830 (arrow to top-right area)
2832 (arrow to row)

```
┌─────────────────────────────────────────────────────────────────┐
│ DISPLAY, VIA A GRAPHICAL USER INTERFACE OF A COMPUTING DEVICE   │
│ HAVING A DISPLAY SCREEN, A PLURALITY OF CONFIGURATION CONTROLS  │
│ ENABLING USER CONFIGURATION OF THE DISTRIBUTED COMPUTER SYSTEM. │
│ 2910                                                            │
│   ┌─────────────────────────────────────────────────────────┐   │
│   │ DISPLAY A CONFIGURATION STATUS OF NODES OF THE DISTRIBUTED│ │
│   │ COMPUTER SYSTEM.                                        │   │
│   │ 2920                                                    │   │
│   └─────────────────────────────────────────────────────────┘   │
└─────────────────────────────────────────────────────────────────┘
                                    ↓
┌─────────────────────────────────────────────────────────────────┐
│ IN RESPONSE TO RECEIVING A COMMAND FOR CONFIGURING A NODE OF    │
│ THE DISTRIBUTED COMPUTER SYSTEM AT THE GRAPHICAL USER INTERFACE,│
│ IDENTIFY A CONTROL NODE OF THE DISTRIBUTED COMPUTER SYSTEM      │
│ CONFIGURED FOR EXECUTING THE COMMAND.                           │
│ 2930                                                            │
└─────────────────────────────────────────────────────────────────┘
                                    ↓
┌─────────────────────────────────────────────────────────────────┐
│ ISSUE THE COMMAND TO THE IDENTIFIED CONTROL NODE FOR EXECUTION. │
│ 2940                                                            │
└─────────────────────────────────────────────────────────────────┘
                                    ↓
┌─────────────────────────────────────────────────────────────────┐
│ EXECUTE THE COMMAND AT THE IDENTIFIED CONTROL NODE.             │
│ 2950                                                            │
└─────────────────────────────────────────────────────────────────┘
                                    ↓
┌─────────────────────────────────────────────────────────────────┐
│ RECEIVE A CONFIGURATION STATUS UPDATE FROM THE NODE.            │
│ 2960                                                            │
└─────────────────────────────────────────────────────────────────┘
                                    ↓
┌─────────────────────────────────────────────────────────────────┐
│ UPDATE A CONFIGURATION STATUS OF THE GRAPHICAL USER INTERFACE   │
│ TO DISPLAY THE CONFIGURATION STATUS UPDATE FOR THE NODE.        │
│ 2970                                                            │
└─────────────────────────────────────────────────────────────────┘
```

TWO-WAY REPLICATION OF SEARCH NODE CONFIGURATION FILES USING A MEDIATOR NODE

CROSS-REFERENCE TO RELATED APPLICATIONS

This application is a Continuation of U.S. patent application Ser. No. 17/010,399, filed Sep. 2, 2020, which in itself is a Continuation of U.S. patent application Ser. No. 16/202,990, filed Nov. 28, 2018, which in itself is a Continuation of U.S. patent application Ser. No. 15/143,472, filed Apr. 29, 2016, the entire contents of each are incorporated by reference herein.

BACKGROUND

Modern data centers often comprise thousands of hosts that operate collectively to service requests from even larger numbers of remote clients. During operation, components of these data centers can produce significant volumes of machine-generated data. The unstructured nature of much of this data has made it challenging to perform indexing and searching operations because of the difficulty of applying semantic meaning to unstructured data. As the number of hosts and clients associated with a data center continues to grow, processing large volumes of machine-generated data in an intelligent manner and effectively presenting the results of such processing continues to be a priority.

BRIEF DESCRIPTION OF THE DRAWINGS

The accompanying drawings, which are incorporated in and form a part of the Description of Embodiments, illustrate various embodiments of the subject matter and, together with the Description of Embodiments, serve to explain principles of the subject matter discussed below. Unless specifically noted, the drawings referred to in this Brief Description of Drawings should be understood as not being drawn to scale. Herein, like items are labeled with like item numbers:

FIG. 6A illustrates a search screen in accordance with the disclosed embodiments;

FIG. 6B illustrates a data summary dialog that enables a user to select various data sources in accordance with the disclosed embodiments;

FIG. 9B illustrates an incident review dashboard in accordance with the disclosed embodiments;

FIGS. 15-17 illustrate example visualizations generated by a reporting application in accordance with the disclosed embodiments;

FIGS. 24-27 illustrate processes for configuring a distributed computer system comprising a plurality of nodes of a plurality of node classes, in accordance with some embodiments;

FIGS. 28A-28D illustrate a series of user interface screens for an example node configuration user interface, in accordance with the some embodiments; and FIG. 29 illustrate processes for configuring a distributed computer system comprising a plurality of nodes of a plurality of node classes at a user interface, in accordance with some embodiments.

DETAILED DESCRIPTION

Figure 1:
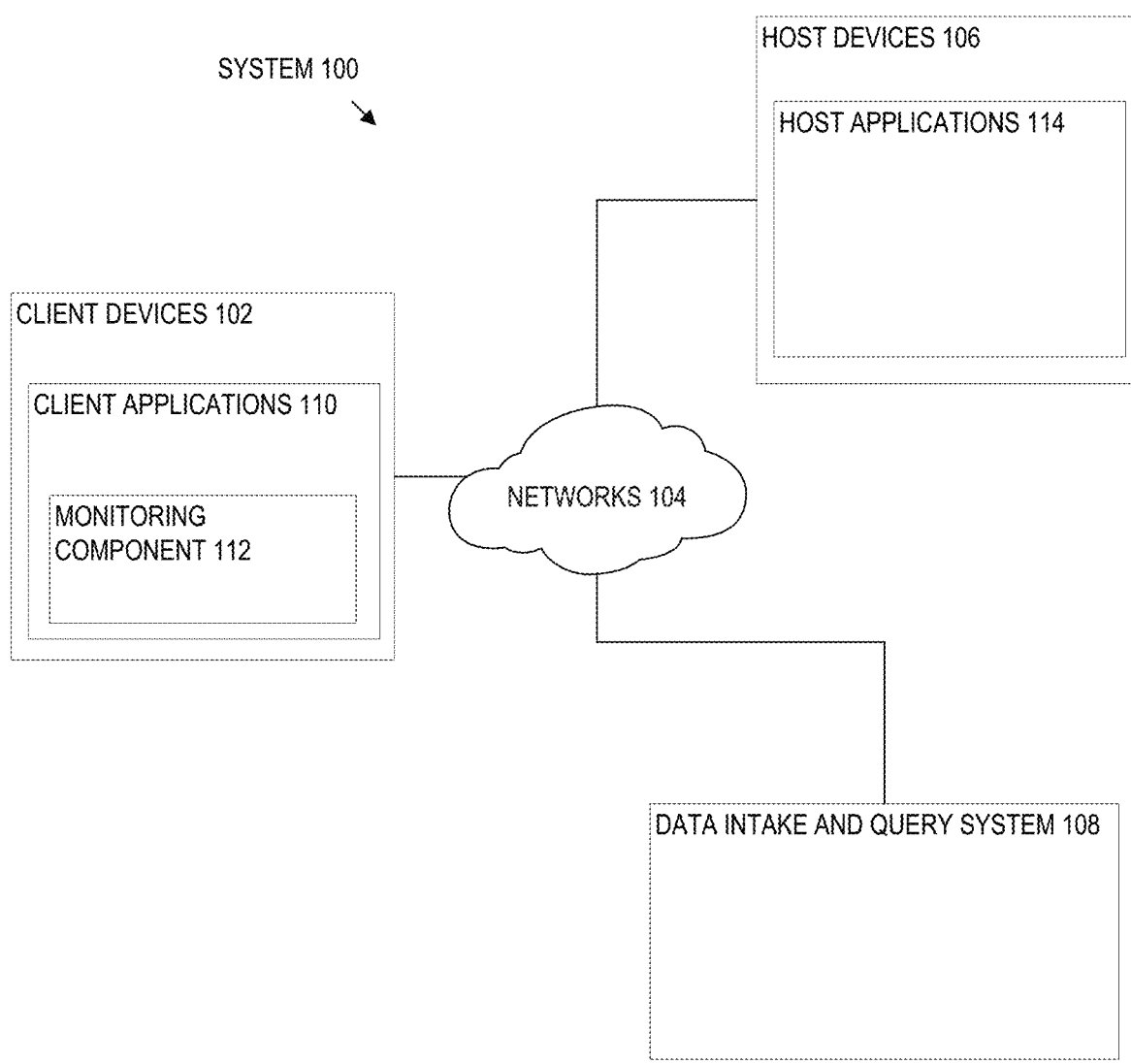
FIG. 1 illustrates a networked computer environment in which an embodiment may be implemented.

Reference will now be made in detail to various embodiments of the subject matter, examples of which are illustrated in the accompanying drawings. While various embodiments are discussed herein, it will be understood that they are not intended to limit to these embodiments. On the contrary, the presented embodiments are intended to cover alternatives, modifications and equivalents, which may be included within the spirit and scope the various embodiments as defined by the appended claims. Furthermore, in this description of embodiments, numerous specific details are set forth in order to provide a thorough understanding of embodiments of the present subject matter. However, embodiments may be practiced without these specific details. In other instances, well known methods, procedures, components, and circuits have not been described in detail as not to unnecessarily obscure aspects of the described embodiments.

The present disclosure is directed to centralizing configurations of a distributed system, such as a data aggregation and analysis system, at a central repository. The distributed system includes nodes of multiple node classes, including forwarders, indexers and search heads. A forwarder may refer to a component of the data aggregation and analysis system that is responsible for collecting data from a variety of data sources. An indexer may refer to a component of the data aggregation and analysis system that is responsible for storing, processing and/or performing operations on the collected data. A search head may refer to a component of the data aggregation and analysis system that is responsible for performing search operations on the collected data. Nodes, and/or clusters of nodes, of the data aggregation and analysis system can be customized, with the customization being stored in configuration files. Embodiments described herein provide a central repository for storing and maintaining the configuration files of the distributed system.

Various embodiments described herein provide a central repository that maintains configuration files in a desired system state and the distributed system operates to keep the actual system state consistent with the desired system state. For some node classes, such as search heads, synchronization between the nodes and the central repository is bi-directional, as changes can be made to the configuration files at the nodes themselves or at the central repository. For other node classes, such as indexers and forwarders, the synchronization is one-directional from the central repository to the nodes due to the central management of the configuration files for these node classes. Administrative functions can be performed via a management node that maintains the central repository of the desired system state of the configuration files.

Notation and Nomenclature

Some portions of the detailed descriptions which follow are presented in terms of procedures, logic blocks, processing and other symbolic representations of operations on data bits within a computer memory. These descriptions and representations are the means used by those skilled in the data processing arts to most effectively convey the substance of their work to others skilled in the art. In the present application, a procedure, logic block, process, or the like, is conceived to be one or more self-consistent procedures or instructions leading to a desired result. The procedures are those requiring physical manipulations of physical quantities. Usually, although not necessarily, these quantities take the form of electrical or magnetic signals capable of being stored, transferred, combined, compared, and otherwise manipulated in an electronic device.

It should be borne in mind, however, that all of these and similar terms are to be associated with the appropriate physical quantities and are merely convenient labels applied to these quantities. Unless specifically stated otherwise as apparent from the following discussions, it is appreciated that throughout the description of embodiments, discussions utilizing terms such as "storing," "receiving," "propagating," "providing," "comparing," "determining," "merging," "searching," "configuring," or the like, refer to the actions and processes of an electronic device such as: a host processor, a processor, a processing unit, a computer system, a networked computer system, or the like, or a combination thereof. The electronic device manipulates and transforms data represented as physical (electronic and/or magnetic) quantities within the electronic device's registers and memories into other data similarly represented as physical quantities within the electronic device's memories or registers or other such information storage, transmission, processing, or display components.

Embodiments described herein may be discussed in the general context of processor-executable instructions residing on some form of non-transitory processor-readable medium, such as program modules, executed by one or more computers or other devices. Generally, program modules include routines, programs, objects, components, data structures, etc., that perform particular tasks or implement particular abstract data types. The functionality of the program modules may be combined or distributed as desired in various embodiments.

In the FIGURES, a single block may be described as performing a function or functions; however, in actual practice, the function or functions performed by that block may be performed in a single component or across multiple components, and/or may be performed using hardware, using software, or using a combination of hardware and software. To clearly illustrate this interchangeability of hardware and software, various illustrative components, blocks, modules, circuits, and steps have been described generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Also, the example mobile electronic device described herein may include components other than those shown, including well-known components.

The techniques described herein may be implemented in hardware, software, firmware, or any combination thereof, unless specifically described as being implemented in a specific manner. Any features described as modules or components may also be implemented together in an integrated logic device or separately as discrete but interoperable logic devices. If implemented in software, the techniques may be realized at least in part by a non-transitory processor-readable storage medium comprising instructions that, when executed, perform one or more of the methods described herein. The non-transitory processor-readable data storage medium may form part of a computer program product, which may include packaging materials.

The non-transitory processor-readable storage medium may comprise random access memory (RAM) such as synchronous dynamic random access memory (SDRAM), read only memory (ROM), non-volatile random access memory (NVRAM), electrically erasable programmable read-only memory (EEPROM), FLASH memory, other known storage media, and the like. The techniques additionally, or alternatively, may be realized at least in part by a processor-readable communication medium that carries or communicates code in the form of instructions or data structures and that can be accessed, read, and/or executed by a computer or other processor.

The various illustrative logical blocks, modules, circuits and instructions described in connection with the embodiments disclosed herein may be executed by one or more processors, such as one or more motion processing units (MPUs), sensor processing units (SPUs), host processor(s) or core(s) thereof, digital signal processors (DSPs), general purpose microprocessors, application specific integrated circuits (ASICs), application specific instruction set processors (ASIPs), field programmable gate arrays (FPGAs), or other equivalent integrated or discrete logic circuitry. The term "processor," as used herein may refer to any of the foregoing structures or any other structure suitable for implementation of the techniques described herein. In addition, in some aspects, the functionality described herein may be provided within dedicated software modules or hardware modules configured as described herein. Also, the techniques could be fully implemented in one or more circuits or logic elements. A general purpose processor may be a microprocessor, but in the alternative, the processor may be any conventional processor, controller, microcontroller, or state machine. A processor may also be implemented as a combination of computing devices, e.g., a combination of an SPU/MPU and a microprocessor, a plurality of microprocessors, one or more microprocessors in conjunction with an SPU core, MPU core, or any other such configuration.

Embodiments are described herein according to the following outline:
1.0. General Overview
2.0. Operating Environment
   2.1. Host Devices
   2.2. Client Devices
   2.3. Client Device Applications
   2.4. Data Server System
   2.5. Data Ingestion
     2.5.1. Input
     2.5.2. Parsing
     2.5.3. Indexing
   2.6. Query Processing
   2.7. Field Extraction
   2.8. Example Search Screen
   2.9. Data Modelling
   2.10. Acceleration Techniques
     2.10.1. Aggregation Technique
     2.10.2. Keyword Index
     2.10.3. High Performance Analytics Store
     2.10.4. Accelerating Report Generation
   2.11. Data Center Monitoring
   2.12. Cloud-Based System Overview
   2.13. Searching Externally Archived Data
   2.13.1. ERP Process Features
3.0. Central Repository for Configuration Files
   3.1 Example Processes of Operation

1.0. General Overview

Modern data centers and other computing environments can comprise anywhere from a few host computer systems to thousands of systems configured to process data, service requests from remote clients, and perform numerous other computational tasks. During operation, various components within these computing environments often generate significant volumes of machine-generated data. For example, machine data is generated by various components in the information technology (IT) environments, such as servers, sensors, routers, mobile devices, Internet of Things (IoT) devices, etc. Machine-generated data can include system logs, network packet data, sensor data, application program data, error logs, stack traces, system performance data, etc. In general, machine-generated data can also include performance data, diagnostic information, and many other types of data that can be analyzed to diagnose performance problems, monitor user interactions, and to derive other insights.

A number of tools are available to analyze machine data, that is, machine-generated data. In order to reduce the size of the potentially vast amount of machine data that may be generated, many of these tools typically pre-process the data based on anticipated data-analysis needs. For example, pre-specified data items may be extracted from the machine data and stored in a database to facilitate efficient retrieval and analysis of those data items at search time. However, the rest of the machine data typically is not saved and discarded during pre-processing. As storage capacity becomes progressively cheaper and more plentiful, there are fewer incentives to discard these portions of machine data and many reasons to retain more of the data.

This plentiful storage capacity is presently making it feasible to store massive quantities of minimally processed machine data for later retrieval and analysis. In general, storing minimally processed machine data and performing analysis operations at search time can provide greater flexibility because it enables an analyst to search all of the machine data, instead of searching only a pre-specified set of data items. This may enable an analyst to investigate different aspects of the machine data that previously were unavailable for analysis.

However, analyzing and searching massive quantities of machine data presents a number of challenges. For example, a data center, servers, or network appliances may generate many different types and formats of machine data (e.g., system logs, network packet data (e.g., wire data, etc.), sensor data, application program data, error logs, stack traces, system performance data, operating system data, virtualization data, etc.) from thousands of different components, which can collectively be very time-consuming to analyze. In another example, mobile devices may generate large amounts of information relating to data accesses, application performance, operating system performance, network performance, etc. There can be millions of mobile devices that report these types of information.

These challenges can be addressed by using an event-based data intake and query system, such as the SPLUNK® ENTERPRISE system developed by Splunk Inc. of San Francisco, California. The SPLUNK® ENTERPRISE system is the leading platform for providing real-time operational intelligence that enables organizations to collect, index, and search machine-generated data from various websites, applications, servers, networks, and mobile devices that power their businesses. The SPLUNK® ENTERPRISE system is particularly useful for analyzing data which is commonly found in system log files, network data, and other data input sources. Although many of the techniques described herein are explained with reference to a data intake and query system similar to the SPLUNK® ENTERPRISE system, these techniques are also applicable to other types of data systems.

In the SPLUNK® ENTERPRISE system, machine-generated data are collected and stored as "events". An event comprises a portion of the machine-generated data and is associated with a specific point in time. For example, events may be derived from "time series data," where the time series data comprises a sequence of data points (e.g., performance measurements from a computer system, etc.) that are associated with successive points in time. In general, each event can be associated with a timestamp that is derived from the raw data in the event, determined through interpolation between temporally proximate events having known timestamps, or determined based on other configurable rules for associating timestamps with events, etc.

In some instances, machine data can have a predefined format, where data items with specific data formats are stored at predefined locations in the data. For example, the machine data may include data stored as fields in a database table. In other instances, machine data may not have a predefined format, that is, the data is not at fixed, predefined locations, but the data does have repeatable patterns and is not random. This means that some machine data can comprise various data items of different data types and that may be stored at different locations within the data. For example, when the data source is an operating system log, an event can include one or more lines from the operating system log containing raw data that includes different types of performance and diagnostic information associated with a specific point in time.

Examples of components which may generate machine data from which events can be derived include, but are not limited to, web servers, application servers, databases, firewalls, routers, operating systems, and software applications that execute on computer systems, mobile devices, sensors, Internet of Things (IoT) devices, etc. The data generated by such data sources can include, for example and without limitation, server log files, activity log files, configuration files, messages, network packet data, performance measurements, sensor measurements, etc.

The SPLUNK® ENTERPRISE system uses flexible schema to specify how to extract information from the event data. A flexible schema may be developed and redefined as needed. Note that a flexible schema may be applied to event data "on the fly," when it is needed (e.g., at search time, index time, ingestion time, etc.). When the schema is not applied to event data until search time it may be referred to as a "late-binding schema."

During operation, the SPLUNK® ENTERPRISE system starts with raw input data (e.g., one or more system logs, streams of network packet data, sensor data, application program data, error logs, stack traces, system performance data, etc.). The system divides this raw data into blocks (e.g., buckets of data, each associated with a specific time frame, etc.), and parses the raw data to produce timestamped events. The system stores the timestamped events in a data store. The system enables users to run queries against the stored data to, for example, retrieve events that meet criteria specified in a query, such as containing certain keywords or having specific values in defined fields. As used herein throughout, data that is part of an event is referred to as "event data". In this context, the term "field" refers to a location in the event data containing one or more values for a specific data item. As will be described in more detail herein, the fields are defined by extraction rules (e.g., regular expressions) that derive one or more values from the portion of raw machine data in each event that has a particular field specified by an extraction rule. The set of values so produced are semantically-related (such as IP address), even though the raw machine data in each event may be in different formats (e.g., semantically-related values may be in different positions in the events derived from different sources).

As noted above, the SPLUNK® ENTERPRISE system utilizes a late-binding schema to event data while performing queries on events. One aspect of a late-binding schema is applying "extraction rules" to event data to extract values for specific fields during search time. More specifically, the extraction rules for a field can include one or more instructions that specify how to extract a value for the field from the event data. An extraction rule can generally include any type of instruction for extracting values from data in events. In some cases, an extraction rule comprises a regular expression where a sequence of characters form a search pattern, in which case the rule is referred to as a "regex rule." The system applies the regex rule to the event data to extract values for associated fields in the event data by searching the event data for the sequence of characters defined in the regex rule.

In the SPLUNK® ENTERPRISE system, a field extractor may be configured to automatically generate extraction rules for certain field values in the events when the events are being created, indexed, or stored, or possibly at a later time. Alternatively, a user may manually define extraction rules for fields using a variety of techniques. In contrast to a conventional schema for a database system, a late-binding schema is not defined at data ingestion time. Instead, the late-binding schema can be developed on an ongoing basis until the time a query is actually executed. This means that extraction rules for the fields in a query may be provided in the query itself, or may be located during execution of the query. Hence, as a user learns more about the data in the events, the user can continue to refine the late-binding schema by adding new fields, deleting fields, or modifying the field extraction rules for use the next time the schema is used by the system. Because the SPLUNK® ENTERPRISE system maintains the underlying raw data and uses late-binding schema for searching the raw data, it enables a user to continue investigating and learn valuable insights about the raw data.

In some embodiments, a common field name may be used to reference two or more fields containing equivalent data items, even though the fields may be associated with different types of events that possibly have different data formats and different extraction rules. By enabling a common field name to be used to identify equivalent fields from different types of events generated by disparate data sources, the system facilitates use of a "common information model" (CIM) across the disparate data sources (further discussed with respect to FIG. 5).

2.0. Operating Environment

FIG. 1 illustrates a networked computer system 100 in which an embodiment may be implemented. Those skilled in the art would understand that FIG. 1 represents one example of a networked computer system and other embodiments may use different arrangements.

The networked computer system 100 comprises one or more computing devices. These one or more computing devices comprise any combination of hardware and software configured to implement the various logical components described herein. For example, the one or more computing devices may include one or more memories that store instructions for implementing the various components described herein, one or more hardware processors configured to execute the instructions stored in the one or more memories, and various data repositories in the one or more memories for storing data structures utilized and manipulated by the various components.

In an embodiment, one or more client devices 102 are coupled to one or more host devices 106 and a data intake and query system 108 via one or more networks 104. Networks 104 broadly represent one or more LANs, WANs, cellular networks (e.g., LTE, HSPA, 3G, and other cellular technologies), and/or networks using any of wired, wireless, terrestrial microwave, or satellite links, and may include the public Internet.

2.1. Host Devices

In the illustrated embodiment, a system 100 includes one or more host devices 106. Host devices 106 may broadly include any number of computers, virtual machine instances, and/or data centers that are configured to host or execute one or more instances of host applications 114. In general, a host device 106 may be involved, directly or indirectly, in processing requests received from client devices 102. Each host device 106 may comprise, for example, one or more of a network device, a web server, an application server, a database server, etc. A collection of host devices 106 may be configured to implement a network-based service. For example, a provider of a network-based service may configure one or more host devices 106 and host applications 114 (e.g., one or more web servers, application servers, database servers, etc.) to collectively implement the network-based application.

In general, client devices 102 communicate with one or more host applications 114 to exchange information. The communication between a client device 102 and a host application 114 may, for example, be based on the Hypertext Transfer Protocol (HTTP) or any other network protocol. Content delivered from the host application 114 to a client device 102 may include, for example, HTML documents, media content, etc. The communication between a client device 102 and host application 114 may include sending various requests and receiving data packets. For example, in general, a client device 102 or application running on a client device may initiate communication with a host application 114 by making a request for a specific resource (e.g., based on an HTTP request), and the application server may respond with the requested content stored in one or more response packets.

In the illustrated embodiment, one or more of host applications 114 may generate various types of performance data during operation, including event logs, network data, sensor data, and other types of machine-generated data. For example, a host application 114 comprising a web server may generate one or more web server logs in which details of interactions between the web server and any number of client devices 102 is recorded. As another example, a host device 106 comprising a router may generate one or more router logs that record information related to network traffic managed by the router. As yet another example, a host application 114 comprising a database server may generate one or more logs that record information related to requests sent from other host applications 114 (e.g., web servers or application servers) for data managed by the database server.

2.2. Client Devices

Client devices 102 of FIG. 1 represent any computing device capable of interacting with one or more host devices 106 via a network 104. Examples of client devices 102 may include, without limitation, smart phones, tablet computers, handheld computers, wearable devices, laptop computers, desktop computers, servers, portable media players, gaming devices, and so forth. In general, a client device 102 can provide access to different content, for instance, content provided by one or more host devices 106, etc. Each client device 102 may comprise one or more client applications 110, described in more detail in a separate section hereinafter.

2.3. Client Device Applications

In an embodiment, each client device 102 may host or execute one or more client applications 110 that are capable of interacting with one or more host devices 106 via one or more networks 104. For instance, a client application 110 may be or comprise a web browser that a user may use to navigate to one or more websites or other resources provided by one or more host devices 106. As another example, a client application 110 may comprise a mobile application or "app." For example, an operator of a network-based service hosted by one or more host devices 106 may make available one or more mobile apps that enable users of client devices 102 to access various resources of the network-based service. As yet another example, client applications 110 may include background processes that perform various operations without direct interaction from a user. A client application 110 may include a "plug-in" or "extension" to another application, such as a web browser plug-in or extension.

In an embodiment, a client application 110 may include a monitoring component 112. At a high level, the monitoring component 112 comprises a software component or other logic that facilitates generating performance data related to a client device's operating state, including monitoring network traffic sent and received from the client device and collecting other device and/or application-specific information. Monitoring component 112 may be an integrated component of a client application 110, a plug-in, an extension, or any other type of add-on component. Monitoring component 112 may also be a stand-alone process.

In one embodiment, a monitoring component 112 may be created when a client application 110 is developed, for example, by an application developer using a software development kit (SDK). The SDK may include custom monitoring code that can be incorporated into the code implementing a client application 110. When the code is converted to an executable application, the custom code implementing the monitoring functionality can become part of the application itself.

In some cases, an SDK or other code for implementing the monitoring functionality may be offered by a provider of a data intake and query system, such as a system 108. In such cases, the provider of the system 108 can implement the custom code so that performance data generated by the monitoring functionality is sent to the system 108 to facilitate analysis of the performance data by a developer of the client application or other users.

In an embodiment, the custom monitoring code may be incorporated into the code of a client application 110 in a number of different ways, such as the insertion of one or more lines in the client application code that call or otherwise invoke the monitoring component 112. As such, a developer of a client application 110 can add one or more lines of code into the client application 110 to trigger the monitoring component 112 at desired points during execution of the application. Code that triggers the monitoring component may be referred to as a monitor trigger. For instance, a monitor trigger may be included at or near the beginning of the executable code of the client application 110 such that the monitoring component 112 is initiated or triggered as the application is launched, or included at other points in the code that correspond to various actions of the client application, such as sending a network request or displaying a particular interface.

In an embodiment, the monitoring component 112 may monitor one or more aspects of network traffic sent and/or received by a client application 110. For example, the monitoring component 112 may be configured to monitor data packets transmitted to and/or from one or more host applications 114. Incoming and/or outgoing data packets can be read or examined to identify network data contained within the packets, for example, and other aspects of data packets can be analyzed to determine a number of network performance statistics. Monitoring network traffic may enable information to be gathered particular to the network performance associated with a client application 110 or set of applications.

In an embodiment, network performance data refers to any type of data that indicates information about the network and/or network performance. Network performance data may include, for instance, a URL requested, a connection type (e.g., HTTP, HTTPS, etc.), a connection start time, a connection end time, an HTTP status code, request length, response length, request headers, response headers, connection status (e.g., completion, response time(s), failure, etc.), and the like. Upon obtaining network performance data indicating performance of the network, the network performance data can be transmitted to a data intake and query system 108 for analysis.

Upon developing a client application 110 that incorporates a monitoring component 112, the client application 110 can be distributed to client devices 102. Applications generally can be distributed to client devices 102 in any manner, or they can be pre-loaded. In some cases, the application may be distributed to a client device 102 via an application marketplace or other application distribution system. For instance, an application marketplace or other application distribution system might distribute the application to a client device based on a request from the client device to download the application.

Examples of functionality that enables monitoring performance of a client device are described in U.S. patent application Ser. No. 14/524,748, entitled "UTILIZING PACKET HEADERS TO MONITOR NETWORK TRAFFIC IN ASSOCIATION WITH A CLIENT DEVICE", filed on 27 Oct. 2014, and which is hereby incorporated by reference in its entirety for all purposes.

In an embodiment, the monitoring component 112 may also monitor and collect performance data related to one or more aspects of the operational state of a client application 110 and/or client device 102. For example, a monitoring component 112 may be configured to collect device performance information by monitoring one or more client device operations, or by making calls to an operating system and/or one or more other applications executing on a client device 102 for performance information. Device performance information may include, for instance, a current wireless signal strength of the device, a current connection type and network carrier, current memory performance information, a geographic location of the device, a device orientation, and any other information related to the operational state of the client device.

In an embodiment, the monitoring component 112 may also monitor and collect other device profile information including, for example, a type of client device, a manufacturer and model of the device, versions of various software applications installed on the device, and so forth.

In general, a monitoring component 112 may be configured to generate performance data in response to a monitor trigger in the code of a client application 110 or other triggering application event, as described above, and to store the performance data in one or more data records. Each data record, for example, may include a collection of field-value pairs, each field-value pair storing a particular item of performance data in association with a field for the item. For example, a data record generated by a monitoring component 112 may include a "networkLatency" field (not shown in the Figure) in which a value is stored. This field indicates a network latency measurement associated with one or more network requests. The data record may include a "state" field to store a value indicating a state of a network connection, and so forth for any number of aspects of collected performance data.

2.4. Data Server System

Figure 2:
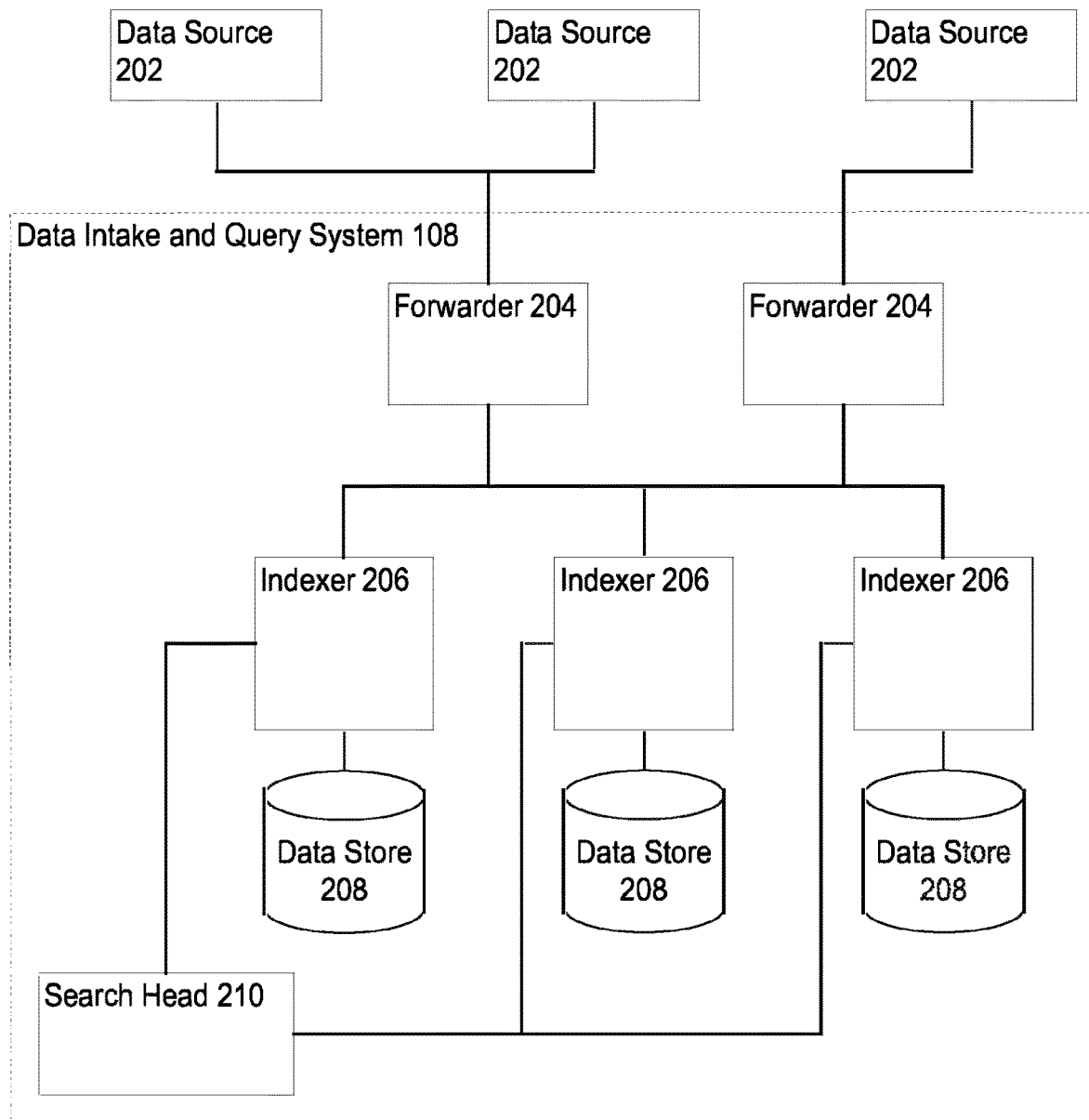
FIG. 2 illustrates a block diagram of an example data intake and query system in which an embodiment may be implemented.

FIG. 2 depicts a block diagram of an example data intake and query system 108, similar to the SPLUNK® ENTERPRISE system. System 108 includes one or more forwarders 204 that receive data from a variety of input data sources 202, and one or more indexers 206 that process and store the data in one or more data stores 208. These forwarders and indexers can comprise separate computer systems, or may alternatively comprise separate processes executing on one or more computer systems.

Each of the components of a system 108 (e.g., forwarders, indexers and search heads) may at times refer to various configuration files stored locally at each component. These configuration files typically may involve some level of user configuration to accommodate particular types of data a user desires to analyze and to account for other user preferences. Embodiments described herein provide a central repository for maintaining configuration files for the components of a system 108. Various components of a system 108 (e.g., search heads) are able to receive changes to the configuration files through a search head interface or a central management interface. Other components of a system 108 (e.g., indexers and forwarders) are able to receive changes to the configuration files from the central repository. Thus, the techniques and systems described herein for providing user interfaces that enable a user to configure source type definitions are applicable to both on-premises and cloud-based service contexts, or some combination thereof (e.g., a hybrid system where both an on-premises environment such as SPLUNK® ENTERPRISE and a cloud-based environment such as SPLUNK CLOUD™ are centrally visible).

Each data source 202 broadly represents a distinct source of data that can be consumed by a system 108. Examples of a data source 202 include, without limitation, data files, directories of files, data sent over a network, event logs, registries, etc.

During operation, the forwarders 204 identify which indexers 206 receive data collected from a data source 202 and forward the data to the appropriate indexers. Forwarders 204 can also perform operations on the data before forwarding, including removing extraneous data, detecting timestamps in the data, parsing data, indexing data, routing data based on criteria relating to the data being routed, and/or performing other data transformations.

In an embodiment, a forwarder 204 may comprise a service accessible to client devices 102 and host devices 106 via a network 104. For example, one type of forwarder 204 may be capable of consuming vast amounts of real-time data from a potentially large number of client devices 102 and/or host devices 106. The forwarder 204 may, for example, comprise a computing device which implements multiple data pipelines or "queues" to handle forwarding of network data to indexers 206. A forwarder 204 may also perform many of the functions that are performed by an indexer. For example, a forwarder 204 may perform keyword extractions on raw data or parse raw data to create events. A forwarder 204 may generate time stamps for events. Additionally or alternatively, a forwarder 204 may perform routing of events to indexers. Data store 208 may contain events derived from machine data from a variety of sources all pertaining to the same component in an IT environment, and this data may be produced by the machine in question or by other components in the IT environment.

2.5. Data Ingestion

Figure 3:
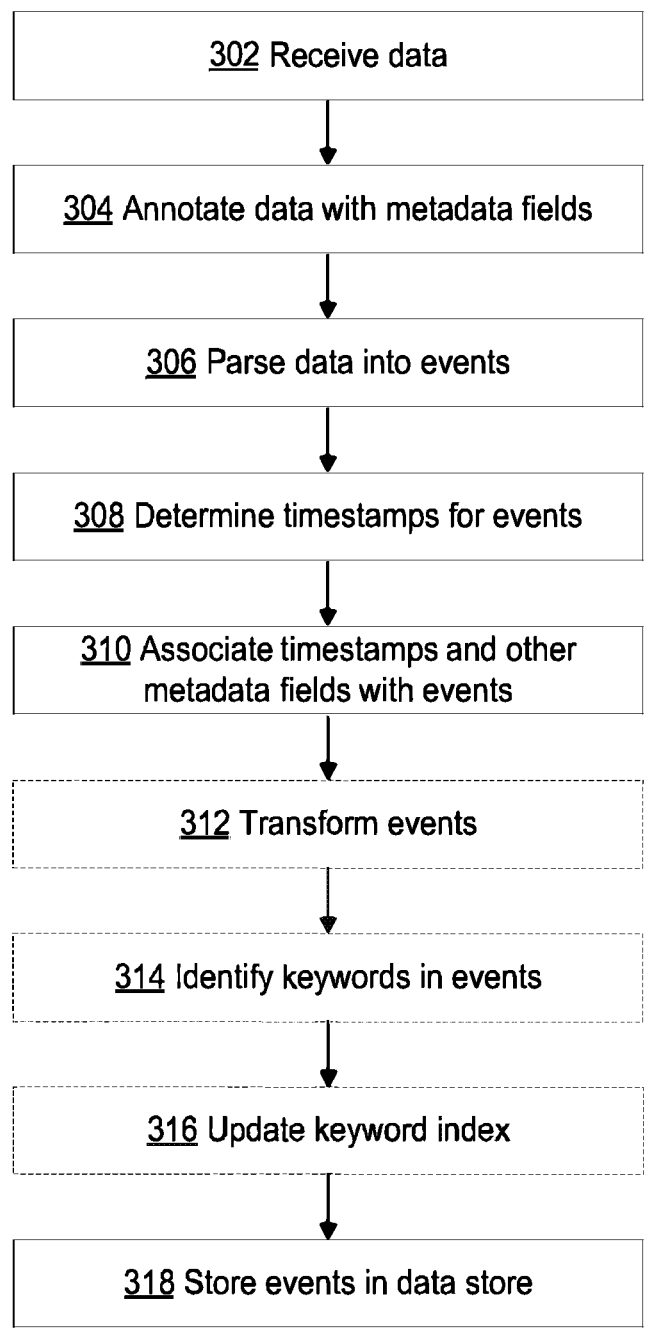
FIG. 3 is a flow diagram that illustrates how indexers process, index, and store data received from forwarders in accordance with the disclosed embodiments.

FIG. 3 depicts a flow chart illustrating an example data flow performed by Data Intake and Query system 108, in accordance with the disclosed embodiments. The data flow illustrated in FIG. 3 is provided for illustrative purposes only; those skilled in the art would understand that one or more of the steps of the processes illustrated in FIG. 3 may be removed or the ordering of the steps may be changed. Furthermore, for the purposes of illustrating a clear example, one or more particular system components are described in the context of performing various operations during each of the data flow stages. For example, a forwarder is described as receiving and processing data during an input phase; an indexer is described as parsing and indexing data during parsing and indexing phases; and a search head is described as performing a search query during a search phase. However, other system arrangements and distributions of the processing steps across system components may be used.

2.5.1. Input

At block 302, a forwarder receives data from an input source, such as a data source 202 shown in FIG. 2. A forwarder initially may receive the data as a raw data stream generated by the input source. For example, a forwarder may receive a data stream from a log file generated by an application server, from a stream of network data from a network device, or from any other source of data. In one embodiment, a forwarder receives the raw data and may segment the data stream into "blocks", or "buckets," possibly of a uniform data size, to facilitate subsequent processing steps.

At block 304, a forwarder or other system component annotates each block generated from the raw data with one or more metadata fields. These metadata fields may, for example, provide information related to the data block as a whole and may apply to each event that is subsequently derived from the data in the data block. For example, the metadata fields may include separate fields specifying each of a host, a source, and a source type related to the data block. A host field may contain a value identifying a host name or IP address of a device that generated the data. A source field may contain a value identifying a source of the data, such as a pathname of a file or a protocol and port related to received network data. A source type field may contain a value specifying a particular source type label for the data. Additional metadata fields may also be included during the input phase, such as a character encoding of the data, if known, and possibly other values that provide information relevant to later processing steps. In an embodiment, a forwarder forwards the annotated data blocks to another system component (typically an indexer) for further processing.

The SPLUNK® ENTERPRISE system allows forwarding of data from one SPLUNK® ENTERPRISE instance to another, or even to a third-party system. SPLUNK® ENTERPRISE system can employ different types of forwarders in a configuration.

In an embodiment, a forwarder may contain the essential components needed to forward data. It can gather data from a variety of inputs and forward the data to a SPLUNK® ENTERPRISE server for indexing and searching. It also can tag metadata (e.g., source, source type, host, etc.).

Additionally or optionally, in an embodiment, a forwarder has the capabilities of the aforementioned forwarder as well as additional capabilities. The forwarder can parse data before forwarding the data (e.g., associate a time stamp with a portion of data and create an event, etc.) and can route data based on criteria such as source or type of event. It can also index data locally while forwarding the data to another indexer.

2.5.2. Parsing

At block 306, an indexer receives data blocks from a forwarder and parses the data to organize the data into events. In an embodiment, to organize the data into events, an indexer may determine a source type associated with each data block (e.g., by extracting a source type label from the metadata fields associated with the data block, etc.) and refer to a source type configuration corresponding to the identified source type. The source type definition may include one or more properties that indicate to the indexer to automatically determine the boundaries of events within the data. In general, these properties may include regular expression-based rules or delimiter rules where, for example, event boundaries may be indicated by predefined characters or character strings. These predefined characters may include punctuation marks or other special characters including, for example, carriage returns, tabs, spaces, line breaks, etc. If a source type for the data is unknown to the indexer, an indexer may infer a source type for the data by examining the structure of the data. Then, it can apply an inferred source type definition to the data to create the events.

At block 308, the indexer determines a timestamp for each event. Similar to the process for creating events, an indexer may again refer to a source type definition associated with the data to locate one or more properties that indicate instructions for determining a timestamp for each event. The properties may, for example, instruct an indexer to extract a time value from a portion of data in the event, to interpolate time values based on timestamps associated with temporally proximate events, to create a timestamp based on a time the event data was received or generated, to use the timestamp of a previous event, or use any other rules for determining timestamps.

At block 310, the indexer associates with each event one or more metadata fields including a field containing the timestamp (in some embodiments, a timestamp may be included in the metadata fields) determined for the event. These metadata fields may include a number of "default fields" that are associated with all events, and may also include one more custom fields as defined by a user. Similar to the metadata fields associated with the data blocks at block 304, the default metadata fields associated with each event may include a host, source, and source type field including or in addition to a field storing the timestamp.

At block 312, an indexer may optionally apply one or more transformations to data included in the events created at block 306. For example, such transformations can include removing a portion of an event (e.g., a portion used to define event boundaries, extraneous characters from the event, other extraneous text, etc.), masking a portion of an event (e.g., masking a credit card number), removing redundant portions of an event, etc. The transformations applied to event data may, for example, be specified in one or more configuration files and referenced by one or more source type definitions.

2.5.3. Indexing

At blocks 314 and 316, an indexer can optionally generate a keyword index to facilitate fast keyword searching for event data. To build a keyword index, at block 314, the indexer identifies a set of keywords in each event. At block 316, the indexer includes the identified keywords in an index, which associates each stored keyword with reference pointers to events containing that keyword (or to locations within events where that keyword is located, other location identifiers, etc.). When an indexer subsequently receives a keyword-based query, the indexer can access the keyword index to quickly identify events containing the keyword.

In some embodiments, the keyword index may include entries for name-value pairs found in events, where a name-value pair can include a pair of keywords connected by a symbol, such as an equals sign or colon. This way, events containing these name-value pairs can be quickly located. In some embodiments, fields can automatically be generated for some or all of the name-value pairs at the time of indexing. For example, if the string "dest=10.0.1.2" is found in an event, a field named "dest" may be created for the event, and assigned a value of "10.0.1.2".

At block 318, the indexer stores the events with an associated timestamp in a data store 208. Timestamps enable a user to search for events based on a time range. In one embodiment, the stored events are organized into "buckets," where each bucket stores events associated with a specific time range based on the timestamps associated with each event. This may not only improve time-based searching, but also allows for events with recent timestamps, which may have a higher likelihood of being accessed, to be stored in a faster memory to facilitate faster retrieval. For example, buckets containing the most recent events can be stored in flash memory rather than on a hard disk.

Each indexer 206 may be responsible for storing and searching a subset of the events contained in a corresponding data store 208. By distributing events among the indexers and data stores, the indexers can analyze events for a query in parallel. For example, using map-reduce techniques, each indexer returns partial responses for a subset of events to a search head that combines the results to produce an answer for the query. By storing events in buckets for specific time ranges, an indexer may further optimize data retrieval process by searching buckets corresponding to time ranges that are relevant to a query.

Moreover, events and buckets can also be replicated across different indexers and data stores to facilitate high availability and disaster recovery as described in U.S. patent application Ser. No. 14/266,812, entitled "SITE-BASED SEARCH AFFINITY", filed on 30 Apr. 2014, and in U.S. patent application Ser. No. 14/266,817, entitled "MULTI-SITE CLUSTERING", also filed on 30 Apr. 2014, each of which is hereby incorporated by reference in its entirety for all purposes.

2.6. Query Processing

Figure 4:
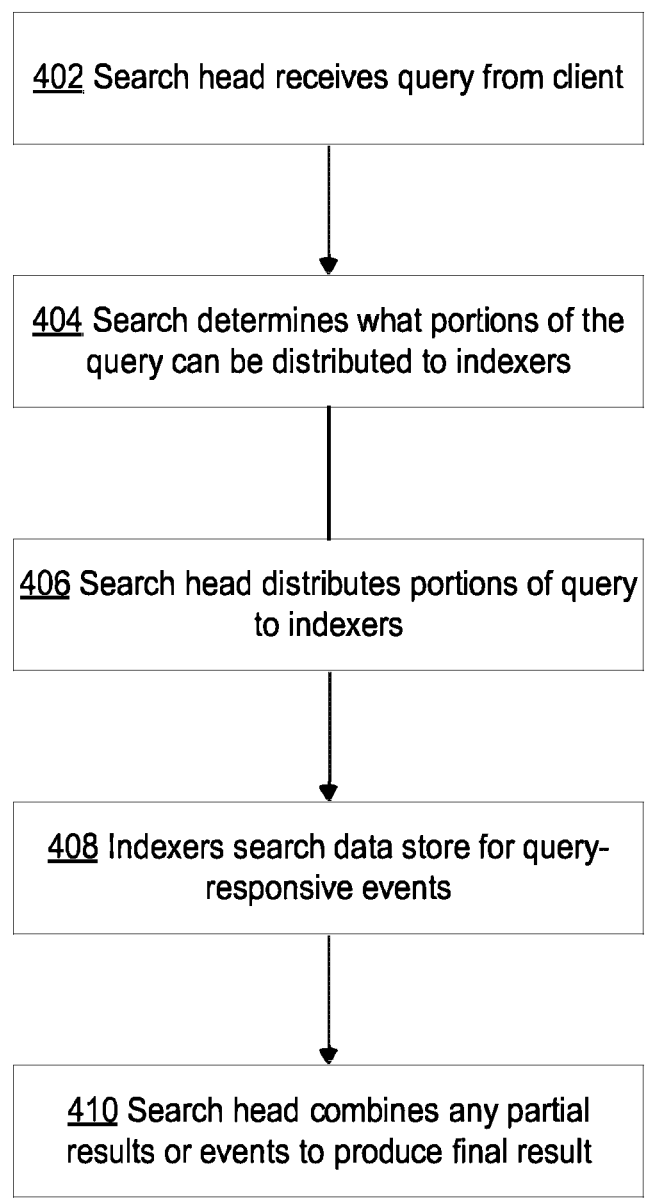
FIG. 4 is a flow diagram that illustrates how a search head and indexers perform a search query in accordance with the disclosed embodiments.

FIG. 4 is a flow diagram that illustrates an example process that a search head and one or more indexers may perform during a search query. At block 402, a search head receives a search query from a client. At block 404, the search head analyzes the search query to determine what portion(s) of the query can be delegated to indexers and what portions of the query can be executed locally by the search head. At block 406, the search head distributes the determined portions of the query to the appropriate indexers. In an embodiment, a search head cluster may take the place of an independent search head where each search head in the search head cluster coordinates with peer search heads in the search head cluster to schedule jobs, replicate search results, update configurations, fulfill search requests, etc. In an embodiment, the search head (or each search head) communicates with a master node (also known as a cluster master, not shown in FIGURE) that provides the search head with a list of indexers to which the search head can distribute the determined portions of the query. The master node maintains a list of active indexers and can also designate which indexers may have responsibility for responding to queries over certain sets of events. A search head may communicate with the master node before the search head distributes queries to indexers to discover the addresses of active indexers.

At block 408, the indexers to which the query was distributed, search data stores associated with them for events that are responsive to the query. To determine which events are responsive to the query, the indexer searches for events that match the criteria specified in the query. These criteria can include matching keywords or specific values for certain fields. The searching operations at block 408 may use the late-binding schema to extract values for specified fields from events at the time the query is processed. In an embodiment, one or more rules for extracting field values may be specified as part of a source type definition. The indexers may then either send the relevant events back to the search head, or use the events to determine a partial result, and send the partial result back to the search head.

At block 410, the search head combines the partial results and/or events received from the indexers to produce a final result for the query. This final result may comprise different types of data depending on what the query requested. For example, the results can include a listing of matching events returned by the query, or some type of visualization of the data from the returned events. In another example, the final result can include one or more calculated values derived from the matching events.

The results generated by the system 108 can be returned to a client using different techniques. For example, one technique streams results or relevant events back to a client in real-time as they are identified. Another technique waits to report the results to the client until a complete set of results (which may include a set of relevant events or a result based on relevant events) is ready to return to the client. Yet another technique streams interim results or relevant events back to the client in real-time until a complete set of results is ready, and then returns the complete set of results to the client. In another technique, certain results are stored as "search jobs" and the client may retrieve the results by referring the search jobs.

The search head can also perform various operations to make the search more efficient. For example, before the search head begins execution of a query, the search head can determine a time range for the query and a set of common keywords that all matching events include. The search head may then use these parameters to query the indexers to obtain a superset of the eventual results. Then, during a filtering stage, the search head can perform field-extraction operations on the superset to produce a reduced set of search results. This speeds up queries that are performed on a periodic basis.

2.7. Field Extraction

The search head 210 allows users to search and visualize event data extracted from raw machine data received from homogenous data sources. It also allows users to search and visualize event data extracted from raw machine data received from heterogeneous data sources. The search head 210 includes various mechanisms, which may additionally reside in an indexer 206, for processing a query. Splunk Processing Language (SPL), used in conjunction with the SPLUNK® ENTERPRISE system, can be utilized to make a query. SPL is a pipelined search language in which a set of inputs is operated on by a first command in a command line, and then a subsequent command following the pipe symbol "1" operates on the results produced by the first command, and so on for additional commands. Other query languages, such as the Structured Query Language ("SQL"), can be used to create a query.

In response to receiving the search query, search head 210 uses extraction rules to extract values for the fields associated with a field or fields in the event data being searched. The search head 210 obtains extraction rules that specify how to extract a value for certain fields from an event. Extraction rules can comprise regex rules that specify how to extract values for the relevant fields. In addition to specifying how to extract field values, the extraction rules may also include instructions for deriving a field value by performing a function on a character string or value retrieved by the extraction rule. For example, a transformation rule may truncate a character string, or convert the character string into a different data format. In some cases, the query itself can specify one or more extraction rules.

The search head 210 can apply the extraction rules to event data that it receives from indexers 206. Indexers 206 may apply the extraction rules to events in an associated data store 208. Extraction rules can be applied to all the events in a data store, or to a subset of the events that have been filtered based on some criteria (e.g., event time stamp values, etc.). Extraction rules can be used to extract one or more values for a field from events by parsing the event data and examining the event data for one or more patterns of characters, numbers, delimiters, etc., that indicate where the field begins and, optionally, ends.

Figure 5:
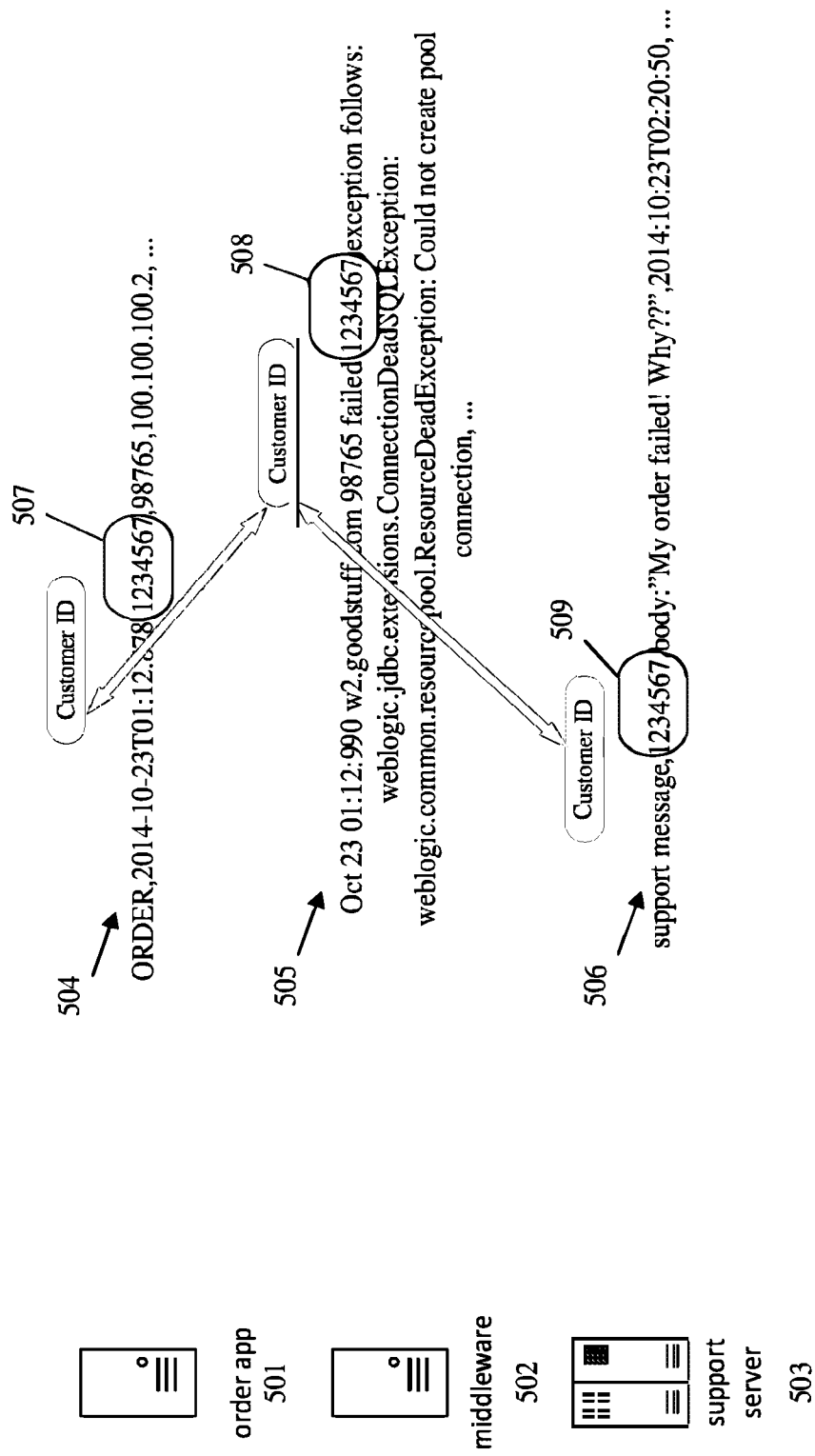
FIG. 5 illustrates a scenario where a common customer ID is found among log data received from three disparate sources in accordance with the disclosed embodiments.

FIG. 5 illustrates an example of raw machine data received from disparate data sources. In this example, a user submits an order for merchandise using a vendor's shopping application program 501 running on the user's system. In this example, the order was not delivered to the vendor's server due to a resource exception at the destination server that is detected by the middleware code 502. The user then sends a message to the customer support 503 to complain about the order failing to complete. The three systems 501, 502, and 503 are disparate systems that do not have a common logging format. The order application 501 sends log data 504 to the SPLUNK® ENTERPRISE system in one format, the middleware code 502 sends error log data 505 in a second format, and the support server 503 sends log data 506 in a third format.

Using the log data received at one or more indexers 206 from the three systems the vendor can uniquely obtain an insight into user activity, user experience, and system behavior. The search head 210 allows the vendor's administrator to search the log data from the three systems that one or more indexers 206 are responsible for searching, thereby obtaining correlated information, such as the order number and corresponding customer ID number of the person placing the order. The system also allows the administrator to see a visualization of related events via a user interface. The administrator can query the search head 210 for customer ID field value matches across the log data from the three systems that are stored at the one or more indexers 206. The customer ID field value exists in the data gathered from the three systems, but the customer ID field value may be located in different areas of the data given differences in the architecture of the systems—there is a semantic relationship between the customer ID field values generated by the three systems. The search head 210 requests event data from the one or more indexers 206 to gather relevant event data from the three systems. It then applies extraction rules to the event data in order to extract field values that it can correlate. The search head may apply a different extraction rule to each set of events from each system when the event data format differs among systems. In this example, the user interface can display to the administrator the event data corresponding to the common customer ID field values 507, 508, and 509, thereby providing the administrator with insight into a customer's experience.

Note that query results can be returned to a client, a search head, or any other system component for further processing. In general, query results may include a set of one or more events, a set of one or more values obtained from the events, a subset of the values, statistics calculated based on the values, a report containing the values, or a visualization, such as a graph or chart, generated from the values.

2.8. Example Search Screen

Figure 6A:
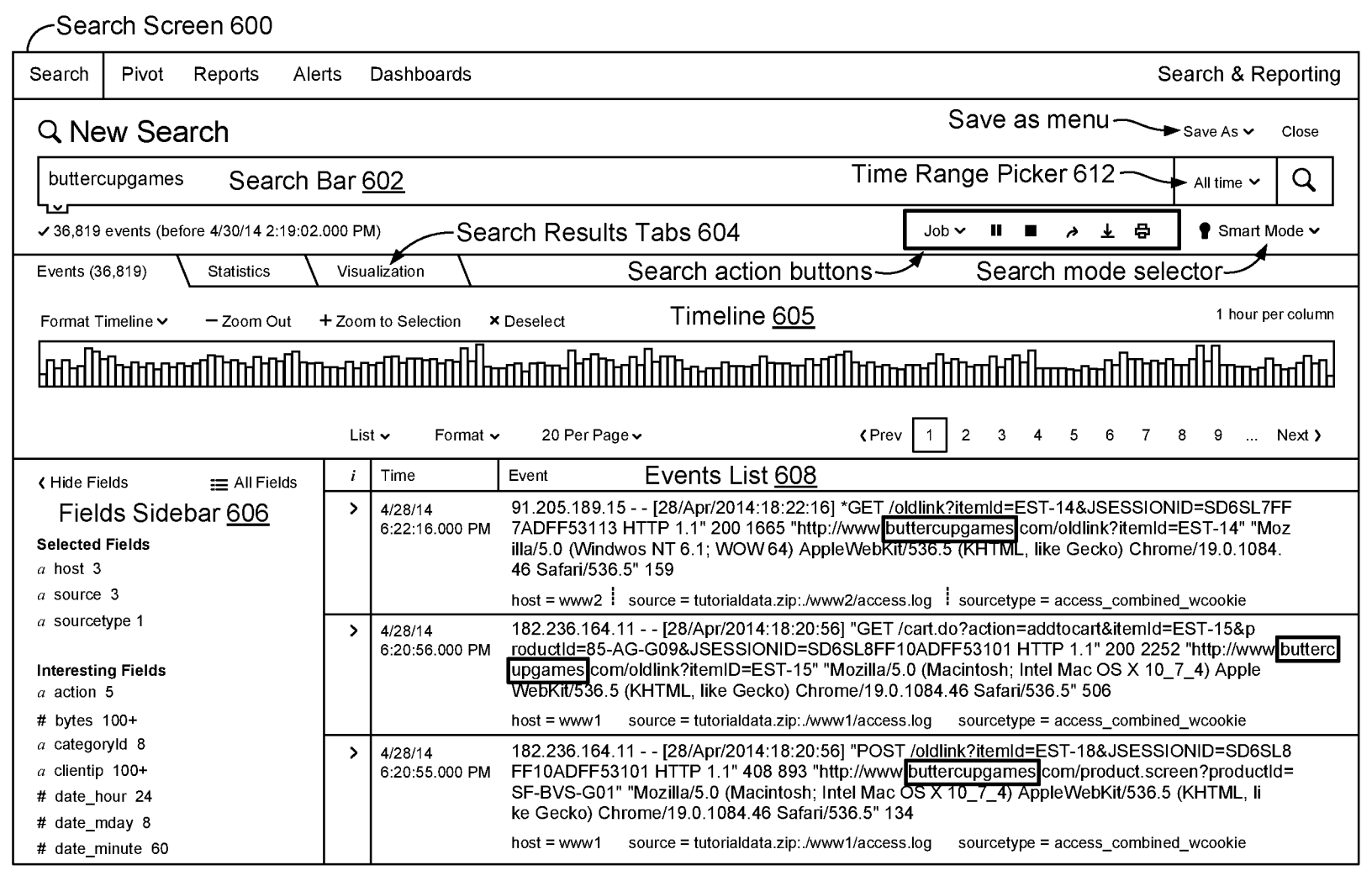

FIG. 6A illustrates an example search screen 600 in accordance with the disclosed embodiments. Search screen 600 includes a search bar 602 that accepts user input in the form of a search string. It also includes a time range picker 612 that enables the user to specify a time range for the search. For "historical searches" the user can select a specific time range, or alternatively a relative time range, such as "today," "yesterday" or "last week." For "real-time searches," the user can select the size of a preceding time window to search for real-time events. Search screen 600 also initially displays a "data summary" dialog as is illustrated in FIG. 6B that enables the user to select different sources for the event data, such as by selecting specific hosts and log files.

After the search is executed, the search screen 600 in FIG. 6A can display the results through search results tabs 604, wherein search results tabs 604 includes: an "events tab" that displays various information about events returned by the search; a "statistics tab" that displays statistics about the search results; and a "visualization tab" that displays various visualizations of the search results. The events tab illustrated in FIG. 6A displays a timeline graph 605 that graphically illustrates the number of events that occurred in one-hour intervals over the selected time range. It also displays an events list 608 that enables a user to view the raw data in each of the returned events. It additionally displays a fields sidebar 606 that includes statistics about occurrences of specific fields in the returned events, including "selected fields" that are pre-selected by the user, and "interesting fields" that are automatically selected by the system based on pre-specified criteria.

2.9. Data Models

A data model is a hierarchically structured search-time mapping of semantic knowledge about one or more datasets. It encodes the domain knowledge necessary to build a variety of specialized searches of those datasets. Those searches, in turn, can be used to generate reports.

A data model is composed of one or more "objects" (or "data model objects") that define or otherwise correspond to a specific set of data.

Objects in data models can be arranged hierarchically in parent/child relationships. Each child object represents a subset of the dataset covered by its parent object. The top-level objects in data models are collectively referred to as "root objects."

Child objects have inheritance. Data model objects are defined by characteristics that mostly break down into constraints and attributes. Child objects inherit constraints and attributes from their parent objects and have additional constraints and attributes of their own. Child objects provide a way of filtering events from parent objects. Because a child object always provides an additional constraint in addition to the constraints it has inherited from its parent object, the dataset it represents is always a subset of the dataset that its parent represents.

For example, a first data model object may define a broad set of data pertaining to e-mail activity generally, and another data model object may define specific datasets within the broad dataset, such as a subset of the e-mail data pertaining specifically to e-mails sent. Examples of data models can include electronic mail, authentication, databases, intrusion detection, malware, application state, alerts, compute inventory, network sessions, network traffic, performance, audits, updates, vulnerabilities, etc. Data models and their objects can be designed by knowledge managers in an organization, and they can enable downstream users to quickly focus on a specific set of data. For example, a user can simply select an "e-mail activity" data model object to access a dataset relating to e-mails generally (e.g., sent or received), or select an "e-mails sent" data model object (or data sub-model object) to access a dataset relating to e-mails sent.

A data model object may be defined by (1) a set of search constraints, and (2) a set of fields. Thus, a data model object can be used to quickly search data to identify a set of events and to identify a set of fields to be associated with the set of events. For example, an "e-mails sent" data model object may specify a search for events relating to e-mails that have been sent, and specify a set of fields that are associated with the events. Thus, a user can retrieve and use the "e-mails sent" data model object to quickly search source data for events relating to sent e-mails, and may be provided with a listing of the set of fields relevant to the events in a user interface screen.

A child of the parent data model may be defined by a search (typically a narrower search) that produces a subset of the events that would be produced by the parent data model's search. The child's set of fields can include a subset of the set of fields of the parent data model and/or additional fields. Data model objects that reference the subsets can be arranged in a hierarchical manner, so that child subsets of events are proper subsets of their parents. A user iteratively applies a model development tool (not shown in FIGURE) to prepare a query that defines a subset of events and assigns an object name to that subset. A child subset is created by further limiting a query that generated a parent subset. A late-binding schema of field extraction rules is associated with each object or subset in the data model.

Data definitions in associated schemas can be taken from the common information model (CIM) or can be devised for a particular schema and optionally added to the CIM. Child objects inherit fields from parents and can include fields not present in parents. A model developer can select fewer extraction rules than are available for the sources returned by the query that defines events belonging to a model. Selecting a limited set of extraction rules can be a tool for simplifying and focusing the data model, while allowing a user flexibility to explore the data subset. Development of a data model is further explained in U.S. Pat. Nos. 8,788,525 and 8,788,526, both entitled "DATA MODEL FOR MACHINE DATA FOR SEMANTIC SEARCH", both issued on 22 Jul. 2014, U.S. Pat. No. 8,983,994, entitled "GENERATION OF A DATA MODEL FOR SEARCHING MACHINE DATA", issued on 17 Mar. 2015, U.S. patent application Ser. No. 14/611,232, entitled "GENERATION OF A DATA MODEL APPLIED TO QUERIES", filed on 31 Jan. 2015, and U.S. patent application Ser. No. 14/815,884, entitled "GENERATION OF A DATA MODEL APPLIED TO OBJECT QUERIES", filed on 31 Jul. 2015, each of which is hereby incorporated by reference in its entirety for all purposes. See, also, Knowledge Manager Manual, Build a Data Model, Splunk Enterprise 6.1.3 pp. 150-204 (Aug. 25, 2014).

A data model can also include reports. One or more report formats can be associated with a particular data model and be made available to run against the data model. A user can use child objects to design reports with object datasets that already have extraneous data pre-filtered out. In an embodiment, the data intake and query system 108 provides the user with the ability to produce reports (e.g., a table, chart, visualization, etc.) without having to enter SPL, SQL, or other query language terms into a search screen. Data models are used as the basis for the search feature.

Data models may be selected in a report generation interface. The report generator supports drag-and-drop organization of fields to be summarized in a report. When a model is selected, the fields with available extraction rules are made available for use in the report. The user may refine and/or filter search results to produce more precise reports. The user may select some fields for organizing the report and select other fields for providing detail according to the report organization. For example, "region" and "salesperson" are fields used for organizing the report and sales data can be summarized (subtotaled and totaled) within this organization. The report generator allows the user to specify one or more fields within events and apply statistical analysis on values extracted from the specified one or more fields. The report generator may aggregate search results across sets of events and generate statistics based on aggregated search results. Building reports using the report generation interface is further explained in U.S. patent application Ser. No. 14/503,335, entitled "GENERATING REPORTS FROM UNSTRUCTURED DATA", filed on 30 Sep. 2014, and which is hereby incorporated by reference in its entirety for all purposes, and in Pivot Manual, Splunk Enterprise 6.1.3 (Aug. 4, 2014). Data visualizations also can be generated in a variety of formats, by reference to the data model. Reports, data visualizations, and data model objects can be saved and associated with the data model for future use. The data model object may be used to perform searches of other data.

FIGS. 12, 13, and 7A-7D illustrate a series of user interface screens where a user may select report generation options using data models. The report generation process may be driven by a predefined data model object, such as a data model object defined and/or saved via a reporting application or a data model object obtained from another source. A user can load a saved data model object using a report editor. For example, the initial search query and fields used to drive the report editor may be obtained from a data model object. The data model object that is used to drive a report generation process may define a search and a set of fields. Upon loading of the data model object, the report generation process may enable a user to use the fields (e.g., the fields defined by the data model object) to define criteria for a report (e.g., filters, split rows/columns, aggregates, etc.) and the search may be used to identify events (e.g., to identify events responsive to the search) used to generate the report. That is, for example, if a data model object is selected to drive a report editor, the graphical user interface of the report editor may enable a user to define reporting criteria for the report using the fields associated with the selected data model object, and the events used to generate the report may be constrained to the events that match, or otherwise satisfy, the search constraints of the selected data model object.

Figure 12:
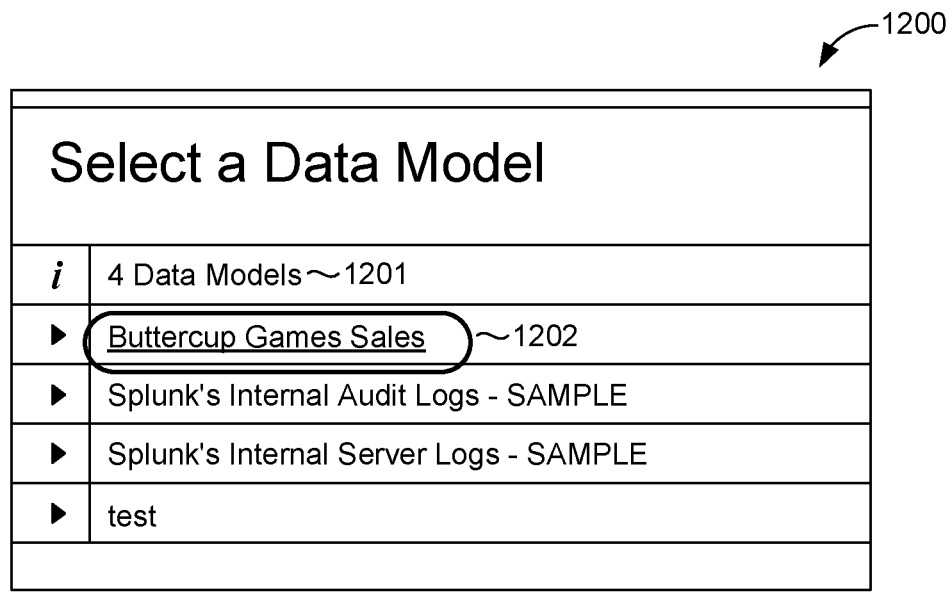
FIGS. 12-14 illustrate a series of user interface screens for an example data model-driven report generation interface in accordance with the disclosed embodiments.

The selection of a data model object for use in driving a report generation may be facilitated by a data model object selection interface. FIG. 12 illustrates an example interactive data model selection graphical user interface 1200 of a report editor that displays a listing of available data models 1201. The user may select one of the data models 1202.

Figure 13:
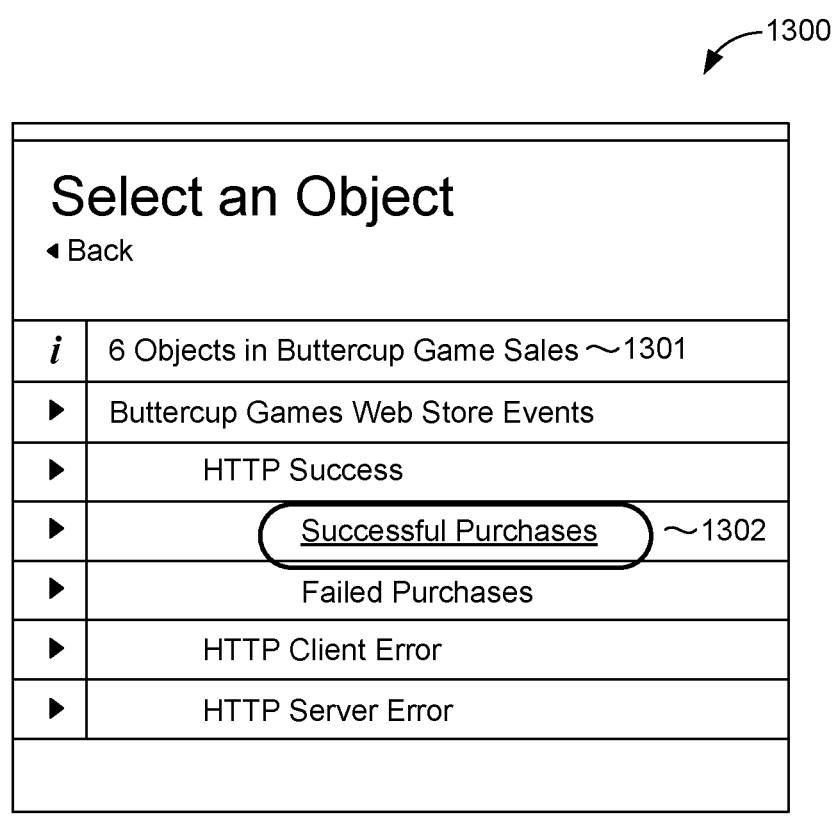

FIG. 13 illustrates an example data model object selection graphical user interface 1300 that displays available data objects 1301 for the selected data object model 1202. The user may select one of the displayed data model objects 1302 for use in driving the report generation process.

Figure 7A:
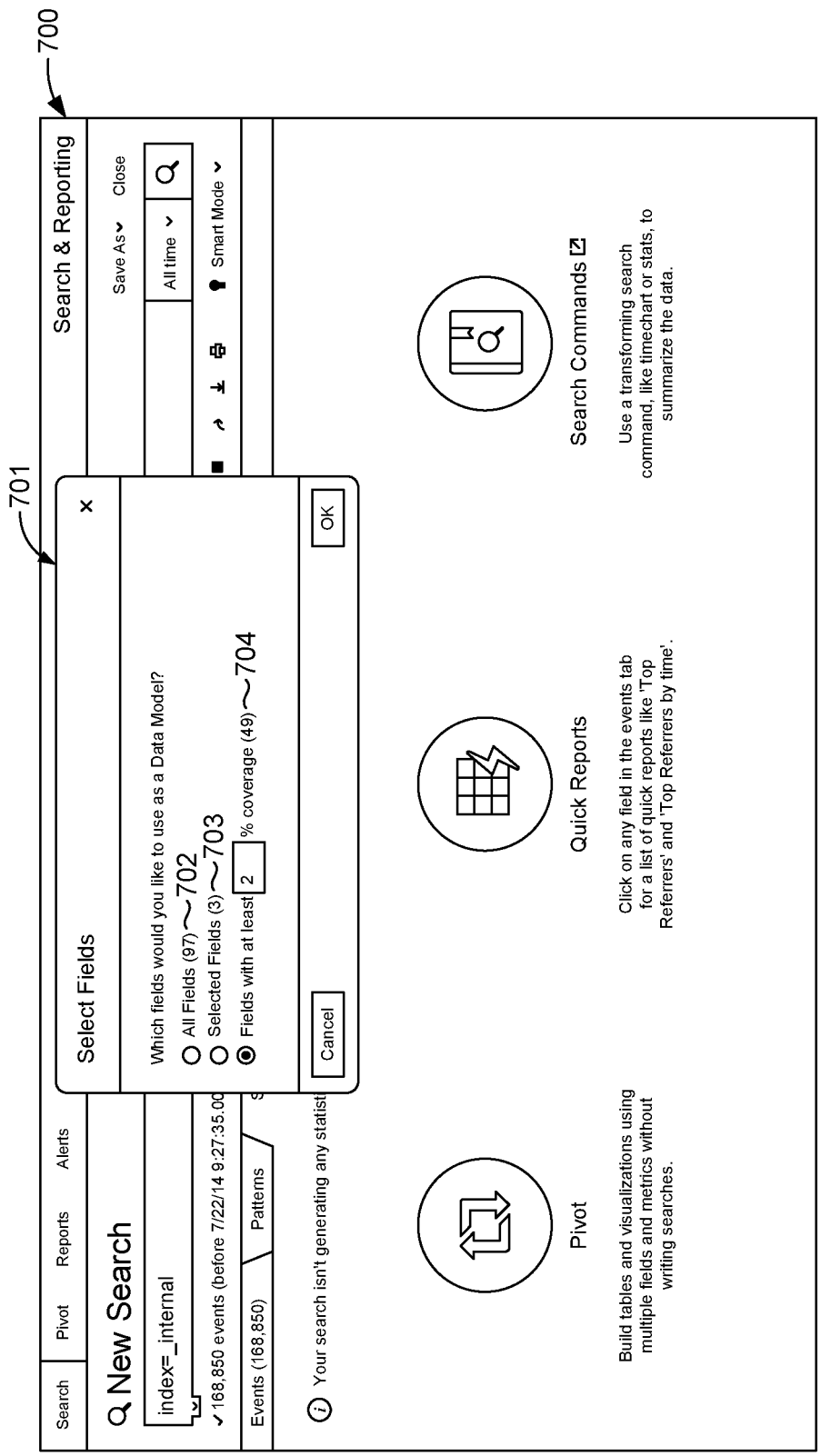
FIGS. 7A-7D illustrate a series of user interface screens for an example data model-driven report generation interface in accordance with the disclosed embodiments.

Once a data model object is selected by the user, a user interface screen 700 shown in FIG. 7A may display an interactive listing of automatic field identification options 701 based on the selected data model object. For example, a user may select one of the three illustrated options (e.g., the "All Fields" option 702, the "Selected Fields" option 703, or the "Coverage" option (e.g., fields with at least a specified % of coverage) 704). If the user selects the "All Fields" option 702, all of the fields identified from the events that were returned in response to an initial search query may be selected. That is, for example, all of the fields of the identified data model object fields may be selected. If the user selects the "Selected Fields" option 703, only the fields from the fields of the identified data model object fields that are selected by the user may be used. If the user selects the "Coverage" option 704, only the fields of the identified data model object fields meeting a specified coverage criteria may be selected. A percent coverage may refer to the percentage of events returned by the initial search query that a given field appears in. Thus, for example, if an object dataset includes 10,000 events returned in response to an initial search query, and the "avg_age" field appears in 854 of those 10,000 events, then the "avg_age" field would have a coverage of 8.54% for that object dataset. If, for example, the user selects the "Coverage" option and specifies a coverage value of 2%, only fields having a coverage value equal to or greater than 2% may be selected. The number of fields corresponding to each selectable option may be displayed in association with each option. For example, "97" displayed next to the "All Fields" option 702 indicates that 97 fields will be selected if the "All Fields" option is selected. The "3" displayed next to the "Selected Fields" option 703 indicates that 3 of the 97 fields will be selected if the "Selected Fields" option is selected. The "49" displayed next to the "Coverage" option 704 indicates that 49 of the 97 fields (e.g., the 49 fields having a coverage of 2% or greater) will be selected if the "Coverage" option is selected. The number of fields corresponding to the "Coverage" option may be dynamically updated based on the specified percent of coverage.

Figure 7B:
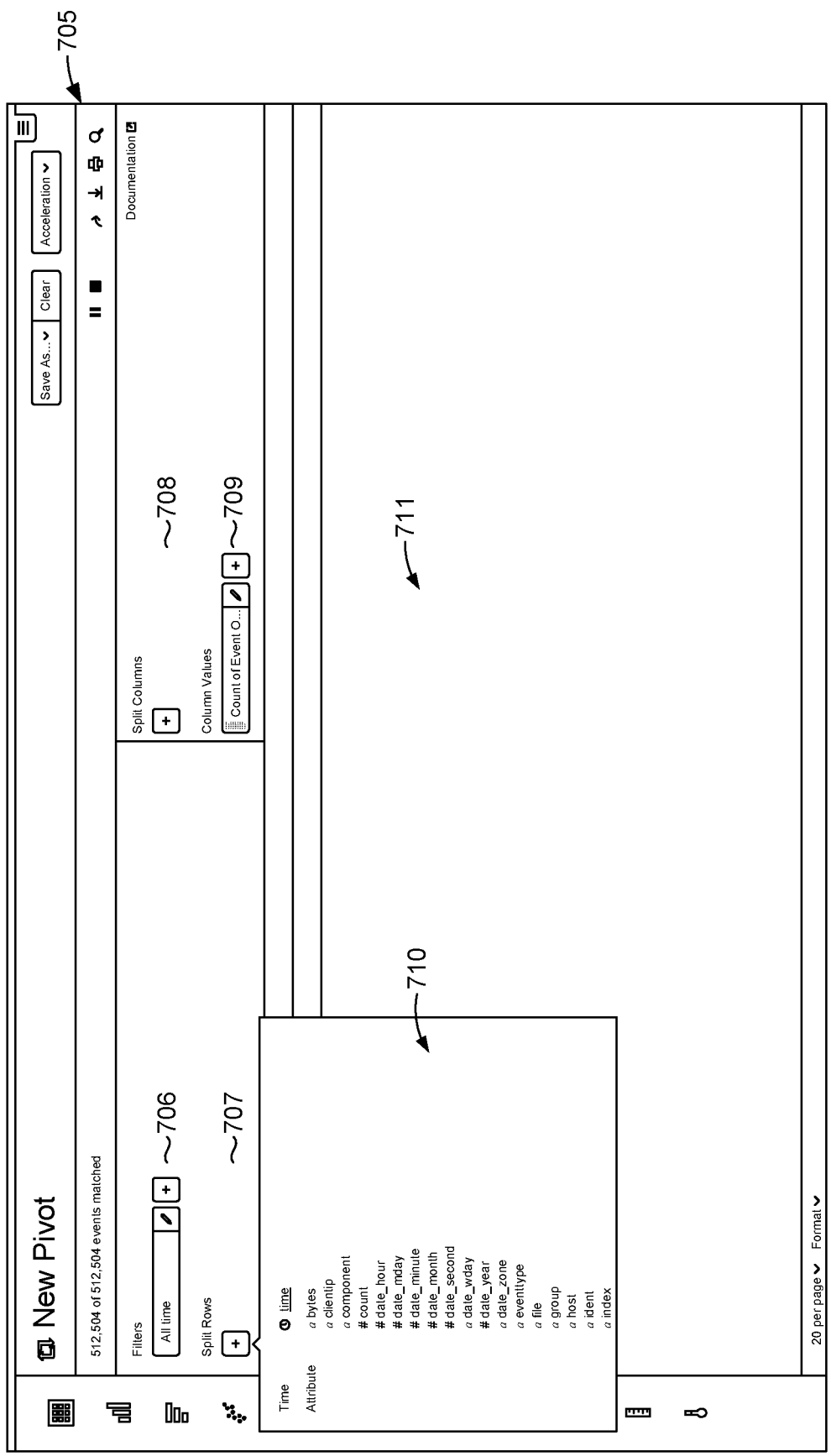
Figure 7C:
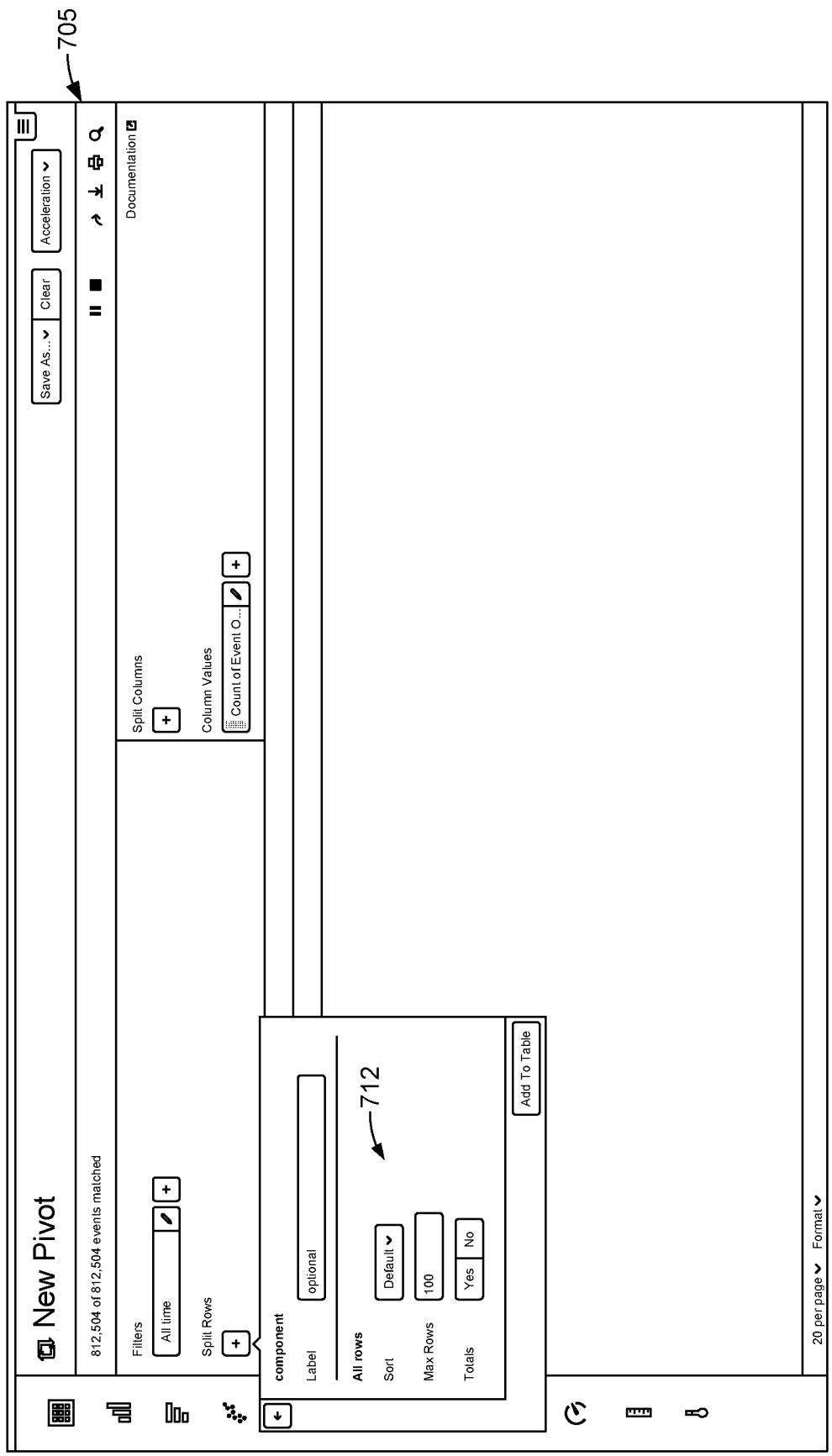

FIG. 7B illustrates an example graphical user interface screen (also called the pivot interface) 705 displaying the reporting application's "Report Editor" page. The screen may display interactive elements for defining various elements of a report. For example, the page includes a "Filters" element 706, a "Split Rows" element 707, a "Split Columns" element 708, and a "Column Values" element 709. The page may include a list of search results 711. In this example, the Split Rows element 707 is expanded, revealing a listing of fields 710 that can be used to define additional criteria (e.g., reporting criteria). The listing of fields 710 may correspond to the selected fields (attributes). That is, the listing of fields 710 may list only the fields previously selected, either automatically and/or manually by a user. FIG. 7C illustrates a formatting dialogue 712 that may be displayed upon selecting a field from the listing of fields 710. The dialogue can be used to format the display of the results of the selection (e.g., label the column to be displayed as "component").

Figure 7D:
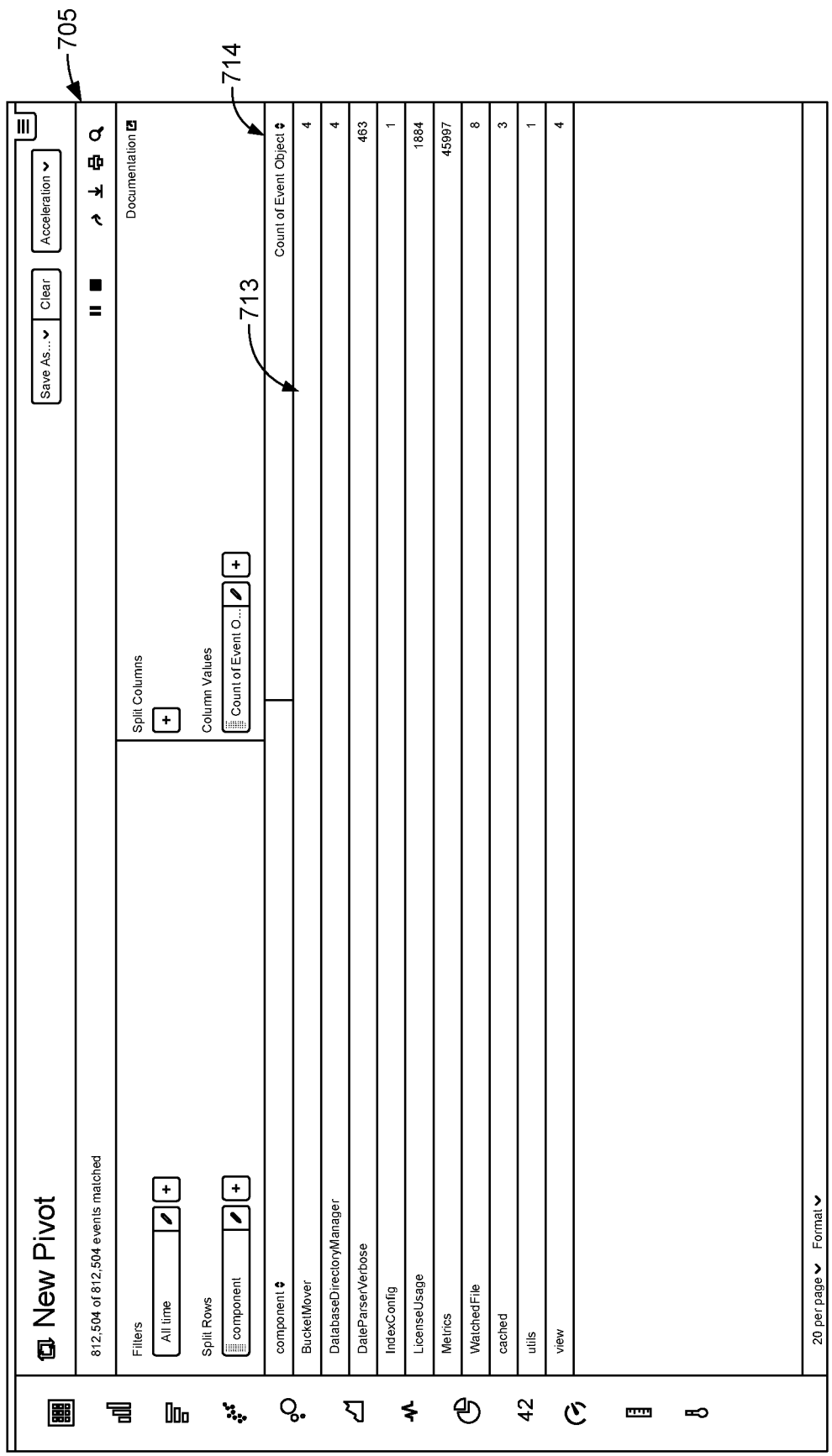

FIG. 7D illustrates an example graphical user interface screen 705 including a table of results 713 based on the selected criteria including splitting the rows by the "component" field. A column 714 having an associated count for each component listed in the table may be displayed that indicates an aggregate count of the number of times that the particular field-value pair (e.g., the value in a row) occurs in the set of events responsive to the initial search query.

Figure 14:
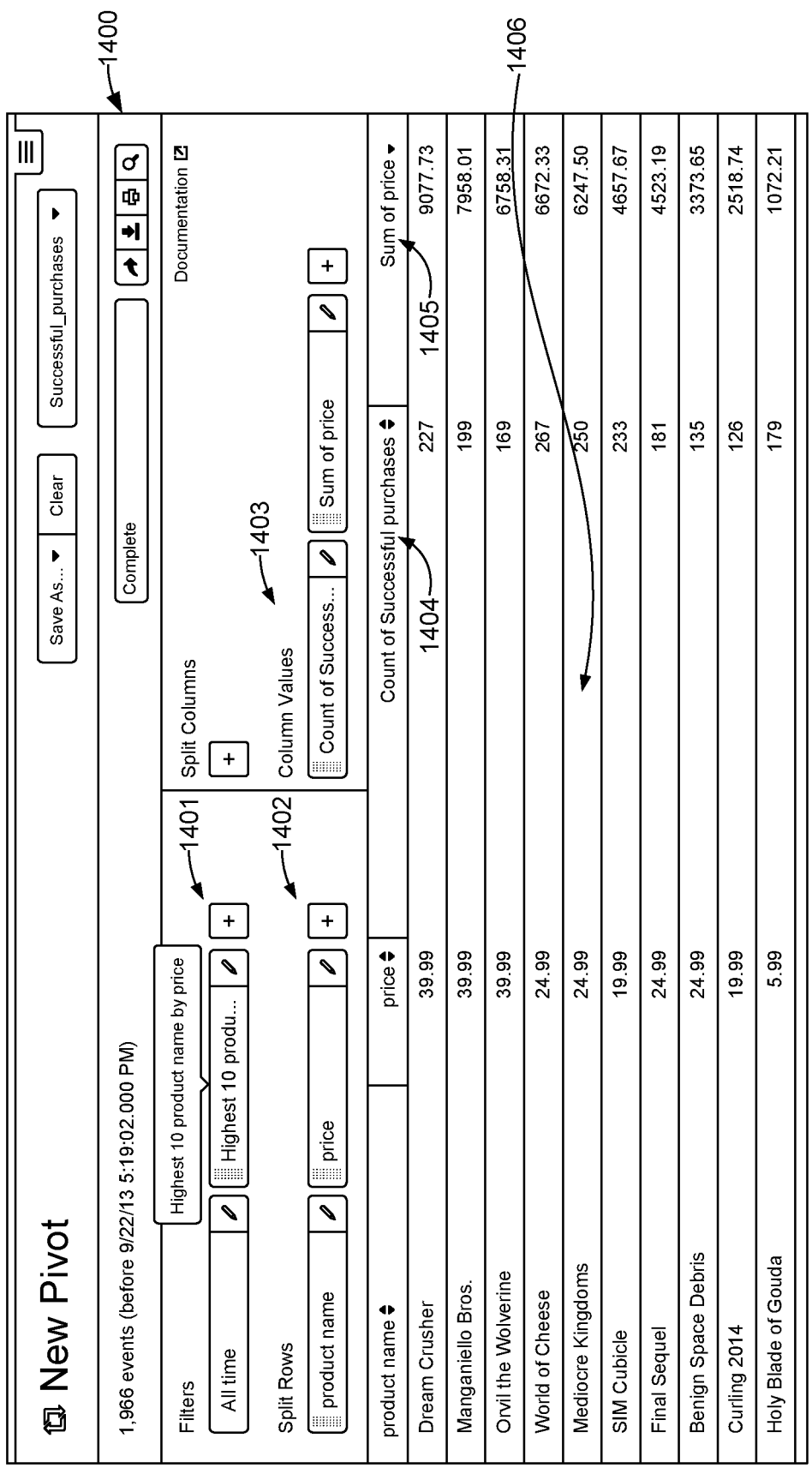

FIG. 14 illustrates an example graphical user interface screen 1400 that allows the user to filter search results and to perform statistical analysis on values extracted from specific fields in the set of events. In this example, the top ten product names ranked by price are selected as a filter 1401 that causes the display of the ten most popular products sorted by price. Each row is displayed by product name and price 1402. This results in each product displayed in a column labeled "product name" along with an associated price in a column labeled "price" 1406. Statistical analysis of other fields in the events associated with the ten most popular products have been specified as column values 1403. A count of the number of successful purchases for each product is displayed in column 1404. This statistics may be produced by filtering the search results by the product name, finding all occurrences of a successful purchase in a field within the events and generating a total of the number of occurrences. A sum of the total sales is displayed in column 1405, which is a result of the multiplication of the price and the number of successful purchases for each product.

Figure 16:
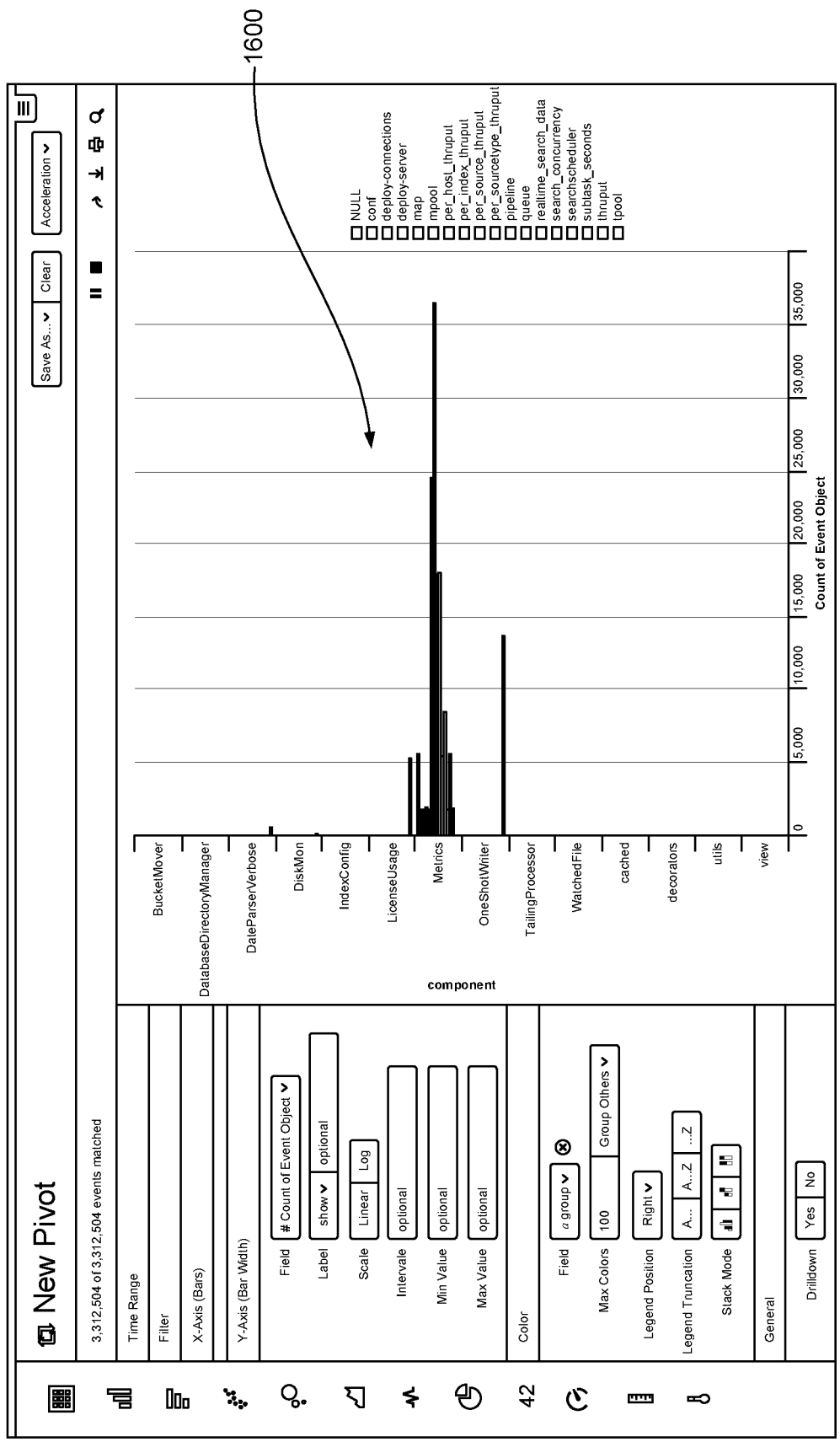
Figure 17:
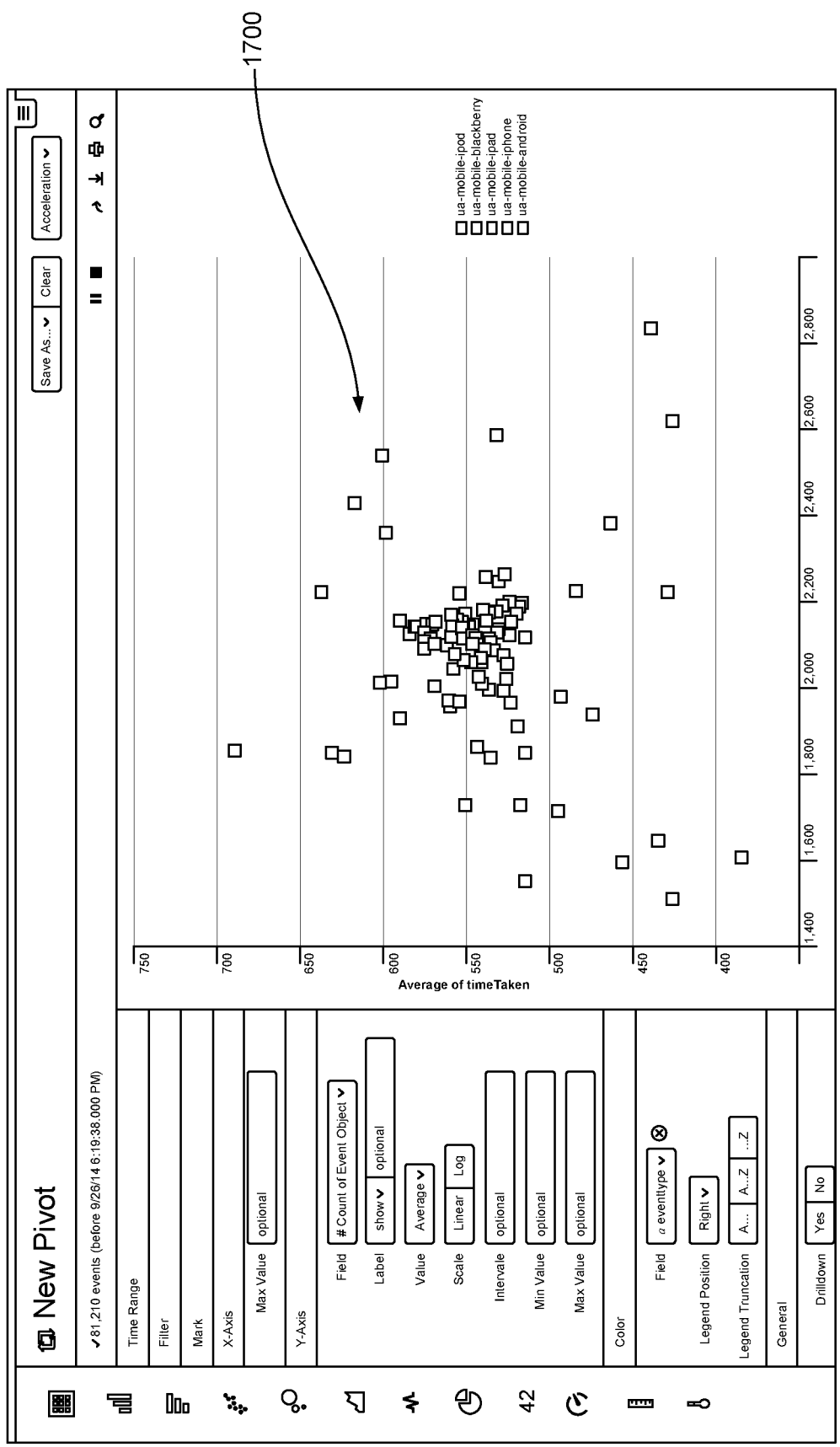

The reporting application allows the user to create graphical visualizations of the statistics generated for a report. For example, FIG. 15 illustrates an example graphical user interface 1500 that displays a set of components and associated statistics 1501. The reporting application allows the user to select a visualization of the statistics in a graph (e.g., bar chart, scatter plot, area chart, line chart, pie chart, radial gauge, marker gauge, filler gauge, etc.). FIG. 16 illustrates an example of a bar chart visualization 1600 of an aspect of the statistical data 1501. FIG. 17 illustrates a scatter plot visualization 1700 of an aspect of the statistical data 1501.

2.10. Acceleration Technique

The above-described system provides significant flexibility by enabling a user to analyze massive quantities of minimally processed data "on the fly" at search time instead of storing pre-specified portions of the data in a database at ingestion time. This flexibility enables a user to see valuable insights, correlate data, and perform subsequent queries to examine interesting aspects of the data that may not have been apparent at ingestion time.

However, performing extraction and analysis operations at search time can involve a large amount of data and require a large number of computational operations, which can cause delays in processing the queries. Advantageously, SPLUNK® ENTERPRISE system employs a number of unique acceleration techniques that have been developed to speed up analysis operations performed at search time. These techniques include: (1) performing search operations in parallel across multiple indexers; (2) using a keyword index; (3) using a high performance analytics store; and (4) accelerating the process of generating reports. These novel techniques are described in more detail below.

2.10.1. Aggregation Technique

Figure 8:
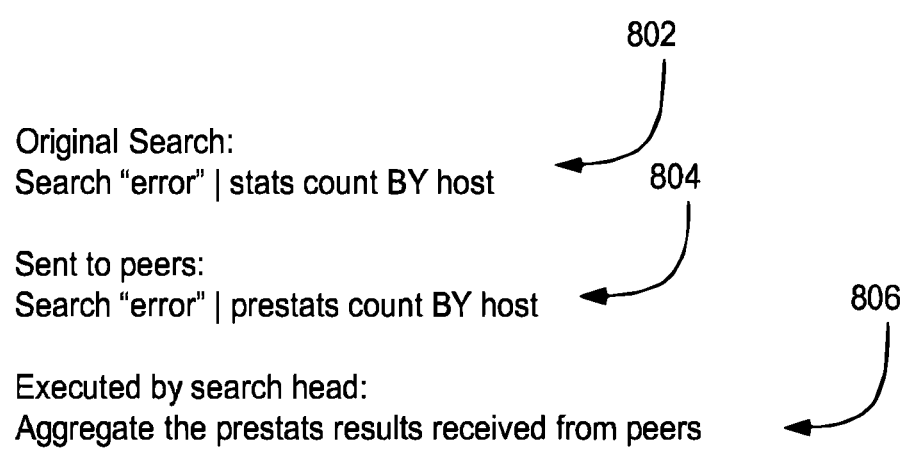
FIG. 8 illustrates an example search query received from a client and executed by search peers in accordance with the disclosed embodiments.

To facilitate faster query processing, a query can be structured such that multiple indexers perform the query in parallel, while aggregation of search results from the multiple indexers is performed locally at the search head. For example, FIG. 8 illustrates how a search query 802 received from a client at a search head 210 can split into two phases, including: (1) subtasks 804 (e.g., data retrieval or simple filtering) that may be performed in parallel by indexers 206 for execution, and (2) a search results aggregation operation 806 to be executed by the search head when the results are ultimately collected from the indexers.

During operation, upon receiving search query 802, a search head 210 determines that a portion of the operations involved with the search query may be performed locally by the search head. The search head modifies search query 802 by substituting "stats" (create aggregate statistics over results sets received from the indexers at the search head) with "prestats" (create statistics by the indexer from local results set) to produce search query 804, and then distributes search query 804 to distributed indexers, which are also referred to as "search peers." Note that search queries may generally specify search criteria or operations to be performed on events that meet the search criteria. Search queries may also specify field names, as well as search criteria for the values in the fields or operations to be performed on the values in the fields. Moreover, the search head may distribute the full search query to the search peers as illustrated in FIG. 4, or may alternatively distribute a modified version (e.g., a more restricted version) of the search query to the search peers. In this example, the indexers are responsible for producing the results and sending them to the search head. After the indexers return the results to the search head, the search head aggregates the received results 806 to form a single search result set. By executing the query in this manner, the system effectively distributes the computational operations across the indexers while minimizing data transfers.

2.10.2. Keyword Index

As described above with reference to the flow charts in FIG. 3 and FIG. 4, data intake and query system 108 can construct and maintain one or more keyword indices to quickly identify events containing specific keywords. This technique can greatly speed up the processing of queries involving specific keywords. As mentioned above, to build a keyword index, an indexer first identifies a set of keywords. Then, the indexer includes the identified keywords in an index, which associates each stored keyword with references to events containing that keyword, or to locations within events where that keyword is located. When an indexer subsequently receives a keyword-based query, the indexer can access the keyword index to quickly identify events containing the keyword.

2.10.3. High Performance Analytics Store

To speed up certain types of queries, some embodiments of system 108 create a high performance analytics store, which is referred to as a "summarization table," that contains entries for specific field-value pairs. Each of these entries keeps track of instances of a specific value in a specific field in the event data and includes references to events containing the specific value in the specific field. For example, an example entry in a summarization table can keep track of occurrences of the value "94107" in a "ZIP code" field of a set of events and the entry includes references to all of the events that contain the value "94107" in the ZIP code field. This optimization technique enables the system to quickly process queries that seek to determine how many events have a particular value for a particular field. To this end, the system can examine the entry in the summarization table to count instances of the specific value in the field without having to go through the individual events or perform data extractions at search time. Also, if the system needs to process all events that have a specific field-value combination, the system can use the references in the summarization table entry to directly access the events to extract further information without having to search all of the events to find the specific field-value combination at search time.

In some embodiments, the system maintains a separate summarization table for each of the above-described time-specific buckets that stores events for a specific time range. A bucket-specific summarization table includes entries for specific field-value combinations that occur in events in the specific bucket. Alternatively, the system can maintain a separate summarization table for each indexer. The indexer-specific summarization table includes entries for the events in a data store that are managed by the specific indexer. Indexer-specific summarization tables may also be bucket-specific.

The summarization table can be populated by running a periodic query that scans a set of events to find instances of a specific field-value combination, or alternatively instances of all field-value combinations for a specific field. A periodic query can be initiated by a user, or can be scheduled to occur automatically at specific time intervals. A periodic query can also be automatically launched in response to a query that asks for a specific field-value combination.

In some cases, when the summarization tables may not cover all of the events that are relevant to a query, the system can use the summarization tables to obtain partial results for the events that are covered by summarization tables, but may also have to search through other events that are not covered by the summarization tables to produce additional results. These additional results can then be combined with the partial results to produce a final set of results for the query. The summarization table and associated techniques are described in more detail in U.S. Pat. No. 8,682,925, entitled "DISTRIBUTED HIGH PERFORMANCE ANALYTICS STORE", issued on 25 Mar. 2014, U.S. patent application Ser. No. 14/170,159, entitled "SUPPLEMENTING A HIGH PERFORMANCE ANALYTICS STORE WITH EVALUATION OF INDIVIDUAL EVENTS TO RESPOND TO AN EVENT QUERY", filed on 31 Jan. 2014, and U.S. patent application Ser. No. 14/815,973, entitled "STORAGE MEDIUM AND CONTROL DEVICE", filed on 21 Feb. 2014, each of which is hereby incorporated by reference in its entirety.

2.10.4. Accelerating Report Generation

In some embodiments, a data server system such as the SPLUNK® ENTERPRISE system can accelerate the process of periodically generating updated reports based on query results. To accelerate this process, a summarization engine automatically examines the query to determine whether generation of updated reports can be accelerated by creating intermediate summaries. If reports can be accelerated, the summarization engine periodically generates a summary covering data obtained during a latest non-overlapping time period. For example, where the query seeks events meeting a specified criteria, a summary for the time period includes only events within the time period that meet the specified criteria. Similarly, if the query seeks statistics calculated from the events, such as the number of events that match the specified criteria, then the summary for the time period includes the number of events in the period that match the specified criteria.

In addition to the creation of the summaries, the summarization engine schedules the periodic updating of the report associated with the query. During each scheduled report update, the query engine determines whether intermediate summaries have been generated covering portions of the time period covered by the report update. If so, then the report is generated based on the information contained in the summaries. Also, if additional event data has been received and has not yet been summarized, and is required to generate the complete report, the query can be run on this additional event data. Then, the results returned by this query on the additional event data, along with the partial results obtained from the intermediate summaries, can be combined to generate the updated report. This process is repeated each time the report is updated. Alternatively, if the system stores events in buckets covering specific time ranges, then the summaries can be generated on a bucket-by-bucket basis. Note that producing intermediate summaries can save the work involved in re-running the query for previous time periods, so advantageously only the newer event data needs to be processed while generating an updated report. These report acceleration techniques are described in more detail in U.S. Pat. No. 8,589,403, entitled "COMPRESSED JOURNALING IN EVENT TRACKING FILES FOR METADATA RECOVERY AND REPLICATION", issued on 19 Nov. 2013, U.S. Pat. No. 8,412,696, entitled "REAL TIME SEARCHING AND REPORTING", issued on 2 Apr. 2011, and U.S. Pat. Nos. 8,589,375 and 8,589,432, both also entitled "REAL TIME SEARCHING AND REPORTING", both issued on 19 Nov. 2013, each of which is hereby incorporated by reference in its entirety.

2.11. Data Center Monitoring

As mentioned above, the SPLUNK® ENTERPRISE platform provides various features that simplify the developers' task to create various applications. One such application is SPLUNK® APP FOR VMWARE® that provides operational visibility into granular performance metrics, logs, tasks and events, and topology from hosts, virtual machines and virtual centers. It empowers administrators with an accurate real-time picture of the health of the environment, proactively identifying performance and capacity bottlenecks.

Conventional data-center-monitoring systems lack the infrastructure to effectively store and analyze large volumes of machine-generated data, such as performance information and log data obtained from the data center. In conventional data-center-monitoring systems, machine-generated data is typically pre-processed prior to being stored, for example, by extracting pre-specified data items and storing them in a database to facilitate subsequent retrieval and analysis at search time. However, the rest of the data is not saved and discarded during pre-processing.

In contrast, the SPLUNK® APP FOR VMWARE® stores large volumes of minimally processed machine data, such as performance information and log data, at ingestion time for later retrieval and analysis at search time when a live performance issue is being investigated. In addition to data obtained from various log files, this performance-related information can include values for performance metrics obtained through an application programming interface (API) provided as part of the vSphere Hypervisor™ system distributed by VMware, Inc. of Palo Alto, California. For example, these performance metrics can include: (1) CPU-related performance metrics; (2) disk-related performance metrics; (3) memory-related performance metrics; (4) network-related performance metrics; (5) energy-usage statistics; (6) data-traffic-related performance metrics; (7) overall system availability performance metrics; (8) cluster-related performance metrics; and (9) virtual machine performance statistics. Such performance metrics are described in U.S. patent application Ser. No. 14/167,316, entitled "CORRELATION FOR USER-SELECTED TIME RANGES OF VALUES FOR PERFORMANCE METRICS OF COMPONENTS IN AN INFORMATION-TECHNOLOGY ENVIRONMENT WITH LOG DATA FROM THAT INFORMATION-TECHNOLOGY ENVIRONMENT", filed on 29 Jan. 2014, and which is hereby incorporated by reference in its entirety for all purposes.

To facilitate retrieving information of interest from performance data and log files, the SPLUNK® APP FOR VMWARE® provides pre-specified schemas for extracting relevant values from different types of performance-related event data, and also enables a user to define such schemas.

Figure 9A:
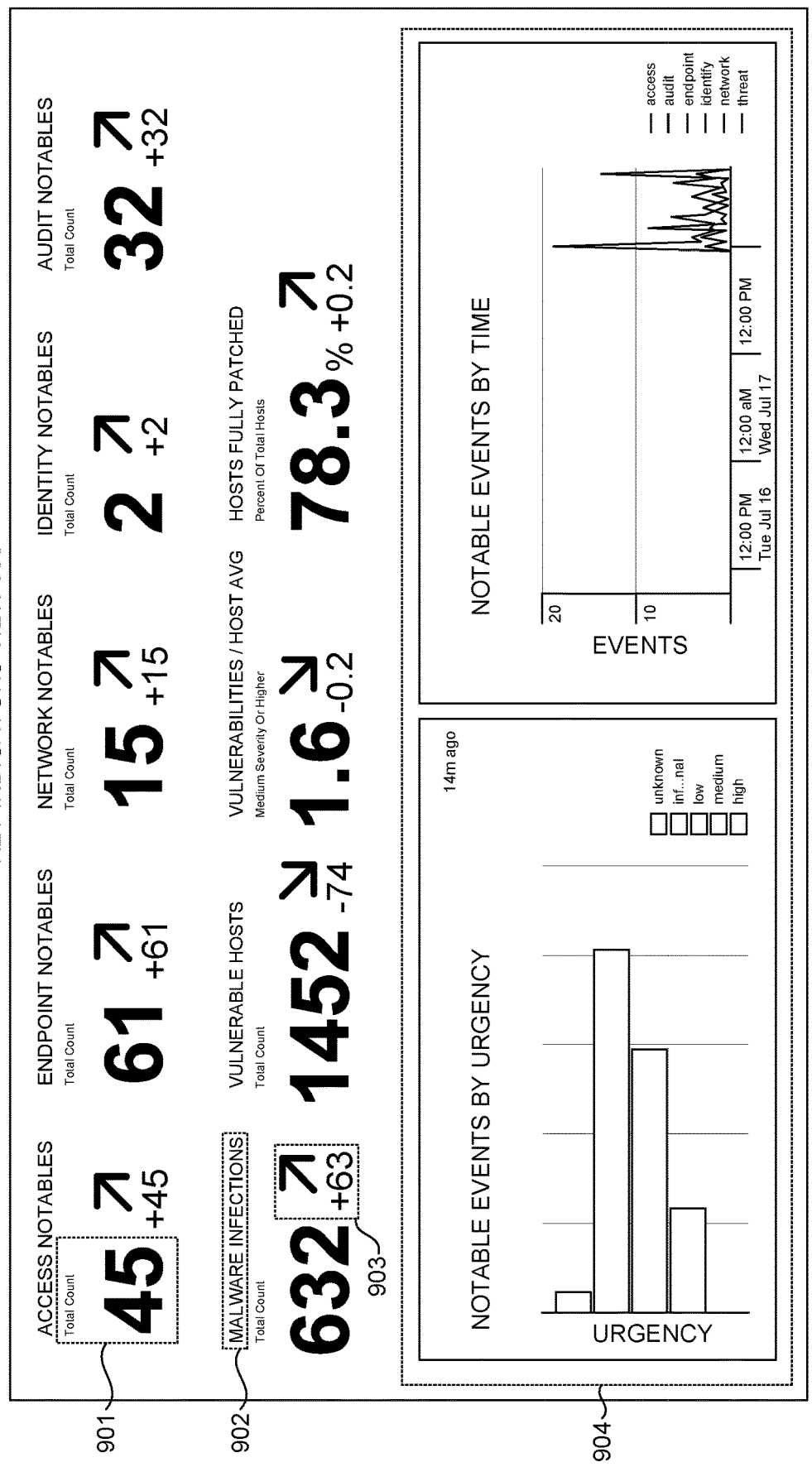
FIG. 9A illustrates a key indicators view in accordance with the disclosed embodiments.
Figure 9B:
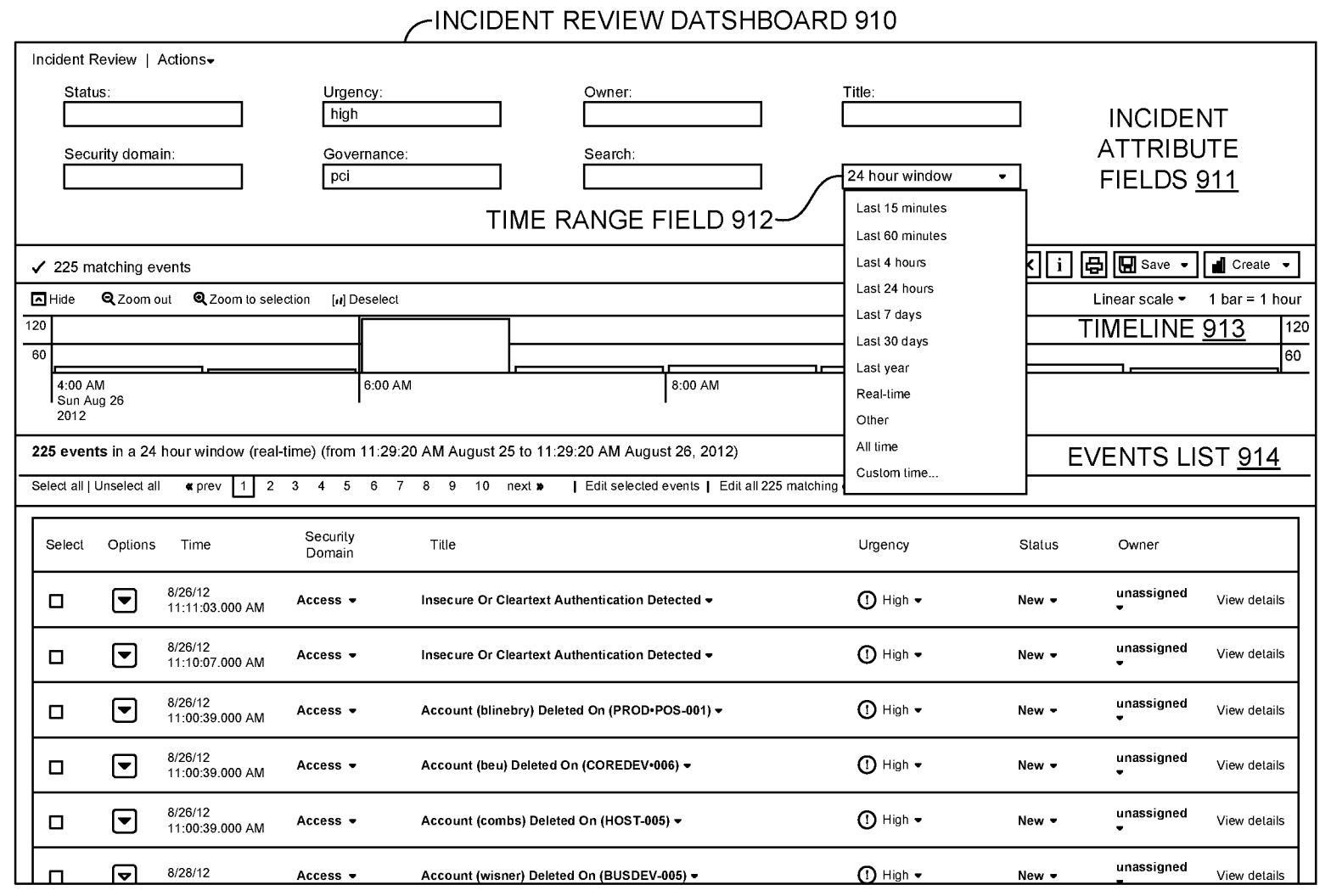
Figure 9C:
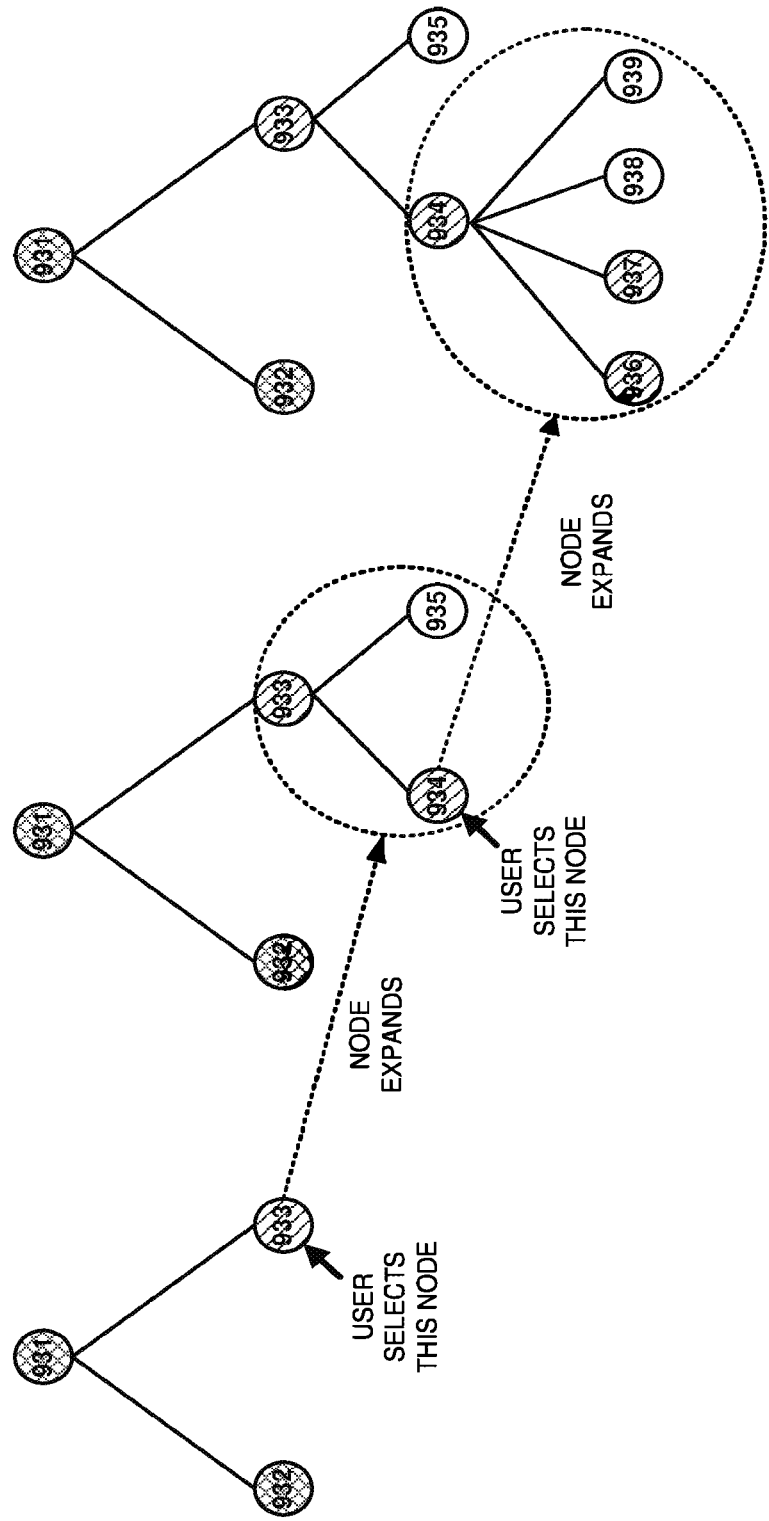
FIG. 9C illustrates a proactive monitoring tree in accordance with the disclosed embodiments.

The SPLUNK® APP FOR VMWARE® additionally provides various visualizations to facilitate detecting and diagnosing the root cause of performance problems. For example, one such visualization is a "proactive monitoring tree" that enables a user to easily view and understand relationships among various factors that affect the performance of a hierarchically structured computing system. This proactive monitoring tree enables a user to easily navigate the hierarchy by selectively expanding nodes representing various entities (e.g., virtual centers or computing clusters) to view performance information for lower-level nodes associated with lower-level entities (e.g., virtual machines or host systems). Example node-expansion operations are illustrated in FIG. 9C, wherein nodes 933 and 934 are selectively expanded. Note that nodes 931-939 can be displayed using different patterns or colors to represent different performance states, such as a critical state, a warning state, a normal state or an unknown/offline state. The ease of navigation provided by selective expansion in combination with the associated performance-state information enables a user to quickly diagnose the root cause of a performance problem. The proactive monitoring tree is described in further detail in U.S. patent application Ser. No. 14/253,490, entitled "PROACTIVE MONITORING TREE WITH SEVERITY STATE SORTING", filed on 15 Apr. 2014, and U.S. patent application Ser. No. 14/812,948, also entitled "PROACTIVE MONITORING TREE WITH SEVERITY STATE SORTING", filed on 29 Jul. 2015, each of which is hereby incorporated by reference in its entirety for all purposes.

Figure 9D:
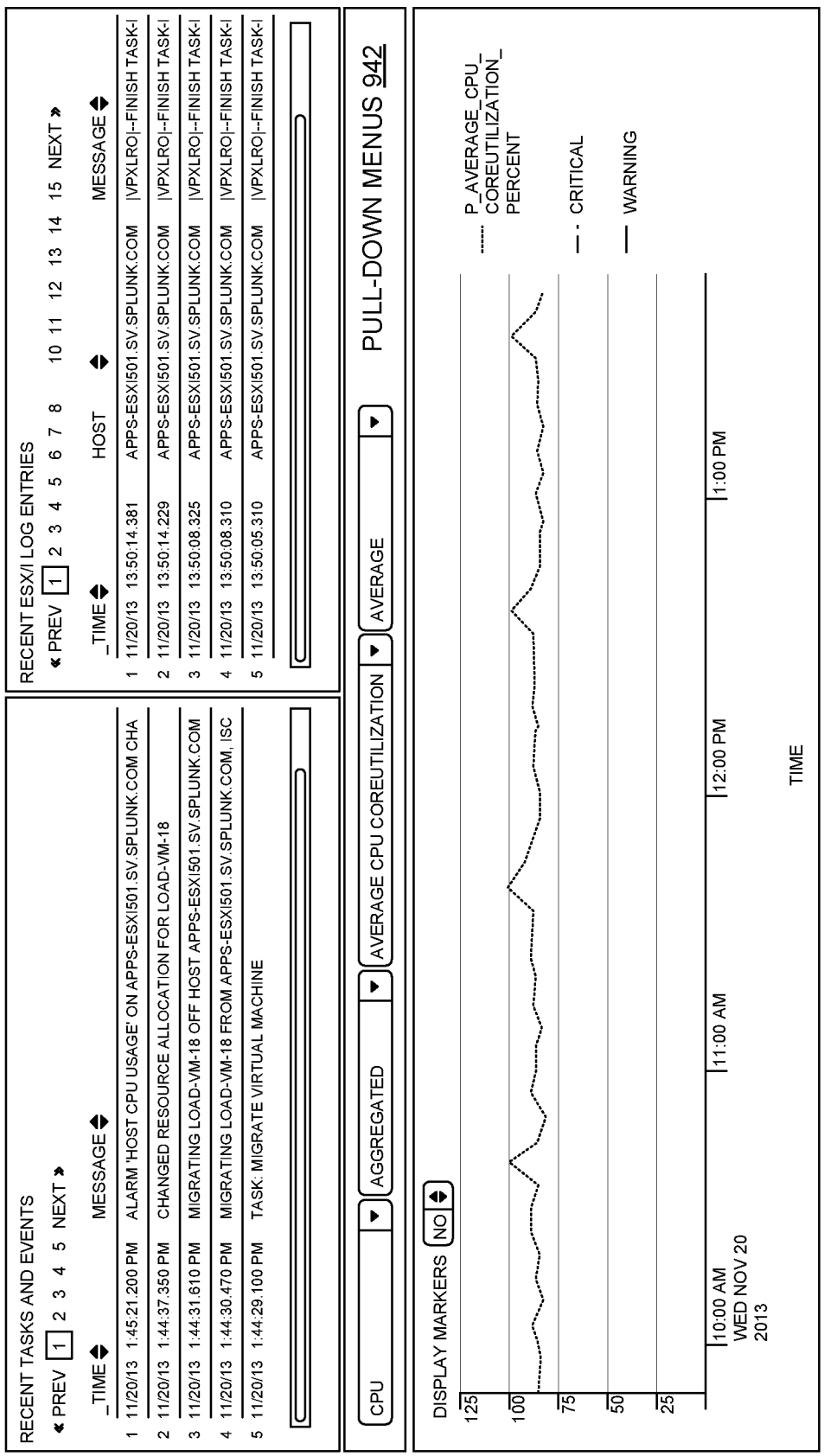
FIG. 9D illustrates a user interface screen displaying both log data and performance data in accordance with the disclosed embodiments.

The SPLUNK® APP FOR VMWARE® also provides a user interface that enables a user to select a specific time range and then view heterogeneous data comprising events, log data, and associated performance metrics for the selected time range. For example, the screen illustrated in FIG. 9D displays a listing of recent "tasks and events" and a listing of recent "log entries" for a selected time range above a performance-metric graph for "average CPU core utilization" for the selected time range. Note that a user is able to operate pull-down menus 942 to selectively display different performance metric graphs for the selected time range. This enables the user to correlate trends in the performance-metric graph with corresponding event and log data to quickly determine the root cause of a performance problem. This user interface is described in more detail in U.S. patent application Ser. No. 14/167,316, entitled "CORRELATION FOR USER-SELECTED TIME RANGES OF VALUES FOR PERFORMANCE METRICS OF COMPONENTS IN AN INFORMATION-TECHNOLOGY ENVIRONMENT WITH LOG DATA FROM THAT INFORMATION-TECHNOLOGY ENVIRONMENT", filed on 29 Jan. 2014, and which is hereby incorporated by reference in its entirety for all purposes.

2.12. Cloud-Based System Overview

The example data intake and query system 108 described in reference to FIG. 2 comprises several system components, including one or more forwarders, indexers, and search heads. In some environments, a user of a data intake and query system 108 may install and configure, on computing devices owned and operated by the user, one or more software applications that implement some or all of these system components. For example, a user may install a software application on server computers owned by the user and configure each server to operate as one or more of a forwarder, an indexer, a search head, etc. This arrangement generally may be referred to as an "on-premises" solution. That is, the system 108 is installed and operates on computing devices directly controlled by the user of the system. Some users may prefer an on-premises solution because it may provide a greater level of control over the configuration of certain aspects of the system (e.g., security, privacy, standards, controls, etc.). However, other users may instead prefer an arrangement in which the user is not directly responsible for providing and managing the computing devices upon which various components of system 108 operate.

In one embodiment, to provide an alternative to an entirely on-premises environment for system 108, one or more of the components of a data intake and query system instead may be provided as a cloud-based service. In this context, a cloud-based service refers to a service hosted by one more computing resources that are accessible to end users over a network, for example, by using a web browser or other application on a client device to interface with the remote computing resources. For example, a service provider may provide a cloud-based data intake and query system by managing computing resources configured to implement various aspects of the system (e.g., forwarders, indexers, search heads, etc.) and by providing access to the system to end users via a network. Typically, a user may pay a subscription or other fee to use such a service. Each subscribing user of the cloud-based service may be provided with an account that enables the user to configure a customized cloud-based system based on the user's preferences.

Figure 10:
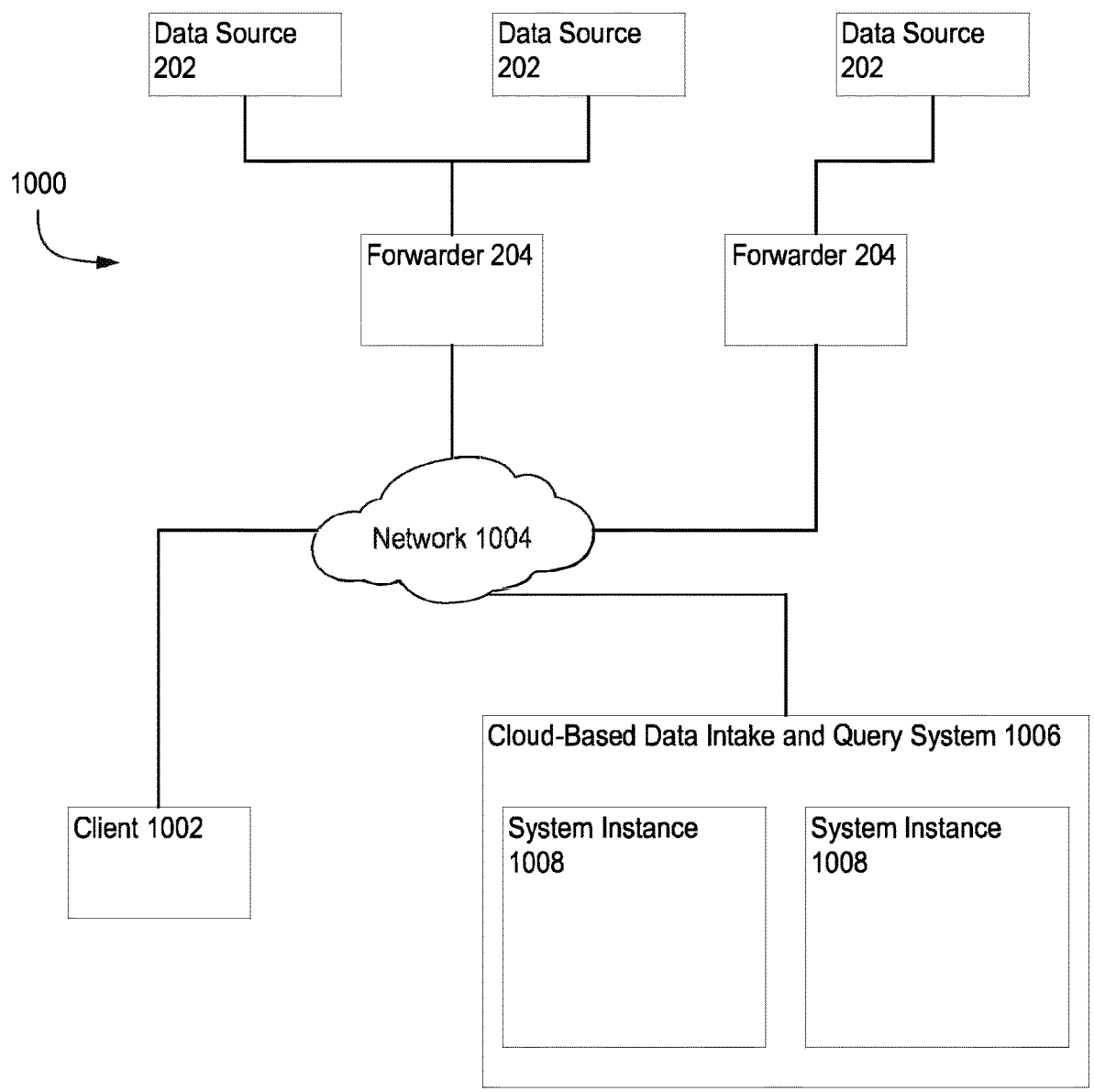
FIG. 10 illustrates a block diagram of an example cloud-based data intake and query system in which an embodiment may be implemented.

FIG. 10 illustrates a block diagram of an example cloud-based data intake and query system. Similar to the system of FIG. 2, the networked computer system 1000 includes input data sources 202 and forwarders 204. These input data sources and forwarders may be in a subscriber's private computing environment. Alternatively, they might be directly managed by the service provider as part of the cloud service. In the example system 1000, one or more forwarders 204 and client devices 1002 are coupled to a cloud-based data intake and query system 1006 via one or more networks 1004. Network 1004 broadly represents one or more LANs, WANs, cellular networks, intranetworks, internetworks, etc., using any of wired, wireless, terrestrial microwave, satellite links, etc., and may include the public Internet, and is used by client devices 1002 and forwarders 204 to access the system 1006. Similar to the system of 108, each of the forwarders 204 may be configured to receive data from an input source and to forward the data to other components of the system 1006 for further processing.

In an embodiment, a cloud-based data intake and query system 1006 may comprise a plurality of system instances 1008. In general, each system instance 1008 may include one or more computing resources managed by a provider of the cloud-based system 1006 made available to a particular subscriber. The computing resources comprising a system instance 1008 may, for example, include one or more servers or other devices configured to implement one or more forwarders, indexers, search heads, and other components of a data intake and query system, similar to system 108. As indicated above, a subscriber may use a web browser or other application of a client device 1002 to access a web portal or other interface that enables the subscriber to configure an instance 1008.

Each of the components of a system 108 (e.g., forwarders, indexers and search heads) may at times refer to various configuration files stored locally at each component. Embodiments described herein provide a central repository for maintaining configuration files for the components of a system 108. Various components of a system 108 (e.g., search heads) are able to receive changes to the configuration files through a search head interface or a central management interface. Other components of a system 108 (e.g., indexers and forwarders) are able to receive changes to the configuration files from the central repository. These configuration files typically may involve some level of user configuration to accommodate particular types of data a user desires to analyze and to account for other user preferences. However, in a cloud-based service context, users typically may not have direct access to the underlying computing resources implementing the various system components (e.g., the computing resources comprising each system instance 1008) and may desire to make such configurations indirectly, for example, using one or more web-based interfaces. Thus, the techniques and systems described herein for providing user interfaces that enable a user to configure source type definitions are applicable to both on-premises and cloud-based service contexts, or some combination thereof (e.g., a hybrid system where both an on-premises environment such as SPLUNK® ENTERPRISE and a cloud-based environment such as SPLUNK CLOUD™ are centrally visible).

2.13. Searching Externally Archived Data

Figure 11:
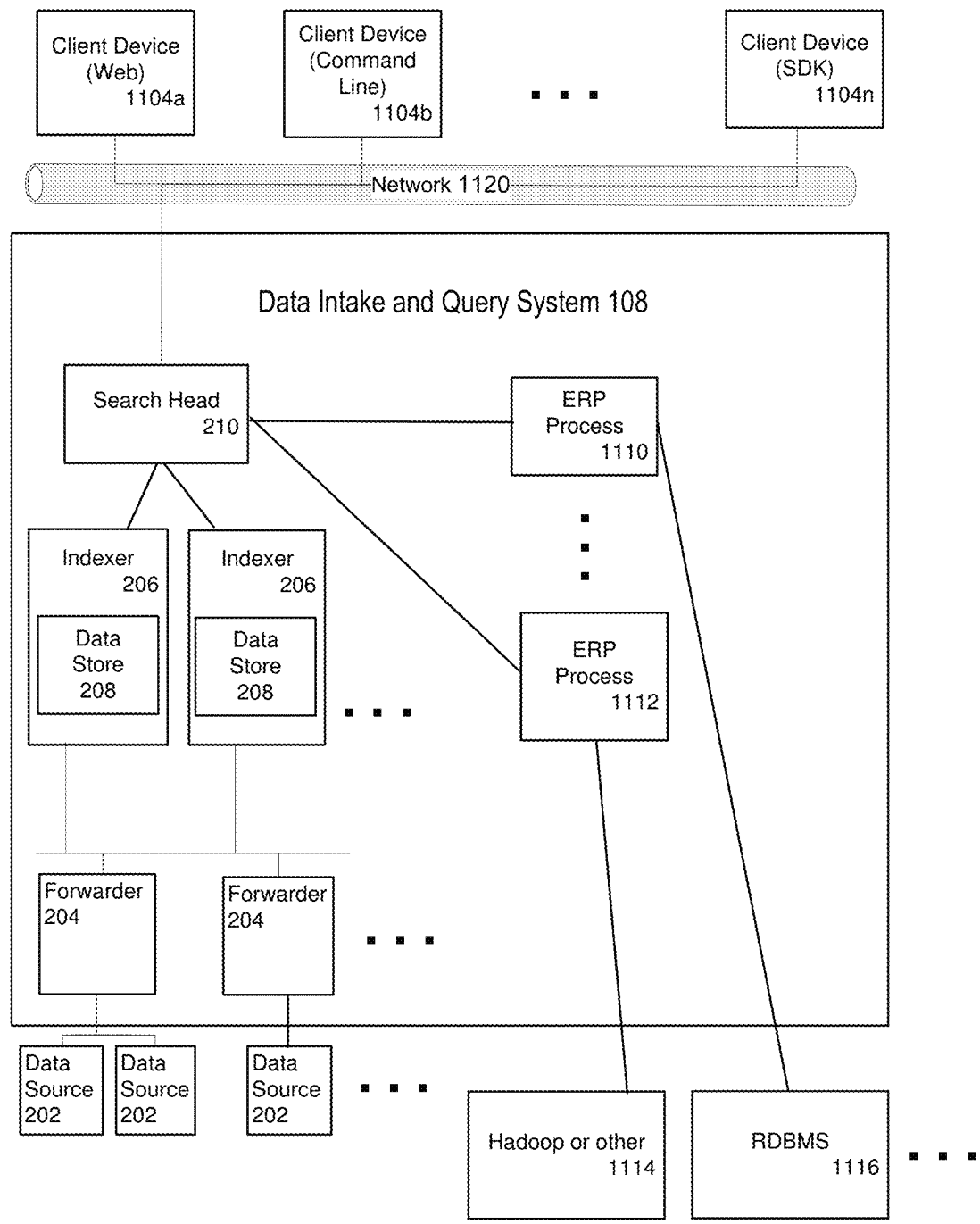
FIG. 11 illustrates a block diagram of an example data intake and query system that performs searches across external data systems in accordance with the disclosed embodiments.

FIG. 11 shows a block diagram of an example of a data intake and query system 108 that provides transparent search facilities for data systems that are external to the data intake and query system. Such facilities are available in the HUNK® system provided by Splunk Inc. of San Francisco, California. HUNK® represents an analytics platform that enables business and IT teams to rapidly explore, analyze, and visualize data in Hadoop and NoSQL data stores.

The search head 210 of the data intake and query system receives search requests from one or more client devices 1104 over network connections 1120. As discussed above, the data intake and query system 108 may reside in an enterprise location, in the cloud, etc. FIG. 11 illustrates that multiple client devices 1104a, 1104b, . . . , 1104n may communicate with the data intake and query system 108. The client devices 1104 may communicate with the data intake and query system using a variety of connections. For example, one client device in FIG. 11 is illustrated as communicating over an Internet (Web) protocol, another client device is illustrated as communicating via a command line interface, and another client device is illustrated as communicating via a system developer kit (SDK).

The search head 210 analyzes the received search request to identify request parameters. If a search request received from one of the client devices 1104 references an index maintained by the data intake and query system, then the search head 210 connects to one or more indexers 206 of the data intake and query system for the index referenced in the request parameters. That is, if the request parameters of the search request reference an index, then the search head accesses the data in the index via the indexer. The data intake and query system 108 may include one or more indexers 206, depending on system access resources and requirements. As described further below, the indexers 206 retrieve data from their respective local data stores 208 as specified in the search request. The indexers and their respective data stores can comprise one or more storage devices and typically reside on the same system, though they may be connected via a local network connection.

If the request parameters of the received search request reference an external data collection, which is not accessible to the indexers 206 or under the management of the data intake and query system, then the search head 210 can access the external data collection through an External Result Provider (ERP) process 1110. An external data collection may be referred to as a "virtual index" (plural, "virtual indices"). An ERP process provides an interface through which the search head 210 may access virtual indices.

Thus, a search reference to an index of the system relates to a locally stored and managed data collection. In contrast, a search reference to a virtual index relates to an externally stored and managed data collection, which the search head may access through one or more ERP processes 1110, 1112. FIG. 11 shows two ERP processes 1110, 1112 that connect to respective remote (external) virtual indices, which are indicated as a Hadoop or another system 1114 (e.g., Amazon S3, Amazon EMR, other Hadoop Compatible File Systems (HCFS), etc.) and a relational database management system (RDBMS) 1116. Other virtual indices may include other file organizations and protocols, such as Structured Query Language (SQL) and the like. The ellipses between the ERP processes 1110, 1112 indicate optional additional ERP processes of the data intake and query system 108. An ERP process may be a computer process that is initiated or spawned by the search head 210 and is executed by the search data intake and query system 108. Alternatively or additionally, an ERP process may be a process spawned by the search head 210 on the same or different host system as the search head 210 resides.

The search head 210 may spawn a single ERP process in response to multiple virtual indices referenced in a search request, or the search head may spawn different ERP processes for different virtual indices. Generally, virtual indices that share common data configurations or protocols may share ERP processes. For example, all search query references to a Hadoop file system may be processed by the same ERP process, if the ERP process is suitably configured. Likewise, all search query references to an SQL database may be processed by the same ERP process. In addition, the search head may provide a common ERP process for common external data source types (e.g., a common vendor may utilize a common ERP process, even if the vendor includes different data storage system types, such as Hadoop and SQL). Common indexing schemes also may be handled by common ERP processes, such as flat text files or Weblog files.

The search head 210 determines the number of ERP processes to be initiated via the use of configuration parameters that are included in a search request message. Generally, there is a one-to-many relationship between an external results provider "family" and ERP processes. There is also a one-to-many relationship between an ERP process and corresponding virtual indices that are referred to in a search request. For example, using RDBMS, assume two independent instances of such a system by one vendor, such as one RDBMS for production and another RDBMS used for development. In such a situation, it is likely preferable (but optional) to use two ERP processes to maintain the independent operation as between production and development data. Both of the ERPs, however, will belong to the same family, because the two RDBMS system types are from the same vendor.

The ERP processes 1110, 1112 receive a search request from the search head 210. The search head may optimize the received search request for execution at the respective external virtual index. Alternatively, the ERP process may receive a search request as a result of analysis performed by the search head or by a different system process. The ERP processes 1110, 1112 can communicate with the search head 210 via conventional input/output routines (e.g., standard in/standard out, etc.). In this way, the ERP process receives the search request from a client device such that the search request may be efficiently executed at the corresponding external virtual index.

The ERP processes 1110, 1112 may be implemented as a process of the data intake and query system. Each ERP process may be provided by the data intake and query system, or may be provided by process or application providers who are independent of the data intake and query system. Each respective ERP process may include an interface application installed at a computer of the external result provider that ensures proper communication between the search support system and the external result provider. The ERP processes 1110, 1112 generate appropriate search requests in the protocol and syntax of the respective virtual indices 1114, 1116, each of which corresponds to the search request received by the search head 210. Upon receiving search results from their corresponding virtual indices, the respective ERP process passes the result to the search head 210, which may return or display the results or a processed set of results based on the returned results to the respective client device.

Client devices 1104 may communicate with the data intake and query system 108 through a network interface 1120, e.g., one or more LANs, WANs, cellular networks, intranetworks, and/or internetworks using any of wired, wireless, terrestrial microwave, satellite links, etc., and may include the public Internet.

The analytics platform utilizing the External Result Provider process described in more detail in U.S. Pat. No. 8,738,629, entitled "EXTERNAL RESULT PROVIDED PROCESS FOR RETRIEVING DATA STORED USING A DIFFERENT CONFIGURATION OR PROTOCOL", issued on 27 May 2014, U.S. Pat. No. 8,738,587, entitled "PROCESSING A SYSTEM SEARCH REQUEST BY RETRIEVING RESULTS FROM BOTH A NATIVE INDEX AND A VIRTUAL INDEX", issued on 25 Jul. 2013, U.S. patent application Ser. No. 14/266,832, entitled "PROCESSING A SYSTEM SEARCH REQUEST ACROSS DISPARATE DATA COLLECTION SYSTEMS", filed on 1 May 2014, and U.S. patent application Ser. No. 14/449,144, entitled "PROCESSING A SYSTEM SEARCH REQUEST INCLUDING EXTERNAL DATA SOURCES", filed on 31 Jul. 2014, each of which is hereby incorporated by reference in its entirety for all purposes.

2.13.1. ERP Process Features

The ERP processes described above may include two operation modes: a streaming mode and a reporting mode. The ERP processes can operate in streaming mode only, in reporting mode only, or in both modes simultaneously. Operating in both modes simultaneously is referred to as mixed mode operation. In a mixed mode operation, the ERP at some point can stop providing the search head with streaming results and only provide reporting results thereafter, or the search head at some point may start ignoring streaming results it has been using and only use reporting results thereafter.

The streaming mode returns search results in real time, with minimal processing, in response to the search request. The reporting mode provides results of a search request with processing of the search results prior to providing them to the requesting search head, which in turn provides results to the requesting client device. ERP operation with such multiple modes provides greater performance flexibility with regard to report time, search latency, and resource utilization.

In a mixed mode operation, both streaming mode and reporting mode are operating simultaneously. The streaming mode results (e.g., the raw data obtained from the external data source) are provided to the search head, which can then process the results data (e.g., break the raw data into events, timestamp it, filter it, etc.) and integrate the results data with the results data from other external data sources, and/or from data stores of the search head. The search head performs such processing and can immediately start returning interim (streaming mode) results to the user at the requesting client device; simultaneously, the search head is waiting for the ERP process to process the data it is retrieving from the external data source as a result of the concurrently executing reporting mode.

In some instances, the ERP process initially operates in a mixed mode, such that the streaming mode operates to enable the ERP quickly to return interim results (e.g., some of the raw or unprocessed data necessary to respond to a search request) to the search head, enabling the search head to process the interim results and begin providing to the client or search requester interim results that are responsive to the query. Meanwhile, in this mixed mode, the ERP also operates concurrently in reporting mode, processing portions of raw data in a manner responsive to the search query. Upon determining that it has results from the reporting mode available to return to the search head, the ERP may halt processing in the mixed mode at that time (or some later time) by stopping the return of data in streaming mode to the search head and switching to reporting mode only. The ERP at this point starts sending interim results in reporting mode to the search head, which in turn may then present this processed data responsive to the search request to the client or search requester. Typically the search head switches from using results from the ERP's streaming mode of operation to results from the ERP's reporting mode of operation when the higher bandwidth results from the reporting mode outstrip the amount of data processed by the search head in the] streaming mode of ERP operation.

A reporting mode may have a higher bandwidth because the ERP does not have to spend time transferring data to the search head for processing all the raw data. In addition, the ERP may optionally direct another processor to do the processing.

The streaming mode of operation does not need to be stopped to gain the higher bandwidth benefits of a reporting mode; the search head could simply stop using the streaming mode results—and start using the reporting mode results—when the bandwidth of the reporting mode has caught up with or exceeded the amount of bandwidth provided by the streaming mode. Thus, a variety of triggers and ways to accomplish a search head's switch from using streaming mode results to using reporting mode results may be appreciated by one skilled in the art.

The reporting mode can involve the ERP process (or an external system) performing event breaking, time stamping, filtering of events to match the search query request, and calculating statistics on the results. The user can request particular types of data, such as if the search query itself involves types of events, or the search request may ask for statistics on data, such as on events that meet the search request. In either case, the search head understands the query language used in the received query request, which may be a proprietary language. One example query language is Splunk Processing Language (SPL) developed by the assignee of the application, Splunk Inc. The search head typically understands how to use that language to obtain data from the indexers, which store data in a format used by the SPLUNK® Enterprise system.

The ERP processes support the search head, as the search head is not ordinarily configured to understand the format in which data is stored in external data sources such as Hadoop or SQL data systems. Rather, the ERP process performs that translation from the query submitted in the search support system's native format (e.g., SPL if SPLUNK® ENTER- PRISE is used as the search support system) to a search query request format that will be accepted by the corresponding external data system. The external data system typically stores data in a different format from that of the search support system's native index format, and it utilizes a different query language (e.g., SQL or MapReduce, rather than SPL or the like).

As noted, the ERP process can operate in the streaming mode alone. After the ERP process has performed the translation of the query request and received raw results from the streaming mode, the search head can integrate the returned data with any data obtained from local data sources (e.g., native to the search support system), other external data sources, and other ERP processes (if such operations were required to satisfy the terms of the search query). An advantage of mixed mode operation is that, in addition to streaming mode, the ERP process is also executing concurrently in reporting mode. Thus, the ERP process (rather than the search head) is processing query results (e.g., performing event breaking, timestamping, filtering, possibly calculating statistics if required to be responsive to the search query request, etc.). It should be apparent to those skilled in the art that additional time is needed for the ERP process to perform the processing in such a configuration. Therefore, the streaming mode will allow the search head to start returning interim results to the user at the client device before the ERP process can complete sufficient processing to start returning any search results. The switchover between streaming and reporting mode happens when the ERP process determines that the switchover is appropriate, such as when the ERP process determines it can begin returning meaningful results from its reporting mode.

The operation described above illustrates the source of operational latency: streaming mode has low latency (immediate results) and usually has relatively low bandwidth (fewer results can be returned per unit of time). In contrast, the concurrently running reporting mode has relatively high latency (it has to perform a lot more processing before returning any results) and usually has relatively high bandwidth (more results can be processed per unit of time). For example, when the ERP process does begin returning report results, it returns more processed results than in the streaming mode, because, e.g., statistics only need to be calculated to be responsive to the search request. That is, the ERP process doesn't have to take time to first return raw data to the search head. As noted, the ERP process could be configured to operate in streaming mode alone and return just the raw data for the search head to process in a way that is responsive to the search request. Alternatively, the ERP process can be configured to operate in the reporting mode only. Also, the ERP process can be configured to operate in streaming mode and reporting mode concurrently, as described, with the ERP process stopping the transmission of streaming results to the search head when the concurrently running reporting mode has caught up and started providing results. The reporting mode does not require the processing of all raw data that is responsive to the search query request before the ERP process starts returning results; rather, the reporting mode usually performs processing of chunks of events and returns the processing results to the search head for each chunk.

For example, an ERP process can be configured to merely return the contents of a search result file verbatim, with little or no processing of results. That way, the search head performs all processing (such as parsing byte streams into events, filtering, etc.). The ERP process can be configured to perform additional intelligence, such as analyzing the search request and handling all the computation that a native search indexer process would otherwise perform. In this way, the configured ERP process provides greater flexibility in features while operating according to desired preferences, such as response latency and resource requirements.

3.0. Central Repository for Configuration Files

Described herein are techniques for maintaining configuration files for components of a distributed system in a central repository. Components of distributed system (e.g., system 108 of FIG. 1) are configurable and may refer to configuration files stored locally at each component. These configuration files typically may involve some level of user configuration to accommodate particular types of data a user desires to analyze and to account for other user preferences. Embodiments described herein provide a central repository for maintaining configuration files for the components of a distributed system.

In various embodiments, a computer-implemented method is provided for configuring a distributed computer system comprising a plurality of nodes of a plurality of node classes. Configuration files for a plurality of nodes of each of the plurality of node classes are stored in a central repository. The configuration files include information representing a desired system state of the distributed computer system, and the distributed computer system operates to keep an actual system state of the distributed computer system consistent with the desired system state. The plurality of node classes includes forwarder nodes for receiving data from an input source, indexer nodes for indexing the data, and search head nodes for searching the data. Responsive to receiving changes to the configuration files, the changes are propagated to nodes of the plurality of nodes impacted by the changes based on a node class of the nodes impacted by the changes.

In various embodiments, asynchronous status notifications are received from nodes representative of an actual state of the nodes. Status information representative of the actual state of the distributed computer system is provided and progress in achieving consistency with the desired state of the distributed computer system.

In various embodiments, the central repository includes a common configuration file sub-repository for maintaining configuration files common to the plurality of nodes of the plurality of node classes, a forwarder configuration sub-repository for maintaining configuration files for the forwarder nodes, an indexer configuration sub-repository for maintaining configuration files for the indexer nodes, and a search head configuration sub-repository for maintaining configuration files for the search head nodes. In various embodiments, configuration files for specific nodes are stored in a particular portion of the central repository, the configuration files for the specific nodes allowing for arbitrary configuration changes to the specific nodes. In various embodiments, the central repository is configured to maintain a plurality of versions of the configuration files.

In various embodiments, a transaction comprising a change to the configuration files is received, wherein the transaction further comprises acceptance criteria for the change to the configuration files.

In various embodiments, asynchronous status notifications are received from nodes representative of an actual state of the nodes. Acceptance criteria are compared to the asynchronous status notifications. It is then determined whether the acceptance criteria has been satisfied based at least in part on the asynchronous status notifications.

In various embodiments, a transaction comprising a change to the configuration files is received. It is determined whether the transaction conflicts with the configuration files. Responsive to the transaction not conflicting with the configuration files, the transaction is merged into the configuration files such that the desired system state is updated.

In various embodiments, a first transaction comprising a first change to the configuration files is received. A second transaction comprising a second change to the configuration files is received, wherein the second transaction is received subsequent to the first transaction. The first change is merged into the configuration files. It is determined whether the first change conflicts with the second change. Responsive to the first change conflicting with the second change, the second change is not merged into the configuration files and a notification that the second change has not been merged into the configuration files is provided.

In various embodiments, the changes to the configuration files are received from a single management node of the distributed computer system. In various embodiments, the changes are made to the plurality of nodes via a representational state transfer (REST) call.

In various embodiments, responsive to receiving changes in the configuration files impacting the search nodes, the changes are propagated to the search nodes from the central repository. In various embodiments, responsive to receiving changes in the configuration files at a search node, the changes are propagated to the central repository from the search node.

In various embodiments, responsive to changes in the configuration files impacting the index nodes, the changes are propagated to the index nodes from the central repository. In various embodiments, responsive to changes in the configuration files impacting the forwarder nodes, the changes are propagated to the forwarder nodes from the central repository.

In various embodiments, responsive to changes in the configuration files comprising a stanza change, a delta of the stanza change is propagated to the nodes of the plurality of nodes impacted by the changes.

In various embodiments, the changes are received at a search head node. The search head node pulls a configuration file from a search head captain node. The changes are merged with the configuration file. The configuration file with the changes is pushed to the search head captain node, wherein the configuration file is updated to include the changes. The configuration file is then pushed to the central repository.

In various embodiments, the changes are propagated from the central repository to a mediator node of the node class impacted by the changes. The changes are then propagated from the mediator node to the nodes impacted by the changes. In various embodiments, the changes are propagated from the central repository to a search head captain node of the search head nodes. The changes are then propagated from the search head captain node to the search head nodes impacted by the changes. In various embodiments, the changes are propagated from the central repository to a cluster master of the indexer nodes. The changes are then propagated from the cluster master to the indexer nodes impacted by the changes. In various embodiments, portions of the nodes of the plurality of nodes impacted by the changes are reloaded.

Figure 18A:
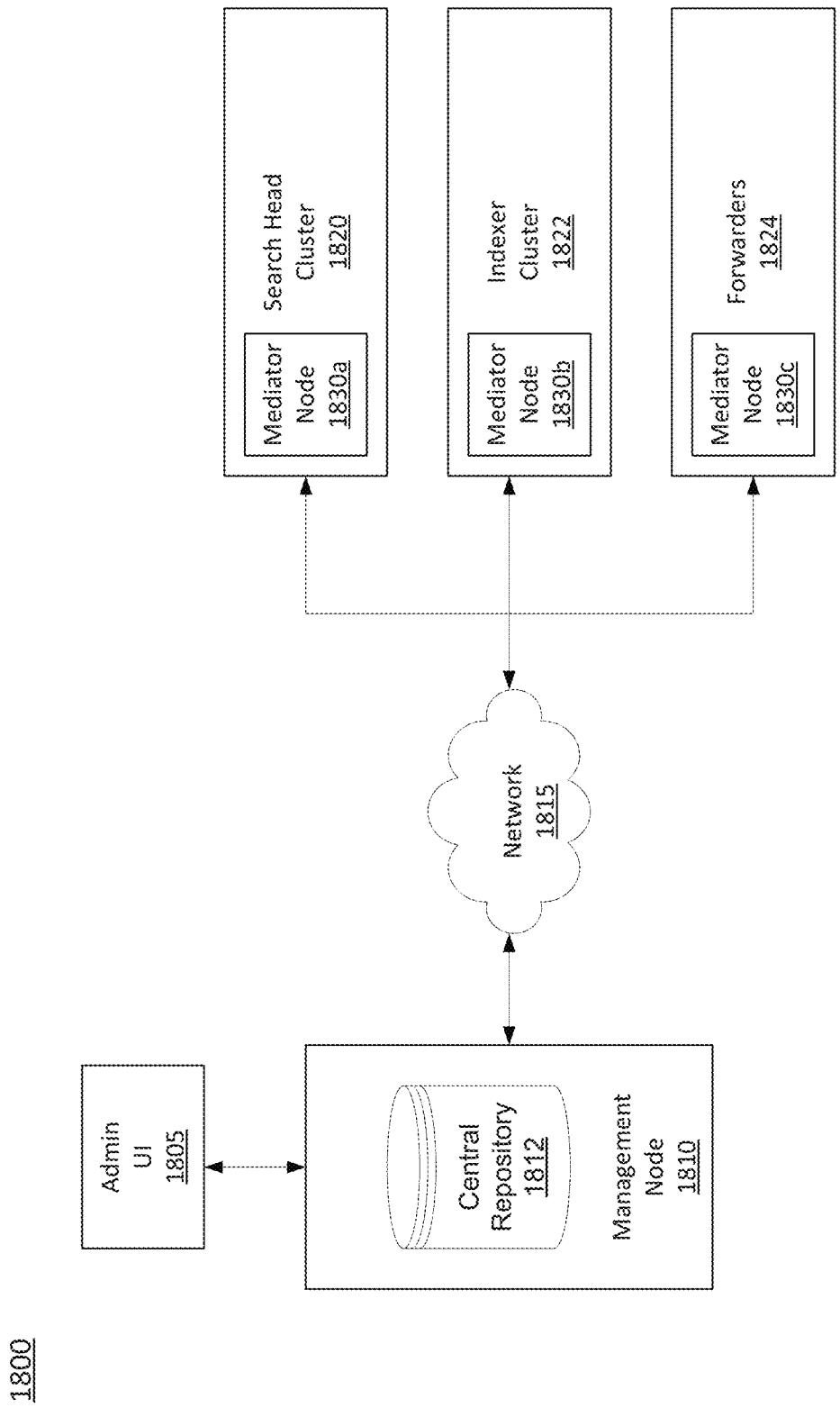
FIG. 18A illustrates a block diagram of an example distributed computer system for maintaining a central repository of configuration files across nodes of different node classes (e.g., search head nodes, indexer nodes, and forwarder nodes), in accordance with some embodiments.

FIG. 18A illustrates a block diagram of an example distributed computer system 1800 for maintaining a central repository 1812 of configuration files across nodes of different node classes (e.g., search head nodes, indexer nodes, and forwarder nodes), in accordance with some embodiments. In one embodiment, central repository 1812 is located within a management node 1810 of distributed computer system 1800. For example, central repository 1812 may include an authoritative version of the configuration files for nodes of a plurality of node classes including search head cluster 1820, indexer cluster 1822, and forwarders 1824. It should be appreciated that the term "node" as used herein refers to components of search head cluster 1820, indexer cluster 1822, and forwarders 1824 (e.g., search heads, indexers, and/or forwarders). In an embodiment, nodes of distributed computer system 1800 are communicatively coupled via networks 1815. Networks 1815 broadly represent one or more LANs, WANs, cellular networks (e.g., LTE, HSPA, 3G, and other cellular technologies), and/or networks using any of wired, wireless, terrestrial microwave, or satellite links, and may include the public Internet.

The configuration files of distributed computer system 1800 are used to determine the behavior and functionality of the nodes. For example, configuration files include information regarding system settings, user interface settings, authentication and authorization information, index mappings and settings, deployment and cluster configurations, knowledge objects and saved search, other customizations, etc. In one embodiment, configuration files are identified by the .conf extension appended to the end of the file name. It should be appreciated that some configurations are uniform across all node classes, while other configurations are available for particular node classes, or for particular nodes of a node class.

Central repository 1812 provides a centralized location for maintaining the configuration files for all nodes of distributed computer system 1800, allowing for unification of the maintenance of the configuration files, and consistent management of updates and changes to the configuration files. Updates to the configuration files are received at management node 1810 (e.g., via an administrator user interface 1805) and are propagated to the nodes of search head cluster 1820, indexer cluster 1822, and forwarders 1824. In one embodiment, as described below, updates to the configuration files of search head cluster 1820 can also be received at the search head nodes, with these updates being propagated to central repository 1812.

In accordance with various embodiments, changes made to configuration files of central repository 1812 are propagated to nodes of the respective node classes via a mediator node 1830 (shown in FIG. 18A as mediator nodes 1830a-c). The functionality of a mediator node is dependent on the node class, and may include additional functionality beyond the propagation of configuration files. For example, the mediator node may be a search head cluster deployer or a captain for search head nodes, a cluster master or a coordinator for indexer nodes, or a deployment server for forwarder nodes The configuration files of central repository 1812 represent a desired system state of distributed computer system 1800. Each node of distributed computer system 1800 includes a local data store for storing its configuration files. The configuration files of central repository 1812 are the authoritative version of the configuration files, such that each node operates to maintain consistency with the configuration files of central repository 1812. In accordance with various embodiments, changes to the configuration files of central repository 1812 are replicated to nodes of distributed computer system 1800. The desired system state is distinguished from the actual system state, which is representative of the actual configurations of the nodes of the system, including those that have not yet synchronized with the central repository. For example, it should be appreciated that the desired state may take time to materialize in the nodes, and that various mechanisms may be utilized to provide status and visibility into the actual current state and the progress of deploying the desired state.

Since all configurations files are maintained in a single location, the central repository 1812 allows for simple backups, versioning, and migration. By maintaining the configuration files in the authoritative state (e.g., the desired state), central repository 1812 holds an eventually consistent view of all configurations in the distributed computer system 1800. The central repository 1812 replicates the configurations to the nodes, and, in the case of search head nodes, the configuration files can be replicated to central repository 1812.

Figure 18B:
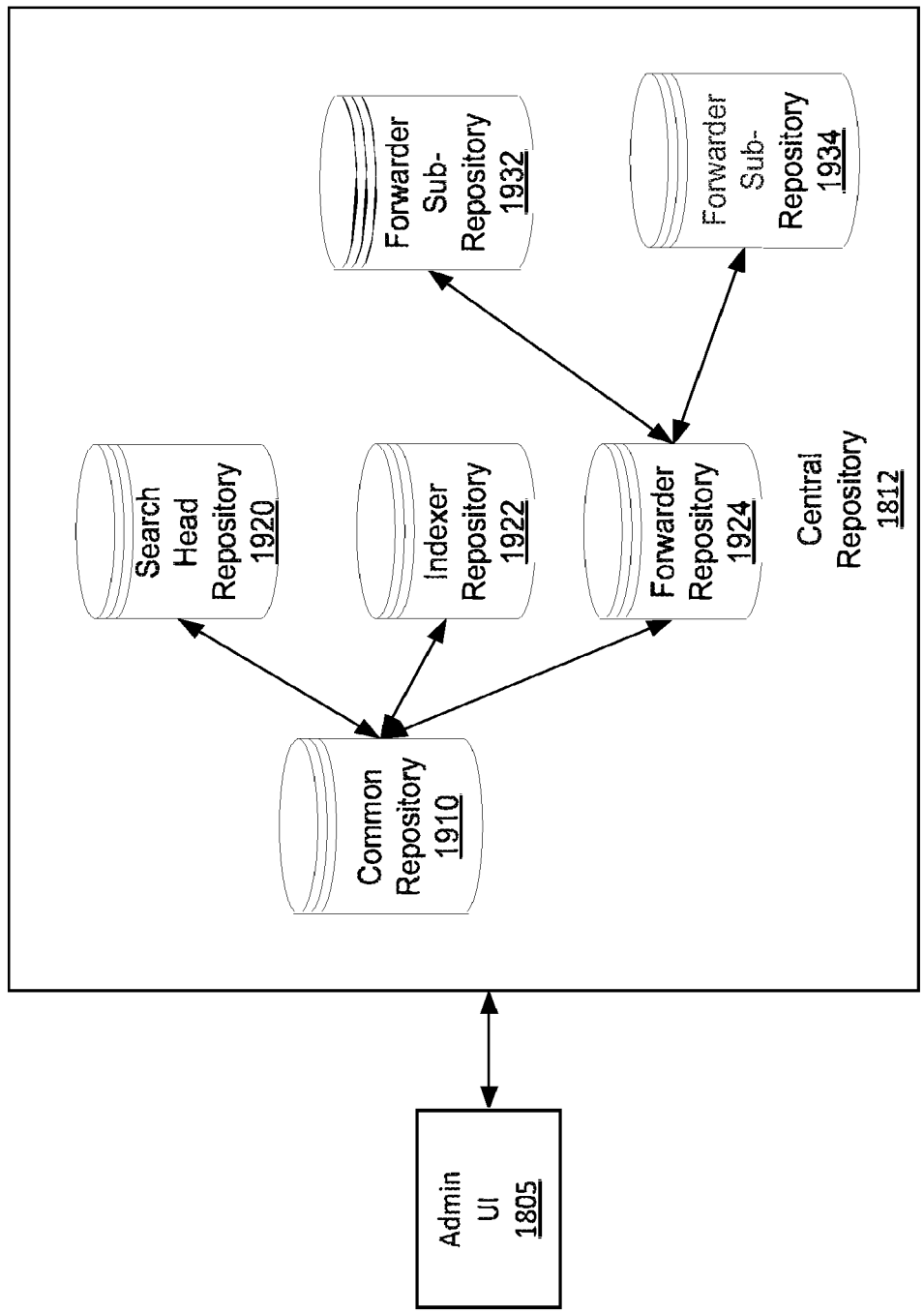
FIG. 18B illustrates a block diagram of an example organization of a central repository of configuration files across nodes of different node classes, in accordance with some embodiments.

FIG. 18B illustrates a block diagram of an example organization of a central repository 1812 of configuration files across nodes of different node classes, in accordance with some embodiments. While some configuration files of nodes of distributed computer system 1800 are specific to particular node classes, in some embodiments, certain configuration files may be common to all node classes. Accordingly, common configuration files may be maintained in common repository 1910, and node class specific configuration files may be maintained in node specific portions of central repository 1812. As illustrated, search head configuration repository 1920 maintains the configuration files for search head nodes, indexer configuration repository 1922 maintains the configuration files for indexer nodes, and forwarder configuration repository 1924 maintains the configuration files for forwarder nodes.

In various embodiments, the node class specific portions of the central repository 1812 may be further organized according to sub-portions of the node class specific repository. For example, as shown in FIG. 18B, forwarder repository 1924 is communicatively coupled to forwarder sub-repository 1932 and forwarder sub-repository 1934. These sub-repositories operate to share common configurations to all forwarders, while also maintaining specific configuration files for respective subsets of forwarder nodes. For example, different server classes may have different configuration files for forwarder nodes. The sub-repositories of central repository 1812 maintain configuration files for the respective subsets of forwarder nodes, and propagate those configuration files to the respective subsets of the forwarder nodes. It should be appreciated that central repository 1812 may be logically organized using any number of sub-repositories, as well as further repositories dependent on higher level repositories, depending on the organization of the components of distributed computer system 1800.

With reference to FIG. 18A, in various embodiments, for some portions of central repository 1812, such as the search head nodes of search head cluster 1820, two-way replication can be used, as changes to the configuration files may also be received directly at the search nodes. In some embodiments, for other portions of central repository 1812, such as forwarder nodes and indexer nodes, one-way replication, outward from the central repository 1812 is available. For example, changes to the forwarder nodes and indexer nodes may not be available directly, requiring such changes to be made at management node 1810.

Figure 19:
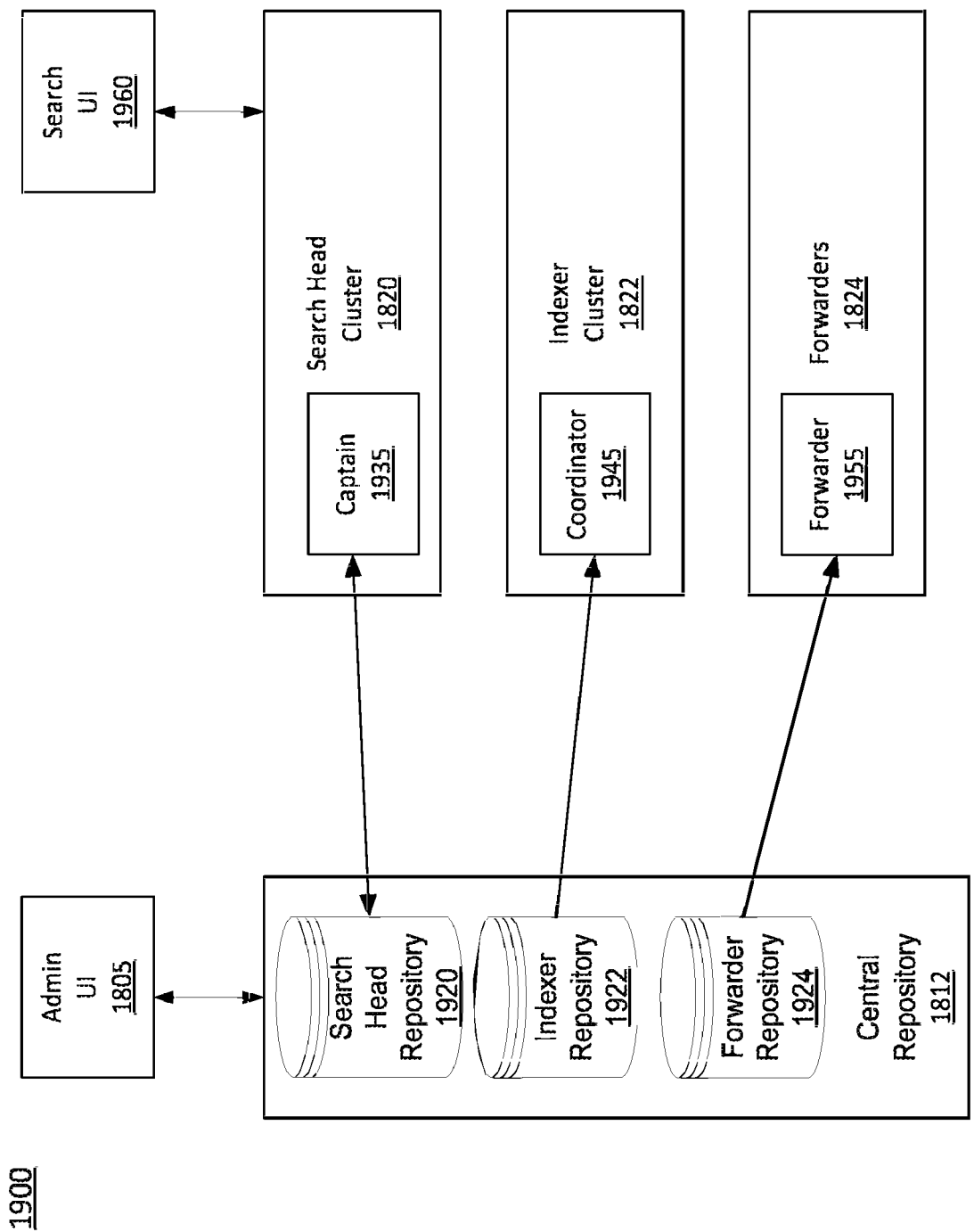
FIG. 19 illustrates a data flow diagram of the propagation of configuration files between a central repository of configuration files and nodes of the example distributed computer system, in accordance with some embodiments.

FIG. 19 illustrates a data flow diagram 1900 of the propagation of configuration files between a central repository 1812 of configuration files and nodes of the example distributed computer system 1800, in accordance with some embodiments. In one embodiment, central repository 1812 is partitioned into different sub-repositories for each node class. As illustrated, search head configuration repository 1920 maintains the configuration files for nodes of search head cluster 1820, indexer configuration repository 1922 maintains the configuration files for nodes of indexer cluster 1822, and forwarder configuration repository 1924 maintains the configuration files for nodes of forwarders 1824.

In accordance with various embodiments, changes made to configuration files of central repository 1812 are propagated to nodes of the respective node classes via a mediator node. As described above, the functionality of the mediator node is dependent on the node class, and may include additional functionality beyond the propagation of configuration files. For example, the mediator node may be a search head cluster deployer or a captain for search head nodes, a cluster master or a coordinator for indexer nodes, or a deployment server for forwarder nodes.

With reference to search head cluster 1820, in various embodiments, changes in configuration files of the search head nodes are replicated to other head nodes through captain 1935. For example, in some embodiments, search head cluster replication utilizes a search head configuration repository located at captain 1935. In various embodiments, the search head configuration repository manages deltas and checkpoints/snapshots for each node of search head cluster 1820. A change made in search head repository 1920 is propagated to captain 1935, which then propagates the changes to the nodes of search head cluster 1820. As described above, in various embodiments, captain 1935 can be another type of mediator, such as a search head cluster deployer. In other embodiments, the changes can be propagated directly to the nodes of the search head cluster 1820.

It should be appreciated that changes to the configuration files can also be received via search UI 1960. When changes are made to a search head cluster node (e.g., via a REST call), the node's configuration files are updated. These updates can be received either at central repository 1812 or directly at a search head node of search head cluster 1820, wherein the replication procedures across the nodes is the same. In some embodiments, the changes themselves are recorded as deltas (e.g., in a file called ops.json). Search head cluster nodes asynchronously replicate their configuration files to the captain by transmitting deltas. For example, this is accomplished by first "pulling" the search head configuration repository from the captain 1935, then merging the local changes, then pushing the merged deltas back to the captain 1935. The initial pull request will download a snapshot from the captain 1935 to establish a baseline. This snapshot overwrites the local configuration file. Therefore, nodes begin by accessing the search head configuration repository from the captain, and thereafter pull and push deltas. In various embodiments, snapshots are also maintained on the search head cluster nodes in the event that node is ever elected as a captain (as the search head cluster allows for dynamic election of the captain should the captain fail or the cluster become partitioned).

It should be appreciated that since the configuration file pull/push happens periodically and/or asynchronously, there is no requirement for continuous connectivity between search head nodes and the captain 1935. Pull and push operations can proceed whenever the captain is visible. In the intervening times, the members can receive REST create, read, update and delete (crud) commands, which may buffered in deltas. This allows the search head nodes to operate indefinitely without being able to see the captain 1935. In other words, the search head nodes can remain available if they are not able to access captain 1935. In various embodiments, a partition divides search head cluster 1820 into a majority and a minority. The captain 1935 will always live in the majority partition (or will be re-elected in the majority, since majority is a requirement for captainship). Search head nodes in the majority partition will continue to replicate their changes at the periodic rate. Search head nodes in the minority partition buffer their individual changes and will merge them when the partition is healed. Therefore, availability has different meaning depending on if a particular search head node can see the captain 1935 or not.

Examples of functionality that enables replication of configuration files among nodes of a search head cluster are described in U.S. patent application Ser. No. 14/448,919, entitled "CONFIGURATION REPLICATION IN A SEARCH HEAD CLUSTER", filed on 31 Jul. 2014, and which is hereby incorporated by reference in its entirety for all purposes.

With reference to indexer cluster 1822, in various embodiments, changes in configuration files of the indexer nodes are replicated to other indexer nodes through coordinator 1945. For example, in some embodiments, indexer node replication utilizes an indexer configuration repository located at coordinator 1945. In various embodiments, the indexer configuration repository manages deltas and checkpoints/snapshots for each node of indexer cluster 1822. A change made in indexer repository 1922 is propagated to coordinator 1945, which then propagates the changes to the nodes of indexer cluster 1822. As described above, in various embodiments, coordinator 1945 can be another type of mediator, such as a cluster master. In other embodiments, the changes can be propagated directly to the nodes of the indexer cluster 1822.

With reference to forwarders 1824, in various embodiments, changes in configuration files of the indexer nodes are replicated to other forwarder nodes through forwarder 1955. For example, in some embodiments, forwarder node replication utilizes an forwarder configuration repository located at forwarder 1955. In various embodiments, the forwarder configuration repository manages deltas and checkpoints/snapshots for each node of forwarders 1824. A change made in forwarder repository 1924 is propagated to coordinator 1945, which then propagates the changes to the nodes of forwarders 1824. As described above, in various embodiments, coordinator 1945 can be another type of mediator, such as a deployment server. In other embodiments, the changes can be propagated directly to the nodes of the forwarders 1824.

In various embodiments, propagation of configuration changes may trigger reloads of impacted systems or subsystems.

Figure 20:
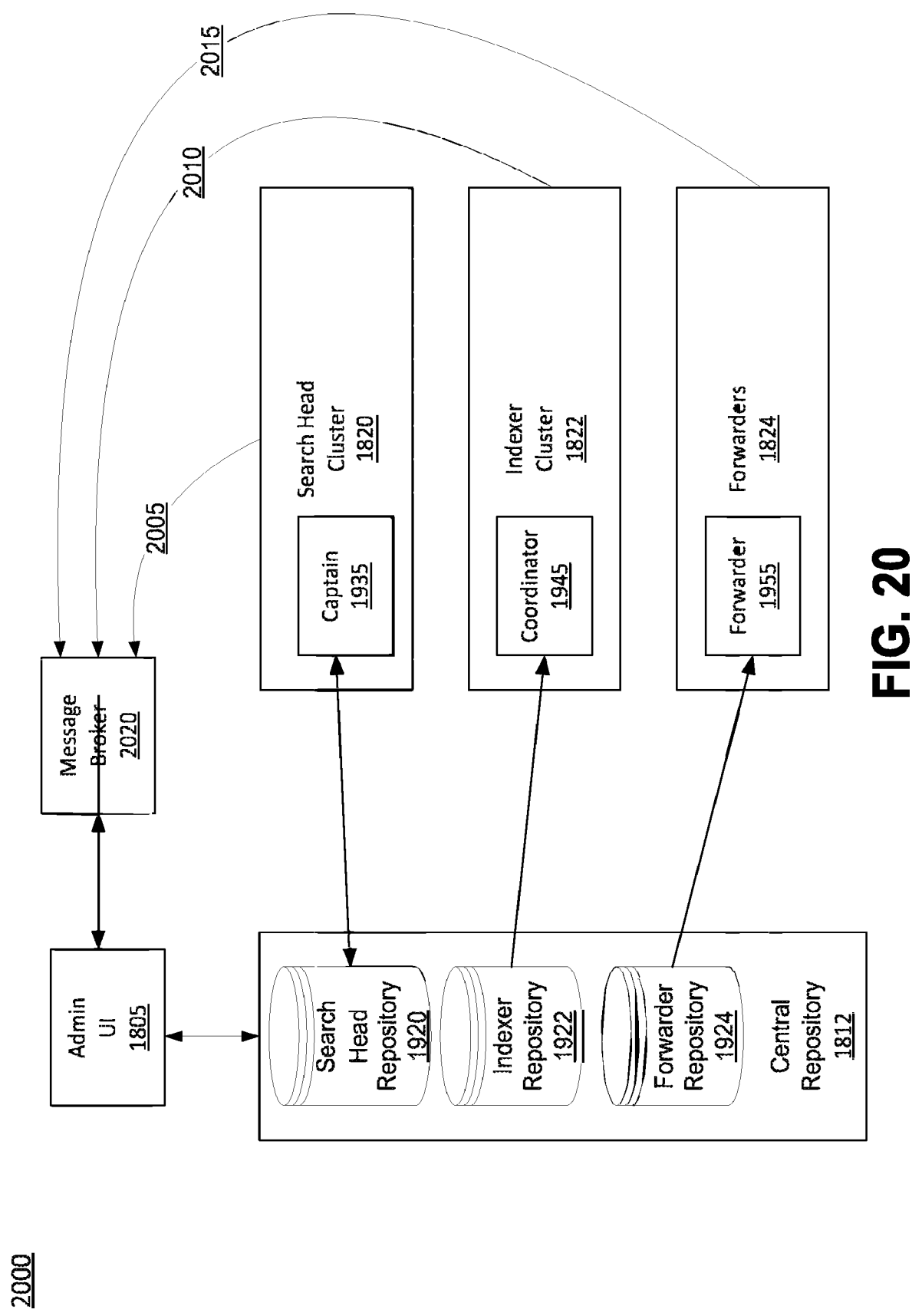
FIG. 20 illustrates a data flow diagram of the asynchronous feedback of the configuration status of nodes of the example distributed computer system, in accordance with some embodiments.

FIG. 20 illustrates a data flow diagram 2000 of the asynchronous feedback of the configuration status of nodes of the example distributed computer system 1800, in accordance with some embodiments. Upon receiving a change in the configuration files, a node transmits a message indicating the status of the change (e.g., that the configuration was updated successfully, or that the configuration failed for a stated reason). The messages are transmitted asynchronously, allowing for nodes to notify of their respective configuration status at the time the node is able to receive the configuration change.

In various embodiments, as described above, it is the responsibility of the configuration replication operation of a node class to inform the node itself that changes to configuration have arrived. In one embodiment, this can take the form of an observer/observable or callback based API to configuration files. For example, the present embodiment does not require a sideband channel to signal the node that configuration has changed. Rather, change listeners on the node are automatically invoked when the local configuration file is updated. In one embodiment, real-time interactive feedback is provided to administrator UI 1805, regarding the progress of configuration changes (e.g., rolling out an index). The feedback can be provided, for example, via a message bus, or through updating observable collections.

As shown in FIG. 20, asynchronous notifications 2005, 2010 and 2015 are communicated to administrator UI 1805 from nodes of distributed computer system 1800. In one embodiment, a publish/subscribe (pub/sub) style message bus insures that messages are reliably delivered. It should be appreciated that the messages are used to provide feedback. The messages inform the administrator UI 1805 (or other interested actors) as nodes activate the changes that they receive from central repository 1812. It should be appreciated that changes to the central repository 1812 may generate observable events that the nodes act on. Therefore, another method of receiving notification of change is through registering remote listener callbacks for messages stored in the central repository. This provides a higher level abstraction than the message bus, though the message bus may be used beneath the API to implement the communication.

In one embodiment, message broker 2020 operates to communicate asynchronous notifications 2005, 2010 and 2015 to administrator UI 1805 from nodes of distributed computer system 1800. For example, message broker 202 receives and stores asynchronous notifications 2005, 2010 and 2015 intended for administrator UI 1805. In the event that administrator UI 1805 is unavailable, message broker 2020 acts as persistent storage for asynchronous notifications 2005, 2010 and 2015. Upon the availability of administrator 1805 to receive communications, message broker 2020 communicates asynchronous notifications 2005, 2010 and 2015 to administrator UI 1805.

Figure 21:
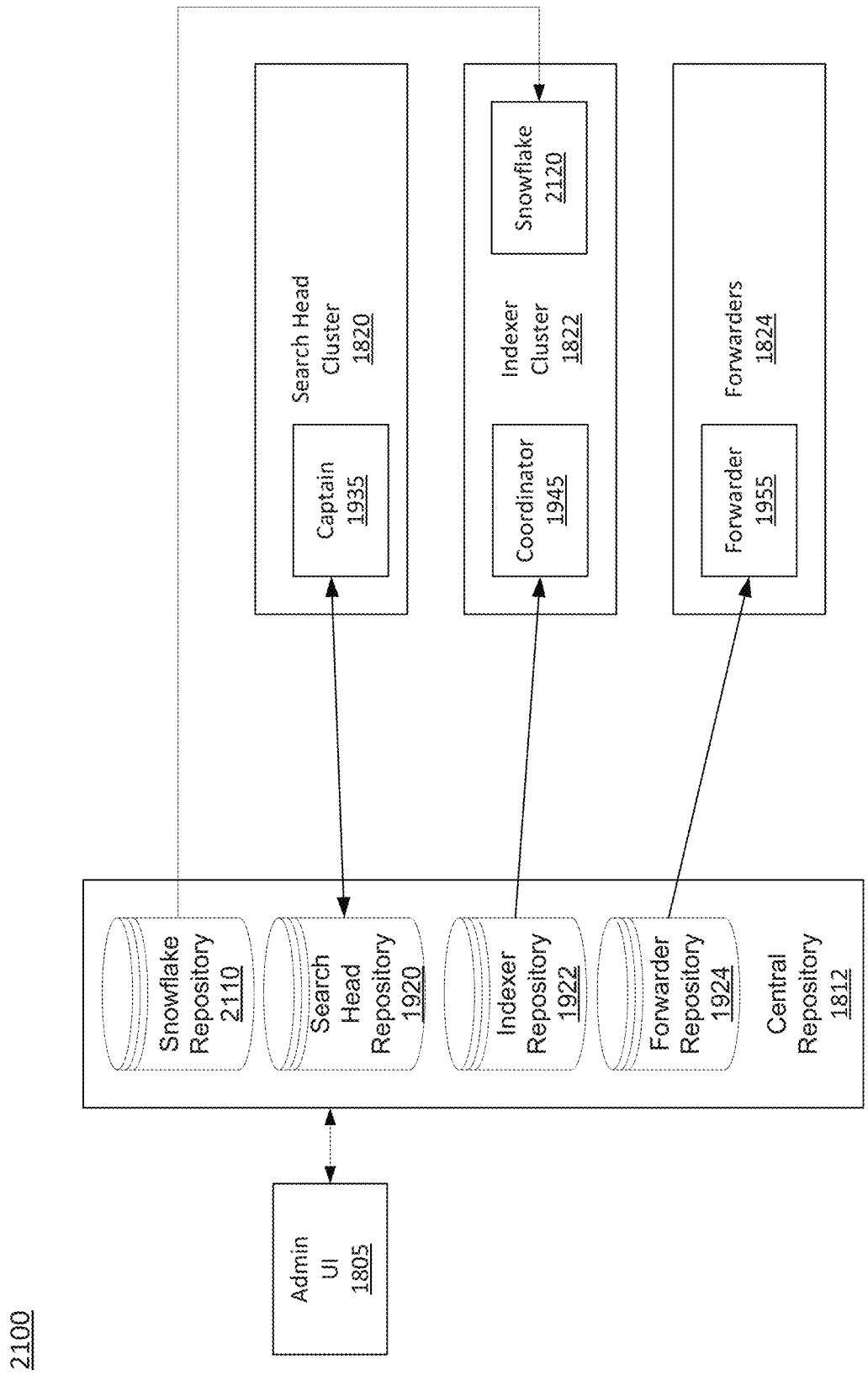
FIG. 21 illustrates a data flow diagram of the maintenance and propagation of configuration files to specific nodes (e.g., snowflake nodes) of the example distributed computer system, in accordance with some embodiments.

FIG. 21 illustrates a data flow diagram 2100 of the maintenance and propagation of configuration files to specific nodes (e.g., snowflake nodes) of the example distributed computer system 1800, in accordance with some embodiments. Similar to the example organization of central repository 1812 described in accordance with FIG. 18B, it may be desirable to allow for arbitrary configuration changes to specific nodes. In various embodiments, creating and maintaining a separate snowflake repository 2110 allows for the maintenance and propagation of configuration files to members of the snowflake nodes.

As shown in FIG. 21, indexer cluster 1822 includes snowflake 2120. It should be appreciated that snowflake 2120 may include any number of nodes of the indexer cluster 1822, and that these nodes receive configuration changes from snowflake repository 2110. It should further be appreciated that snowflake 2120 may include a mediator node (e.g., a coordinator) for propagating configuration changes to the nodes of snowflake 2120, or the changes may be propagated directly to the nodes of snowflake 2120. While FIG. 21 illustrates that snowflake 2120 resides in indexer cluster 1822, it should be appreciated that a snowflake can reside in any node class, and that there can be any number of snowflakes and corresponding snowflake repositories.

Figure 22:
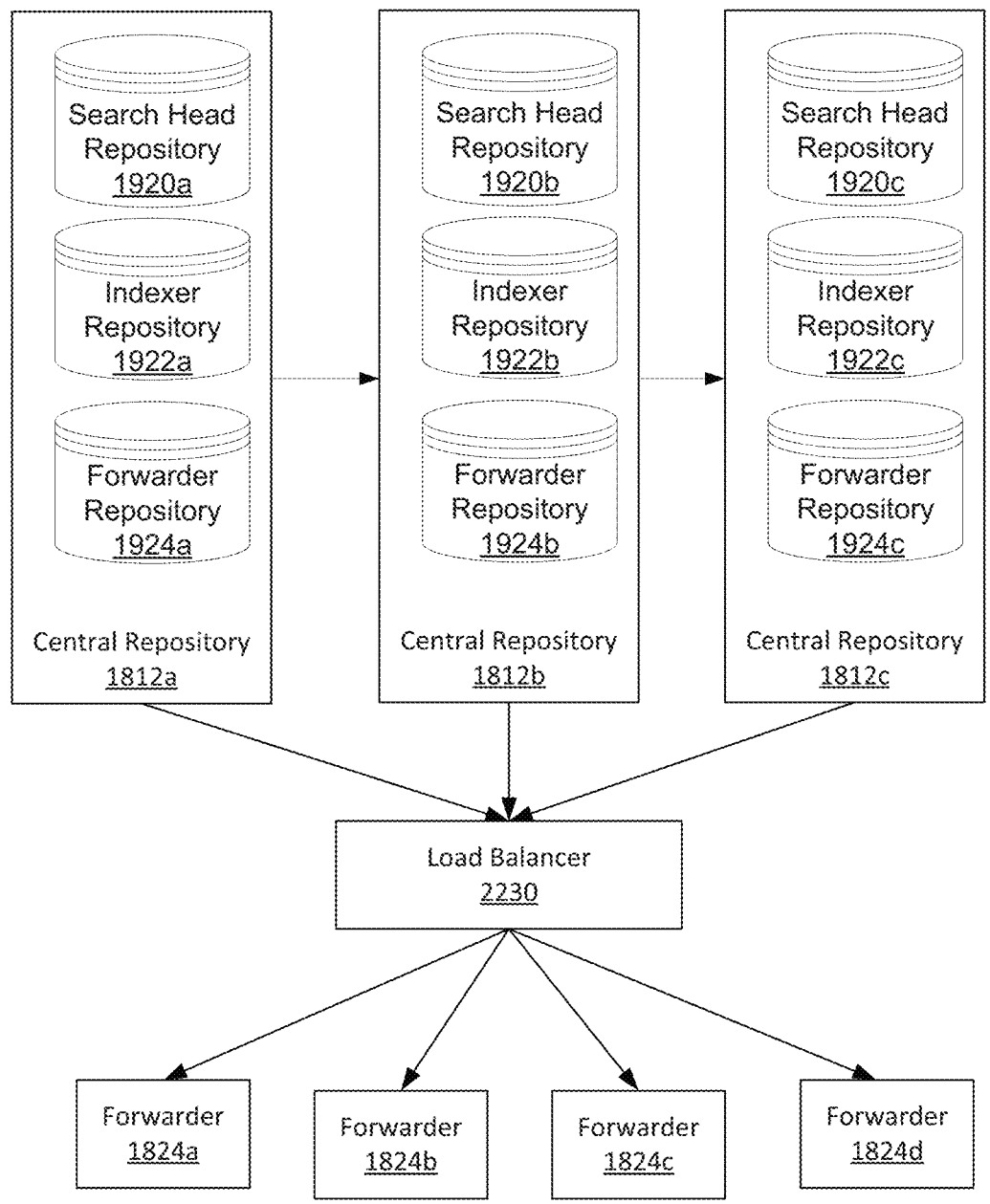
FIG. 22 illustrates a data flow diagram of an example propagation of configuration files to forwarder nodes, in accordance with some embodiments.

FIG. 22 illustrates a data flow diagram 2200 of an example propagation of configuration files to forwarder nodes, in accordance with some embodiments. As illustrated, forwarder node scalability is handled by horizontally scaling the central repository 1812 into multiple instances (central repositories 1812a, 1812b and 1812c). These instances are peered and include the same configuration files within the respective node class repositories. By peering these instances, consistency across central repositories 1812a, 1812b and 1812c is maintained. Load balancer 2230 balances the propagation of configuration files to forwarders 1824a-d. Since central repositories 1812a, 1812b and 1812c include the same configuration files, forwarder 1824a-d can receive the configuration files from any of the peered central repositories. Load balancer 2230 dictates which instance of the central repository that a forwarder receives its configuration files from.

It should be appreciated that many different topologies are possible for syncing replicated central repositories. For example, the central repositories can be replicated using a hub and spoke arrangement, a ring arrangement, a pyramid arrangement, or any other type of topology.

In other embodiments, the central repository can initialize itself from a deployment. For instance, all the information stored in the central repository exists on cluster nodes. Central repositories can be brought up "from scratch" by starting a new central repository and connecting it to a deployment (e.g., a distributed computer system 1800). The deployment can continue to operate in the absence of any central repositories, although some management functions may not be available. Accordingly, the centralized repository does not introduce a point of failure. In some embodiments, high availability is achieved by maintaining a standby central repository included a replicated version of the active central repository. The same replication described above for replicating configuration files between nodes and the central repository can be used to replicate files between central repositories. The central repository is replicated so that the standby central repository is ready for active use if the active central repository goes down.

In various embodiments, a multisite configuration of the distributed computing network is available by peering the central repositories across the multiple locations. Each site has its own dynamic captain, and the sites are "peered" by their central repositories. Instead of every node in one site talking to the captain in another site, the central repositories consolidate the communication. In effect, each site has a separate search head cluster, but they are kept in sync. This is both more efficient, and easier to reason about than a single search head cluster, spanning two sites, with a captain that lives only in one site. In the event that the sites are disconnected and experience a configuration drift, the process of resolving the drift is greatly simplified since only two nodes are involved in the "reconnect and resolve" process.

In various embodiments, configuration changes made at the central repository 1812 are received via administrator user interface 1805. For example, representational state transfer (REST) APIs are presented on a single management node 1810 that maintains a view of the configuration state of distributed computer system 1800. Many capabilities, such as listing system objects, and validating proposed changes can be performed by operating on central repository 1812 representing the desired state of the configuration files. The nodes operate to remain in synchronization with this desired state. For some node classes, such as search head nodes, syncing can be triggered so that changes can "push" the cluster as soon as they occur. For other node classes, such as forwarder nodes, network topologies and other considerations may necessitate the use of a "pull" model. In various embodiments, some types of configuration edit operations, such as simple stanza changes, are propagated as deltas. For other types of configuration edit operations, such as applications, the changes may be transmitted as binary large objects (BLOBs).

For example, when a client asks the REST API of management node 1810 to list some objects (e.g., the indexes), the REST API can return this information without communicating with any nodes from the distributed computer system 1800. In other words, "list" or "read" operations will read from the configuration files of central repository 1812. In various embodiments, management operations read from a trunk of the central repository 1812, where the trunk represents that committed changes to the configuration files, thus representing the desired system state.

In various embodiments, changes made to the configuration of are first made to branches of the central repository 1812. A change is submitted to central repository 1812 in a transaction, where the transaction is effectively a branch of the trunk of central repository 1812. The branch can be read in a similar manner as the trunk to the administrator making the changes. However, since the branch represents a non-committed change, other administrators do not see the branch. When a transaction commits, it is determined whether there are conflicts between the trunk and the branch. If there are no conflicts, the branch is merged with the trunk. In other words, if there are zero conflicts between branches, then the merge succeeds. If there were any conflicts (e.g., caused by another transaction committing prior to this one), then the merge fails. In one embodiment, the branch remains open, and the administrator is invited to resolve the conflicts.

Figure 23:
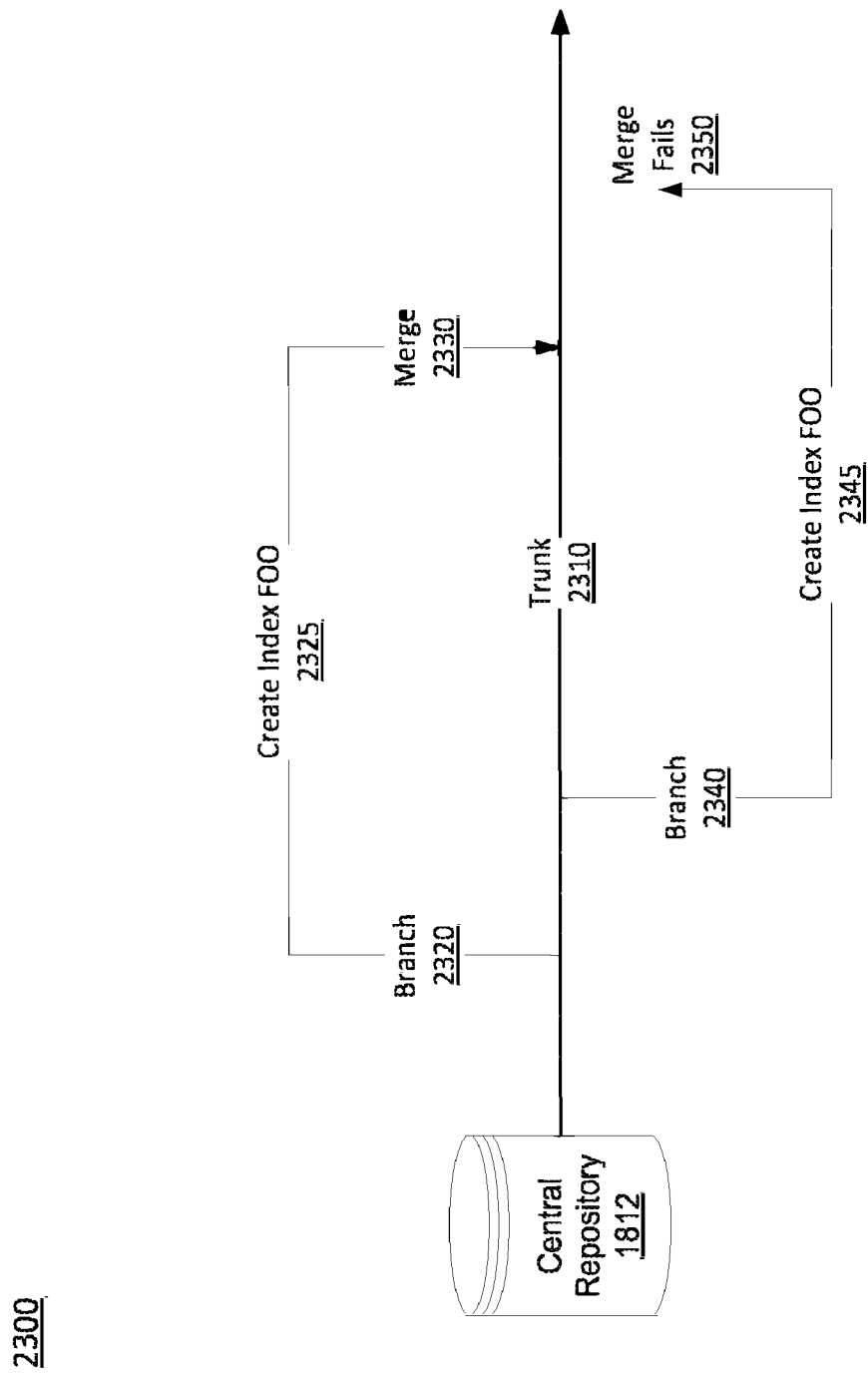
FIG. 23 illustrates an example flow diagram for committing configuration changes to the central repository, and for resolving conflicts, in accordance with various embodiments.

FIG. 23 illustrates an example flow diagram for committing configuration changes to the central repository, and for resolving conflicts, in accordance with various embodiments. Consider the case when two administrators are concurrently making changes to central repository 1812. For example, an Admin A creates 2325 an index named "foo," but has not yet deployed the index. Admin A effectively creates a branch 2320 of trunk 2310, where trunk 2310 represents the committed configuration files of central repository 1812. Concurrently, Admin B also creates 2345 an index named "foo," resulting in the creation of branch 2340. Admin A and Admin B are not able to see each other's changes until the change is committed to the trunk. Admin A then commits their change prior to Admin B attempting to commit the conflicting change, merging 2330 branch 2320 into trunk 2310. When Admin B attempts to commit the change, the merge 2350 will fail because the index with the same name has already been created. For instance, the transaction will not be merged with the trunk, and Admin B might be presented with a message such as: "Index creation failed: an index named FOO already exists."

In various embodiments, the following REST APIs are used to support the following operations:
/services/transaction/
   POST returns a transaction ID (same thing as a branch name). Internally the repo is branched.
   GET returns the list of transaction IDs
/services/transaction/<ID>
   POST commits the transaction. Returns 409 Conflict on merge failures caused by conflicts.
   GET returns the status of the transaction:
     [SUCCEEDED|OPEN|FAILED}
      the list of confOps (edit operations) that have occurred during the transaction, including operations that failed to merge if the transaction is FAILED
   DELETE removes the branch/transaction (only works if the transaction <ID> is currently OPEN).

/services/clusterstate
   GET returns the state of the cluster with respect to transactions (branches) that have been successfully committed (merged). This returns a map where the key is Node ID, and the value is the transaction ID that the node is currently "at". This endpoint can be polled in order to monitor the progress of a transaction.

All existing REST APIs that perform create, read, update, or delete (CRUD) on the central repo have a API parameter that indicate the transaction ID (aka 'branch ID') to which the requested CRUD applies.

If an enterprise application integration (EAI) REST call is invoked without a transaction ID, the REST behavior is identical to that of single-node. However, internally the global transaction ID generator is incremented if the call succeeds (this is necessary so that the /services/clusterstate endpoint's response, can still indicate the transaction ID that each node is at).

In various embodiments, REST EAI actions can group together a sequence into a transaction. For example, the administrator could:
1. Create a transaction
2. create an index
3. create an input
4. create a source type
5. commit If the administrator wants to schedule the deployment of the changes at a later time, the commit (Step 5) can be scheduled at some time in the future.

3.1. Example Processes of Operation

FIGS. 24-27 illustrate flow diagram 2400 of example processes, according to various embodiments. Procedures of these processes will be described with reference to elements and/or components described above. It is appreciated that in some embodiments, the procedures may be performed in a different order than described, that some of the described procedures may not be performed, and/or that one or more additional procedures to those described may be performed. Flow diagram 2400 includes some procedures that, in various embodiments, are carried out by one or more processors under the control of computer-readable and computer-executable instructions that are stored on non-transitory computer-readable storage media. It is further appreciated that one or more procedures described in flow diagram 2400 may be implemented in hardware, or a combination of hardware with firmware and/or software.

FIG. 24 illustrates a process 2400 for configuring a distributed computer system comprising a plurality of nodes of a plurality of node classes, in accordance with some embodiments. In some embodiments, a data intake and query system (e.g., system 108) performs at least a portion of process 2400. Process 2400 starts by storing, at 2410, configuration files for a plurality of nodes of each of the plurality of node classes are stored in a central repository. The configuration files include information representing a desired system state of the distributed computer system, and the distributed computer system operates to keep an actual system state of the distributed computer system consistent with the desired system state. the plurality of node classes includes forwarder nodes for receiving data from an input source, indexer nodes for indexing the data, and search head nodes for searching the data. In one embodiment, the central repository is configured to maintain a plurality of versions of the configuration files.

In one embodiment, the central repository includes a common configuration file sub-repository for maintaining configuration files common to the plurality of nodes of the plurality of node classes, a forwarder configuration sub-repository for maintaining configuration files for the forwarder nodes, an indexer configuration sub-repository for maintaining configuration files for the indexer nodes, and a search head configuration sub-repository for maintaining configuration files for the search head nodes. In one embodiment, configuration files for specific nodes are stored in a particular portion of the central repository, the configuration files for the specific nodes allowing for arbitrary configuration changes to the specific nodes.

At 2420, responsive to receiving changes to the configuration files, the changes are propagated to nodes of the plurality of nodes impacted by the changes based on a node class of the nodes impacted by the changes. In one embodiment, responsive to receiving changes in the configuration files impacting the search nodes, the changes are propagated to the search nodes from the central repository. In one embodiment, responsive to changes in the configuration files impacting the index nodes, the changes are propagated to the index nodes from the central repository. In one embodiment, responsive to changes in the configuration files impacting the forwarder nodes, the changes are propagated to the forwarder nodes from the central repository.

In one embodiment, the changes to the configuration files are received from a single management node of the distributed computer system. In one embodiment, the changes are made to the plurality of nodes via a representational state transfer (REST) call.

In another embodiment, the changes are propagated from the central repository to a mediator node of the node class impacted by the changes. The changes are then propagated from the mediator node to the nodes impacted by the changes. In one embodiment, the changes are propagated from the central repository to a search head captain node of the search head nodes. The changes are then propagated from the search head captain node to the search head nodes impacted by the changes. In one embodiment, the changes are propagated from the central repository to a cluster master of the indexer nodes. The changes are then propagated from the cluster master to the indexer nodes impacted by the changes.

In one embodiment, portions of the nodes of the plurality of nodes impacted by the changes are reloaded. In one embodiment, responsive to changes in the configuration files comprising a stanza change, a delta of the stanza change is propagated to the nodes of the plurality of nodes impacted by the changes.

In one embodiment, as shown at 2430, responsive to receiving changes in the configuration files at a search node, the changes are propagated to the central repository from the search node.

Figure 25:
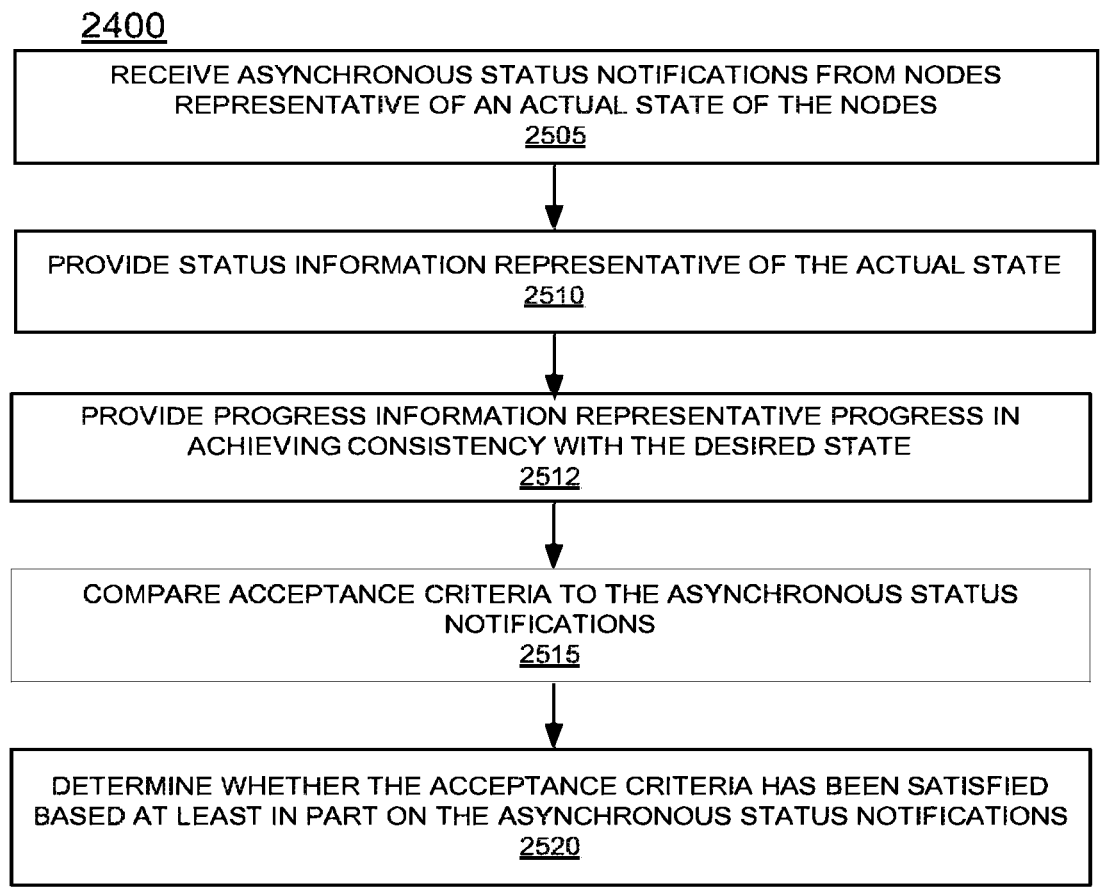

In another embodiment, process 2400 proceeds to 2505 of FIG. 25, where, asynchronous status notifications representative of an actual state of the nodes are received from the nodes. In one embodiment, as shown at 2510, status information representative of the actual state of the distributed computer system is provided. As shown at 2512, progress information representative of progress in achieving consistency with the desired state of the distributed computer system is provided. In another embodiment, as shown at 2515, acceptance criteria are compared to the asynchronous status notifications. At 2520, it is determined whether the acceptance criteria have been satisfied based at least in part on the asynchronous status notifications.

Figure 26:
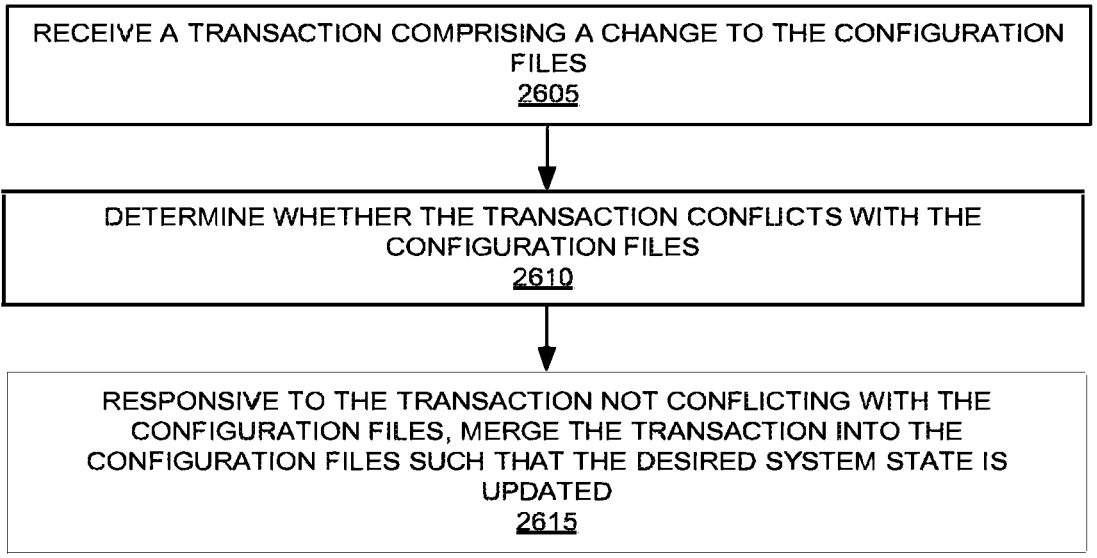

In another embodiment, process 2400 proceeds to 2605 of FIG. 26, where a transaction comprising a change to the configuration files is received. In one embodiment, the transaction further comprises acceptance criteria for the change to the configuration files. In one embodiment, as shown at 2610, it is determined whether the transaction conflicts with the configuration files. At 2615, responsive to the transaction not conflicting with the configuration files, the transaction is merged into the configuration files such that the desired system state is updated.

In another embodiment, process 2400 proceeds to 2705 of FIG. 27, where a first transaction comprising a first change to the configuration files is received. At 2710, a second transaction comprising a second change to the configuration files is received, wherein the second transaction is received subsequent to the first transaction. At 2715, the first change is merged into the configuration files. At 2720, it is determined whether the first change conflicts with the second change. At 2725, responsive to the first change conflicting with the second change, the second change is not merged into the configuration files, and a notification that the second change has not been merged into the configuration files is provided.

Described herein are techniques for configuring components of a distributed system through a user interface. Components of distributed system (e.g., system 108 of FIG. 1) are configurable and may refer to configuration files stored locally at each component and/or stored in a central repository (e.g., central repository 1812). These configuration files may involve some level of user configuration to accommodate particular types of data a user desires to analyze and to account for other user preferences. Embodiments described herein provide a user interface for configuring the components of a distributed system.

In various embodiments, a computer-implemented method is provided for configuring a distributed computer system comprising a plurality of nodes of a plurality of node classes, a plurality of configuration controls enabling user configuration of the distributed computer system are displayed via a graphical user interface of a computing device having a display screen. The plurality of configuration controls include a forwarder configuration control for configuring forwarder nodes of a forwarder node class of the distributed computer system, an indexer configuration control for configuring indexer nodes of an indexer node class of the distributed computer system, and a search head configuration control for configuring search head nodes of a search head node class of the distributed computer system. In response to receiving a command for configuring a node of the distributed computer system at the graphical user interface, a control node of the distributed computer system configured for executing the command is identified. The command is issued to the identified control node for execution.

With reference to FIG. 18A, administrator user interface 1805 includes a graphical user interface for providing configuration controls for configuring nodes of the distributed computer system 1800. In various embodiments, the graphical user interface of administrator user interface 1805 provides a unified point of management and control of the configuration of nodes of the distributed computer system 1800.

In various embodiments, the graphical user interface is configured to present status information representative of the actual state of the distributed computer system in response to receiving asynchronous status notifications from nodes. In other embodiments, the graphical user interface is also configured to present progress information representative of the progress made in achieving consistency with the desired state of the distributed computer system.

FIGS. 28A-28D illustrate a series of user interface screens for an example node configuration user interface 2800, in accordance with the some embodiments. As illustrated, node configuration user interface 2800 shows an example node configuration for forwarder nodes. However, it should be appreciated that nodes of any node class (e.g., forwarder nodes, indexer nodes, or search head nodes) can be configured through node configuration user interface 2800.

Figure 28A:
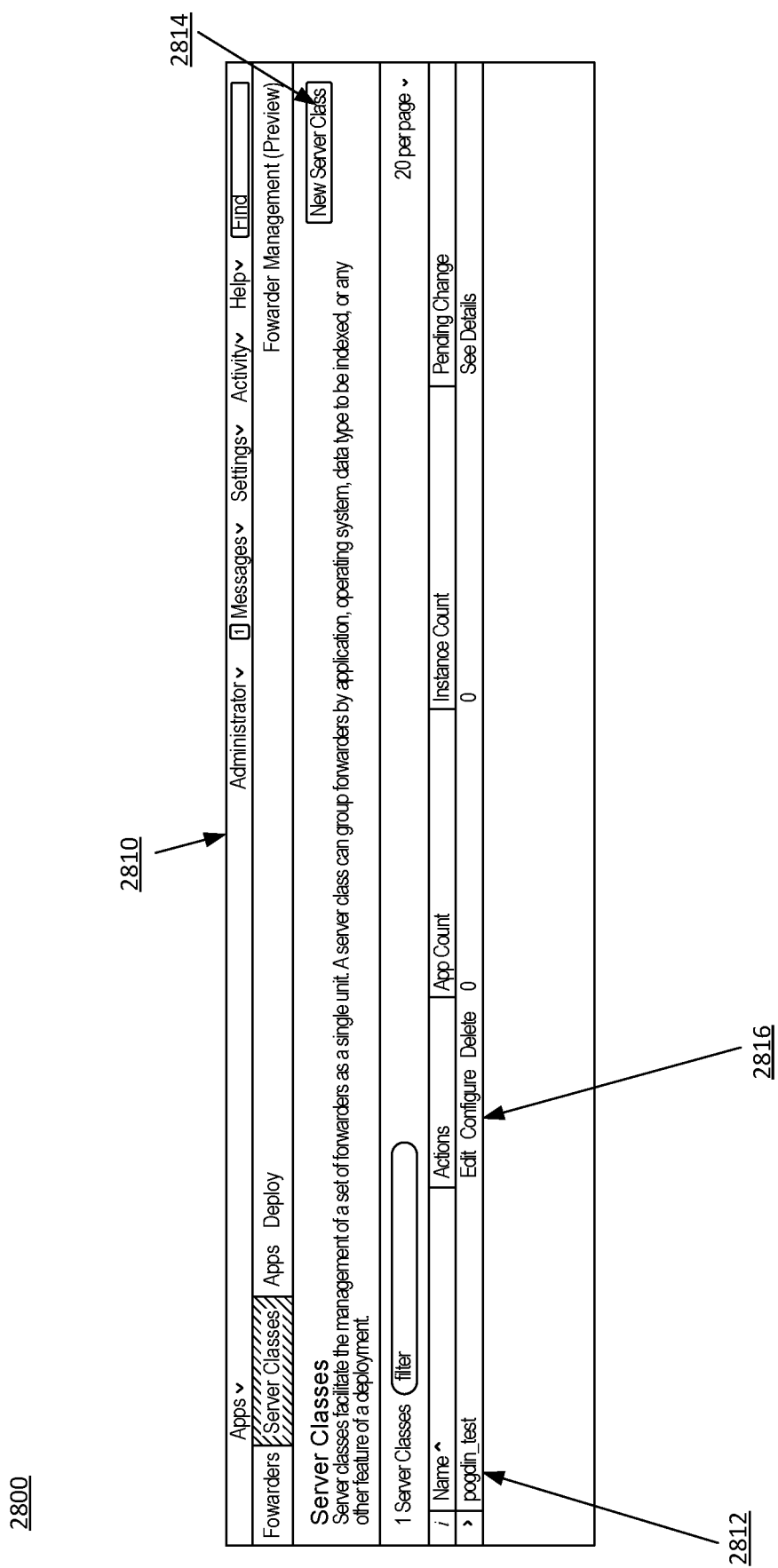

FIG. 28A illustrates example node configuration user interface screen 2810 comprising a list of nodes (or groups of nodes) 2812. While configuration user interface screen 2810 illustrates one group of nodes 2812, it should be appreciated that there can be any number of nodes or groups of nodes, and that the nodes or groups of nodes can be selected from any node class. Control element 2814 provides a selectable control for creating a new node or group of nodes. Actions 2816 provide selectable commands for editing, configuring and deleting the selected node or group of nodes. For example, as shown in FIG. 28A, server classes (e.g., groups of forwarder nodes) are illustrated for facilitating collective management of a group of forwarder nodes.

Figure 28B:
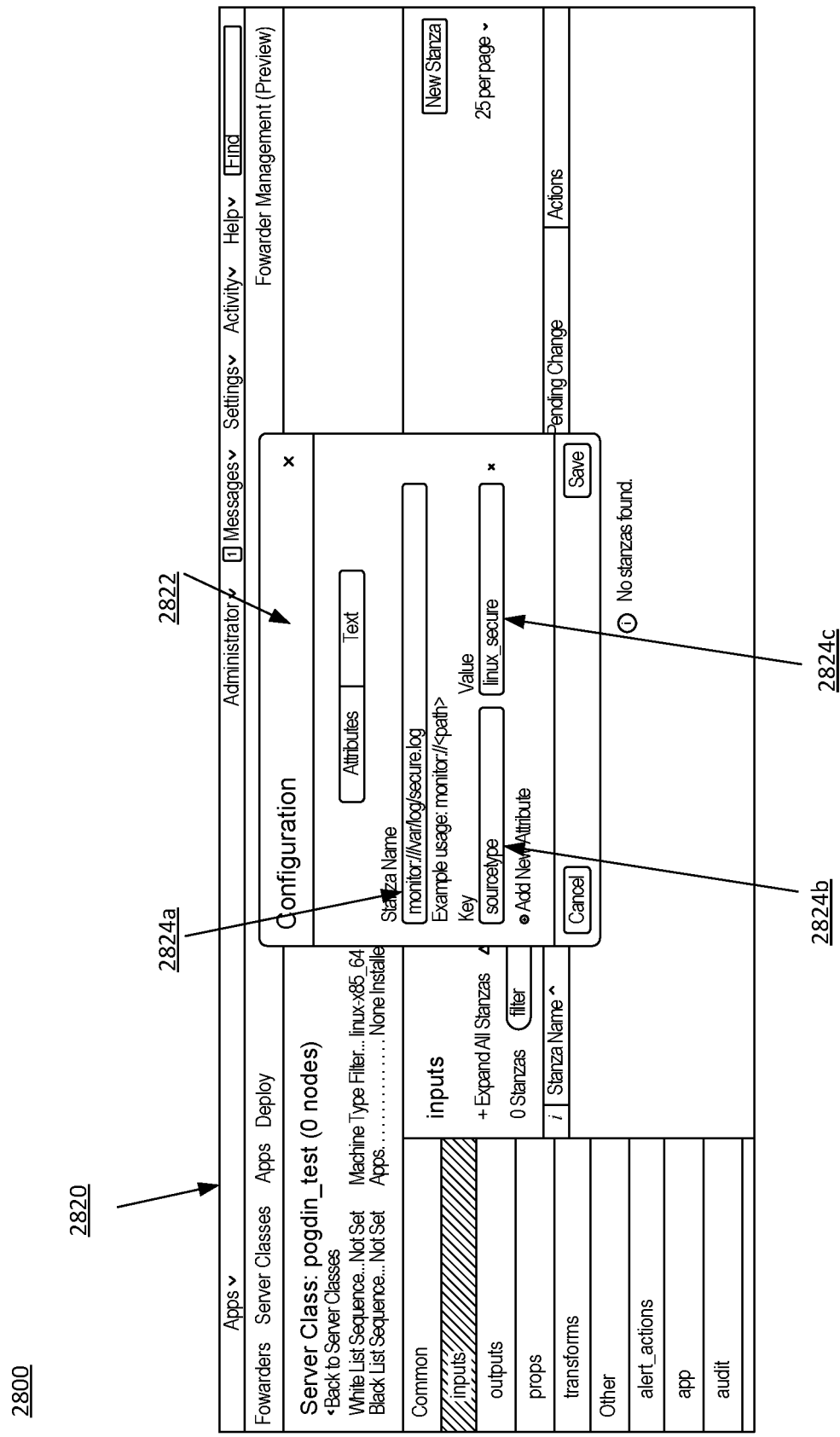

FIG. 28B illustrates example node configuration user interface screen 2820 comprising a node configuration window 2822. Node configuration window 2822 is displayed in response to a user selection of a configuration action 2816. Node configuration window 2822 provides an interface for receiving edits to a configuration file or stanza within a configuration file. As shown, node configuration window 2822 includes selectable fields 2824*a-c*. It should be appreciated that node configuration window 2822 can include any number of selectable fields, and that the number and types of fields are dependent on the node class of the node or group of nodes being configured. For example, selectable fields 2824*a-c* may include text boxes, drop-down lists, menus, list boxes, etc. As shown in FIG. 28B, node configuration window 2822 includes selectable fields for configuring a stanza, including a stanza name field 2824*a*, a key field 2824*b*, and a value field 2824*c*.

Figure 28D:
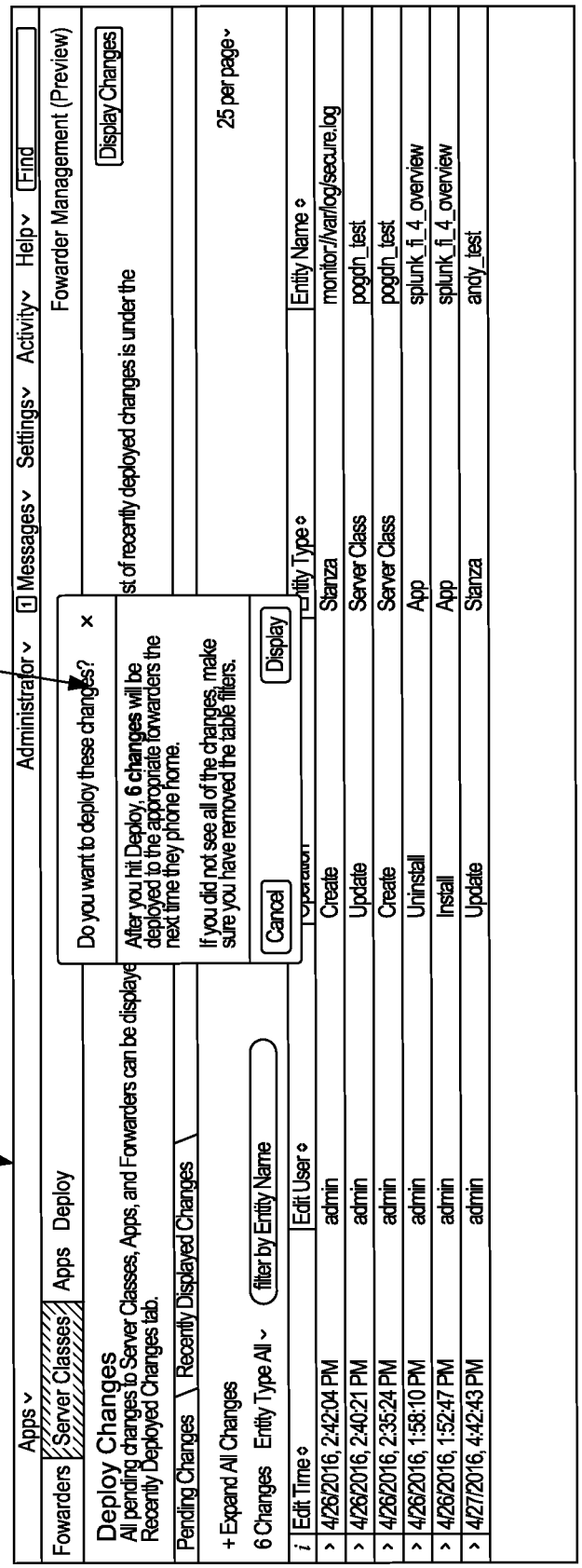

FIG. 28C illustrates and example pending changes user interface screen 2830 including a list of pending changes 2832 made to nodes. Interacting with a pending change 2832, as shown in FIG. 28D, displays a deployment selection window 2842, for receiving a command to deploy the selected change.

FIG. 29 illustrates flow diagram 2900 of example processes, according to various embodiments. Procedures of these processes will be described with reference to elements and/or components described above. It is appreciated that in some embodiments, the procedures may be performed in a different order than described, that some of the described procedures may not be performed, and/or that one or more additional procedures to those described may be performed. Flow diagram 2900 includes some procedures that, in various embodiments, are carried out by one or more processors under the control of computer-readable and computer-executable instructions that are stored on non-transitory computer-readable storage media. It is further appreciated that one or more procedures described in flow diagram 2900 may be implemented in hardware, or a combination of hardware with firmware and/or software.

FIG. 29 illustrates a process 2900 for configuring a distributed computer system comprising a plurality of nodes of a plurality of node classes, in accordance with some embodiments. In some embodiments, a data intake and query system (e.g., system 108) performs at least a portion of process 2900. Process 2900 starts by displaying, at 2910, a plurality of configuration controls enabling user configuration of the distributed computer system, via a graphical user interface of a computing device having a display screen. The plurality of configuration controls include a forwarder configuration control for configuring forwarder nodes of a forwarder node class of the distributed computer system, an indexer configuration control for configuring indexer nodes of an indexer node class of the distributed computer system, and a search head configuration control for configuring search head nodes of a search head node class of the distributed computer system. In one embodiment, as shown at 2920, the displaying the plurality of configuration controls includes displaying a configuration status of nodes of the distributed computer system.

At 2930, in response to receiving a command for configuring a node of the distributed computer system at the graphical user interface, a control node of the distributed computer system configured for executing the command is identified. In one embodiment, the control node is a mediator node of the node class. In one embodiment, the control node is a deployment server for the forwarder node class. In another embodiment, the control node is a cluster master for the indexer node class. In another embodiment, the control node is a coordinator node for the indexer node class. In another embodiment, the control node is a search head cluster deployer for the search head node class. In another embodiment, the control node is a captain node for the search head node class. In various embodiments, in response to receiving a command for configuring a node of the distributed computer system at the graphical user interface, the configuration file for the node at the central repository is updated.

At 2940, the command is issued to the identified control node for execution. In one embodiment, as shown at 2950, the command is executed at the identified control node. In one embodiment, as shown at 2960, a configuration status update from the node. At 2970, the configuration status of the graphical user interface is updated to display the configuration status update for the node.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. Based on the above disclosure and the following claims, other arrangements, embodiments, implementations and equivalents will be evident to those skilled in the art and may be employed without departing from the spirit and scope of the invention as defined by the claims.

What is claimed is:

1. A computer-implemented method comprising:
storing, in a central repository on a management node, configuration files for a plurality of node classes of a data intake and query system; and
propagating changes, to one of the configuration files for one of the node classes comprising search nodes responsible for performing search operations on data collected by the data intake and query system, using two-way replication between the management node and the search nodes via a mediator node of the search nodes.

2. The computer-implemented method of claim 1, further comprising propagating other changes, to another one of the configuration files for another one of the node classes, using one-way replication from the management node to nodes of the other node class via another mediator node of the other node class.

3. The computer-implemented method of claim 1, wherein the mediator node is in a cluster of the search nodes, wherein the mediator node includes a search head configuration repository that manages, for each of the search nodes in the cluster, configuration checkpoints and deltas from the configuration checkpoints.

4. The computer-implemented method of claim 1, wherein the search nodes are configured to asynchronously replicate local configuration files to the mediator node by transmitting deltas from configuration checkpoints.

5. The computer-implemented method of claim 1, wherein the search nodes are configured to asynchronously replicate local configuration files to the mediator node by pulling a configuration checkpoint from the mediator node, merging local changes to the local configuration files with the configuration checkpoint to generate merged deltas, and pushing the merged deltas to the mediator node.

6. The computer-implemented method of claim 1, wherein using the two-way replication comprises the search nodes pulling a configuration checkpoint from the mediator node, overwriting a local configuration file using the configuration checkpoint, and subsequently pushing to the mediator node and pulling from the mediator node deltas from the configuration checkpoint.

7. The computer-implemented method of claim 1, wherein the mediator node is in a cluster of the search nodes, the computer-implemented method further comprising, upon partitioning the cluster into a majority partition and a minority partition, buffering deltas from configuration checkpoints for a set of the search nodes in the minority partition until the minority partition is healed.

8. The computer-implemented method of claim 1, wherein the mediator node is in a cluster of the search nodes, wherein the search nodes are configured to pull snapshots of a search head configuration repository from the mediator node, the computer-implemented method further comprising, upon partitioning the cluster into a majority partition and a minority partition, configuring one of the search nodes in the minority partition as a new mediator node for the minority partition using one of the snapshots of the search head configuration repository for the new mediator node.

9. One or more non-transitory computer storage media containing instructions which when executed on one or more data processors, cause the one or more data processors to perform operations comprising:
storing, in a central repository on a management node, configuration files for a plurality of node classes of a data intake and query system; and
propagating changes, to one of the configuration files for one of the node classes comprising search nodes responsible for performing search operations on data collected by the data intake and query system, using two-way replication between the management node and the search nodes via a mediator node of the search nodes.

10. The one or more non-transitory computer storage media of claim 9, the operations further comprising propagating other changes, to another one of the configuration files for another one of the node classes, using one-way replication from the management node to nodes of the other node class via another mediator node of the other node class.

11. The one or more non-transitory computer storage media of claim 9, wherein the mediator node is in a cluster of the search nodes, wherein the mediator node include s a search head configuration repository configured to manage, for each of the search nodes in the cluster, configuration checkpoints and deltas from the configuration checkpoints.

12. The one or more non-transitory computer storage media of claim 9, wherein the search nodes are configured to asynchronously replicate local configuration files to the mediator node by transmitting deltas from configuration checkpoints.

13. The one or more non-transitory computer storage media of claim 9, wherein the search nodes are configured to asynchronously replicate local configuration files to the mediator node by pulling a configuration checkpoint from the mediator node, merging local changes to the local configuration files with the configuration checkpoint to generate merged deltas, and pushing the merged deltas to the mediator node.

14. The one or more non-transitory computer storage media of claim 9, wherein using the two-way replication comprises the search nodes pulling a configuration checkpoint from the mediator node, overwriting a local configuration file using the configuration checkpoint, and subsequently pushing to the mediator node and pulling from the mediator node deltas from the configuration checkpoint.

15. The one or more non-transitory computer storage media of claim 9, wherein the mediator node is in a cluster of the search nodes, the operations further comprising, upon partitioning the cluster into a majority partition and a minority partition, buffering deltas from configuration checkpoints for a set of the search nodes in the minority partition until the minority partition is healed.

16. The one or more non-transitory computer storage media of claim 9, wherein the mediator node is in a cluster of the search nodes, wherein the search nodes are configured to pull snapshots of a search head configuration repository from the mediator node, the operations further comprising, upon partitioning the cluster into a majority partition and a minority partition, configuring one of the search nodes in the minority partition as a new mediator node for the minority partition using one of the snapshots of the search head configuration repository for the new mediator node.

17. A system comprising:
one or more data processors; and
one or more non-transitory computer storage media containing instructions which when executed on the one or more data processors, cause the one or more processors to perform operations comprising:
storing, in a central repository on a management node, configuration files for a plurality of node classes of a data intake and query system; and
propagating changes, to one of the configuration files for one of the node classes comprising search nodes responsible for performing search operations on data collected by the data intake and query system, using two-way replication between the management node and the search nodes via a mediator node of the search nodes.

18. The system of claim 17, wherein the search nodes are configured to asynchronously replicate local configuration files to the mediator node by transmitting deltas from configuration checkpoints.

19. The system of claim 17, wherein the search nodes are configured to asynchronously replicate local configuration files to the mediator node by pulling a configuration checkpoint from the mediator node, merging local changes to the local configuration files with the configuration checkpoint to generate merged deltas, and pushing the merged deltas to the mediator node.

20. The system of claim 17, wherein using the two-way replication comprises the search nodes pulling a configuration checkpoint from the mediator node, overwriting a local configuration file using the configuration checkpoint, and subsequently pushing to the mediator node and pulling from the mediator node deltas from the configuration checkpoint.

* * * * *